COMBINED ELECTRICAL AND MECHANICAL ACCOUNTING DEVICE INCLUDING SELECTIVELY ACCESSIBLE MAGNETIC STORAGE MEANS

Filed Sept. 10, 1962 21 Sheets-Sheet 1

INVENTORS:
Robert I. Reiss
Peter S. Glaser

Louis A. Kline
By John J. Matlago
Nathan Cass
Their Attorneys

COMBINED ELECTRICAL AND MECHANICAL ACCOUNTING DEVICE INCLUDING SELECTIVELY ACCESSIBLE MAGNETIC STORAGE MEANS

Filed Sept. 10, 1962 21 Sheets-Sheet 2

INVENTORS:
Robert I. Reiss
Peter S. Glaser
Louis A. Kline
John J. Matlago
By Nathan Cass
Their Attorneys COMBINED ELECTRICAL AND MECHANICAL ACCOUNTING DEVICE INCLUDING SELECTIVELY ACCESSIBLE MAGNETIC STORAGE MEANS Filed Sept. 10, 1962

INVENTORS:
Robert I Reiss
Peter S. Glaser
Louis A Kline
By John J. Matlago
Nathan Cass
Their Attorneys INVENTORS.
Robert I. Reiss
Peter S. Glaser
Louis A. Kline
By John J. Matlago
Nathan Cass
Their Attorneys INVENTORS.
Robert I. Reiss
Peter S. Glaser
By Louis A. Kline
John J. Matlago
Nathan Cass
Their Attorneys INVENTORS:
Robert I. Reiss
Peter S. Glaser
By Louis A. Kline
John J. Matlago
Nathan Cass
Their Attorneys INVENTORS:
Robert I. Reiss
Peter S. Glaser
By Louis A. Kline
John J. Mutlago
Nathan Cass
Their Attorneys INVENTORS:
Robert I. Reiss
Peter S. Glaser
Louis A. Kline
By John J. Matlago
Nathan Cass
Their Attorneys FLOW CHART OF FUNCTIONS PERFORMED DURING THE FIRST PORTION OF THE CYCLE OF OPERATIONS AT A STOP POSITION INVENTORS:
Robert I. Reiss
Peter S. Glaser By Louis A Kline
John J. Matlago
Nathan Cass
Their Attorneys INVENTORS:
Robert I. Reiss
Peter S. Glaser By Louis A. Kline
John J. Matlago
Nathan Cass
Their Attorneys INVENTORS:
Robert I. Reiss
Peter S. Glaser
By Louis A. Kline
John J. Matlago
Nathan Cass
Their Attorneys INVENTORS:
Robert I. Reiss
Peter S. Glaser By Louis A. Kline
John J. Matlago
Nathan Cass
Their Attorneys INVENTORS:
Robert I. Reiss
Peter S. Glaser
By Louis A. Kline
John J. Matlago
Nathan Cass
Their Attorneys March 22, 1966 R. I. REISS ETAL 3,242,317

COMBINED ELECTRICAL AND MECHANICAL ACCOUNTING DEVICE INCLUDING SELECTIVELY ACCESSIBLE MAGNETIC STORAGE MEANS

Filed Sept. 10, 1962 21 Sheets-Sheet 14

INVENTORS:
Robert I. Reiss
Peter S. Glaser

By Louis A. Kline
John J. Matlago
Nathan Cass
Their Attorneys

INVENTORS:
Robert I. Reiss
Peter S. Glaser
Louis A. Kline
By John J. Matlago
Nathan Cass
Their Attorneys INVENTORS:
Robert I. Reiss
Peter S. Glaser
By Louis A. Kline
John J. Matlago
Nathan Cass
Their Attorneys INVENTORS:
Robert I. Reiss
Peter S. Glaser Louis A Kline
By John J. Matlago
Nathan Cass
Their Attorneys March 22, 1966 R. I. REISS ETAL 3,242,317
COMBINED ELECTRICAL AND MECHANICAL ACCOUNTING DEVICE INCLUDING
SELECTIVELY ACCESSIBLE MAGNETIC STORAGE MEANS
Filed Sept. 10, 1962 21 Sheets-Sheet 18

INVENTORS:
Robert I. Reiss
Peter S. Glaser

By Louis A. Kline
John J. Matlago
Nathan Cass
Their Attorneys

INVENTORS:
Robert I. Reiss
Peter S. Glaser
Louis A. Kline
By John J. Matlago
Nathan Cass
Their Attorneys INVENTORS:
Robert I. Reiss
Peter S. Glaser
Louis A. Kline
By John J. Matlago
Nathan Cass
Their Attorneys COMBINED ELECTRICAL AND MECHANICAL ACCOUNTING DEVICE INCLUDING SELECTIVELY ACCESSIBLE MAGNETIC STORAGE MEANS Filed Sept. 10, 1962

INVENTORS:
Robert I. Reiss
Peter S. Glaser

Louis A. Kline
By John J. Matlago
Nathan Cass
Their Attorneys 3,242,317

COMBINED ELECTRICAL AND MECHANICAL ACCOUNTING DEVICE INCLUDING SELECTIVELY ACCESSIBLE MAGNETIC STORAGE MEANS

Robert I. Reiss and Peter S. Glaser, San Pedro, Calif., assignors to The National Cash Register Company, Dayton, Ohio, a corporation of Maryland Filed Sept. 10, 1962, Ser. No. 222,300
37 Claims. (Cl. 235—61.9)

The present invention relates generally to calculating devices, and more particularly to accounting or bookkeeping devices of a type which are provided with a traveling paper carriage for supporting the bookkeeping forms and also for automatically controlling the various functions of the machine in accordance with the columnar positioning thereof.

With the ever increasing emphasis being placed on the use of high speed automatic data processing techniques in the business world of today, both large and small business establishments, with an eye towards the future, have become increasingly interested in making use of these high speed data processing techniques for their own needs. While considerable effort has been expended toward the development of large scale computing equipment for use in business establishments where the volume and complexity of business activity is considerable, relatively little effort has been expended toward developing computing devices and calculating machines which are suitable for the small businessman, or for operations which, although tedious and time consuming, would not justify the expense of a large data processor.

As a result, a large portion of the commercially available computing or calculating devices fall into two groups. In one group are the large and expensive data processing systems employing highly complex and expensive equipment which requires considerable floor space. In the other group are the relatively small and inexpensive mechanical or electromechanical machines having limited capability, and providing only a relatively small degree of automation, at low speed. An example of a machine of the latter group is the well-known mechanical accounting machine, such as is disclosed for example, in United States Patent Nos. 2,626,749 and 2,930,523. Outside of these two groups, a considerable void exists which for the most part has been taken up by hybrid types of combined mechanical-electronic machines which are usually either too expensive for the simple job to be accomplished, or else, lack the flexibility and capacity to do the more complex job which would justify the expenses involved in their use.

Accordingly, it is one of the principal objects of the present invention to provide a new and improvel accounting device which retains the simplicity and low cost features of the small mechanical or electromechanical accounting machine (such as disclosed in the aforementioned patents), while at the same time offering a number of the more important advantages of a larger scale electronic computer, such as high capacity, improved computing ability, and greater flexibility.

Another object of this invention is to provide improved means and methods for coupling the mechanical and electrical portions of accounting devices of the type which are provided with a traveling paper carriage for supporting accounting forms, and for automatically controlling the functioning of the device in accordance with the columnar positioning of the carriage.

A further object of this invention is to provide an accounting device which is constructed and arranged so that the mechanical portions of the device are driven through a basic single cycle of operations at each stop position of a traveling carriage, whereby the required mechanical and electrical operations required at each stop position are performed.

Still another object of the present invention is to provide improved electrical circuit means for use in cooperation with the mechanical portions of an accounting device employing both mechanical and electrical means.

Yet another object of this invention is to provide an accounting device having a properly balanced combination of mechanical and electrical portions and provided with coupling means therebetween, so that each portion is able to perform the operations for which it is best suited, while being able to conveniently communicate with the other portion as needed, the resultant accounting device thereby providing a maximum of computing capability and versatility, with a minimum of required hardware and electrical circuitry.

A further object of the invention is to provide an accounting device which is able to be operated in a manner similar to a conventional mechanical accounting device of the type disclosed, for example, in United States Patent No. 2,626,749, while providing a high storage capacity, an increased computing capability, and a high degree of flexibility.

A still further object of the invention is to provide improved electrical circuit means for use in performing data processing operations in an accounting device of the traveling carriage type.

An additional object of the invention is to provide an accounting device which is able to conveniently communicate with external equipment for receiving and/or outputing accounting data.

Another object of the invention is to provide an accounting device having means for automatically outputing the results of accounting data from a large plurality of storage locations therein.

The specific nature of the present invention as well as other objects, uses, and advantages thereof will become apparent from the following description of a typical embodiment of the invention to be disclosed and explained in connection with the accompanying drawings in which.

Like numerals designate like elements throughout the figures of the drawing.

INTRODUCTION AND GENERAL DESCRIPTION (FIG. 1)

Before taking up a detailed description of a typical embodiment of the present invention, some preliminary remarks will first be presented. It is to be noted that the mechanical portions of the accounting device of the present invention are preferably of the same general types as disclosed in the previously mentioned Patent Nos. 2,626,749 and 2,930,523. For this reason, the mechanical portions of the present invention will be described and shown only in such detail as is necessary for a proper understanding thereof and, for the most part, will be described and shown in schematic form. Based on such disclosure and the disclosure in Patent Nos. 2,626,749 and 2,930,523 as well as other available prior art teachings, one skilled in the art will readily be able to provide the mechanical portions required for the present invention so as to permit achieving the advantages and objects thereof. Of course, while the mechanical portions of the accounting device of the present invention are preferably of the same general type as disclosed in the aforementioned patents, it is to be understood that various other mechanical structures may also be satisfactorily employed in the present invention, as will become evident as the description proceeds.

Figure 1:
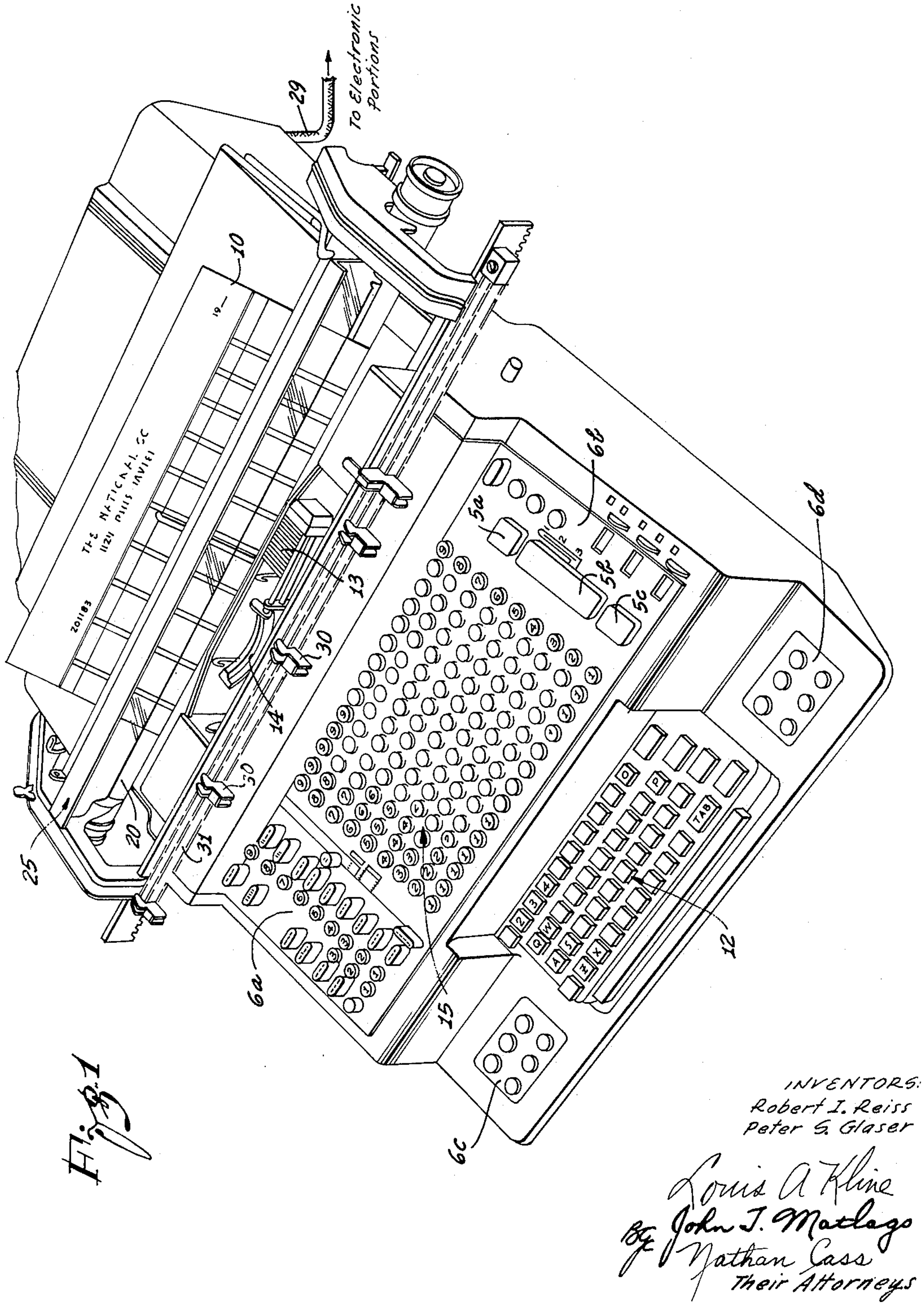
FIG. 1 is a perspective view of the general external appearance of the keyboards and other mechanical portions of a typical accounting device in accordance with the invention.

Referring now to FIG. 1 of the drawing, a perspective view is shown of the external appearance of the keyboards and mechanical portions of a typical embodiment of the accounting device of the present invention, which will be seen to be essentially similar to that disclosed in the aforementioned Patent No. 2,626,749. The remaining portions of the accounting device of the present invention are essentially electronic in nature and are preferably provided in a separate structure (not shown in FIG. 1) which is interconnected to the FIG. 1 structure by means of an electrical cable 29. Preferably, the essentially electronic separate structure is provided in close proximity to the FIG. 1 structure, and the entire accounting device is constructed and arranged in the form of a desk model, basically similar to the machine disclosed in the aforementioned patent.

Now briefly reviewing the FIG. 1 structure, it will be seen to include a typewriter keyboard 12 at the front end of the structure, while just behind and somewhat above the typewriter keyboard 12 is an amount keyboard 15 on which may be set up the various amounts which are to be entered into the accounting device. To the left of the amount keyboard 15 is a control keyboard indicated generally at **6*a* which contains various function control keys, while to the right of the amount keyboard 15 is another control keyboard 6*b* containing motor bars 5*a*, 5*b*, 5*c* and various carriage control keys. Further control keys indicated generally at 6*c* and 6*d* are provided to the left and right of the typewriter keyboard 12**. These control keys permit an operator to manually vary or modify certain types of machine operations, as well as to control carriage positioning.

In the center of the structure, just above the amount keyboard 15, are a group of type sectors 13 which are controlled by the accounting device, while just to the left of these sectors 13 is located a type basket 14 for the typewriter keyboard 12. Immediately behind the aforementioned printing mechanism is a rotatable platen 20 in which accounting forms and/or other record material may be supported, such as illustrated by the record form 10 shown engaged with the platen 20 in FIG. 1. The typewriter portion of the structure is provided merely to permit an operator to type descriptive information on the record form 10 or any other form used with the device. The platen 20 is mounted on a traveling carriage 25 which is moveable back and forth across the machine.

It is to be noted that, as in the accounting machine disclosed in the aforementioned patents, the carriage 25 in the preferred embodiment of the present invention may be tabulated in either direction from one columnar position to another, or, if required, through intervening columnar positions from one columnar position to a preselected columnar position, all of which is made practical by means of the well-known fluid coupling mechanism which connects the traveling carriage to its driving means. The driving means (not shown) comprises a continuously-operating motor, which drives the fluid coupling mechanism for shifting the traveling carriage 25 in either tabulating or return direction, and which, through a clutch mechanism controlled by motor bars *5a*, *5b* and *5c* may be connected to the machine mechanism for driving the machine through the single cycle of operations required for all types of functions performed by the machine at each stop position of the carriage. In addition to the manual initiation of machine operation by use of the motor bars, machine operations may be automatically initiated at a carriage stop position by proper choice of the stop constructional design, as will hereinafter be explained.

Control of the accounting device in accordance with carriage positioning will now be briefly described in order to provide background for the description to follow:

A first measure of control is achieved by a plurality of carriage stops 30 of variable constructional design, which are mounted on a fixed form bar 31 and selectively positionable thereon. These stops are constructed and arranged to cooperate with the carriage 25 so that, as the carriage 25 travels across the machine, each stop 30 is traversed in turn and its constructional design is sensed to aid in determining the functional operations which are to be performed by the accounting device at each stop position. One of the important functions of the stops 30 is to control the format of printing in accordance with the columns of the particular record form 10 being used. This is accomplished by suitably positioning particular ones of the stops 30 at positions corresponding to the columns of the record form 10, the constructional design of each such stop 30 being chosen to automatically stop the carriage 25 at each stop 30 and to indicate to the device the desired printing (or non-printing) required at that stop position, which in turn corresponds to the printing desired in the corresponding column of record form 10.

The constructional design of each stop 30 is also capable of being chosen so that when the carriage 25 reaches each stop position, it may be caused to remain fixed in that stop position without permitting the machine to perform the operations required for that stop position until initiated by the operator manually depressing a motor bar *5a*, *5b* or *5c* (as ordinarily occurs if some entry by the operator is needed for the particular operations to be performed in that stop position), or else, the machine may automatically be initiated to perform the operations of that stop position as soon as the carriage 25 arrives thereat, without the aid of the operator (as is ordinarily permitted to occur if no entry by the operator is required in order to proceed with the accounting operations being performed). In either case, once operation at a stop position is initiated, the carriage 25 will automatically be released to proceed to the next stop position or to any other desired position after the required operations at the present stop position have been performed. Also, the stops 30 may be designed to permit the carriage 25 to skip a particular stop position under certain conditions. The manner in which the constructional design of a stop 30 is chosen, as well as the associated mechanical structure required to perform the above control functions, are described in considerable detail in the aforementioned patents and will not be repeated here.

With respect to the accounting machine disclosed in the aforementioned patents, however, it will be helpful at this stage of the description to note that, in the machine disclosed therein, the stops 30 are provided with additional constructional design features which permit them to control not only the printing format and carriage tabulation functions as described above, but also, to control the functional operations which are to take place when the carriage 25 is at each stop position. That is, in the embodiment of the aforementioned patents, the constructional design of each stop 30 is additionally chosen so that, in response to the sensing thereof, the machine will be caused to perform all of the various carriage tabulation and printing functions as well as any arithmetic and/or other machine operations which it is desired be performed at that stop position, subject to any modifications or alterations which may be effected by the operator having depressed suitable ones of the control keyboards *6a*, *6b* and *6c* or *6d*.

On the other hand, in the preferred embodiment of the present invention, the stops 30 are used only to control the printing format and carriage tabulation functions which are to be performed during the cycle of machine operation at each stop position. The remaining control of the operations which are to be performed during the cycle of machine operation at each stop position are determined in the present invention by the states of a series of selectively controllable program switches (not visible in FIG. 1) which are provided at each respective stop position in correspondence with the stops 30. Then, when the carriage 25 traverses a particular stop position, it will sense the design construction of the stop 30 to determine printing format and carriage tabulation functions, and at the same time, the carriage 25 will also sense the states of the program switches corresponding to that stop position to determine the remaining functions which are to be performed thereat. As a result of this sensing of the program switches by carriage 25, electrical signal indications are produced which are fed to the electronic portions of the accounting device (not shown in FIG. 1) by way of electrical cable 29 to control the operations thereof. Thus, at each stop position in the embodiment of the present invention, the constructional design of the stop 30 determines the operations to be performed by the mechanical portions of the device at that stop position, while the states of the corresponding series of selectively controllable program switches determine the operations to be performed by the electrical portions of the device at that stop position. The specific manner in which these mechanical and electronic functions are advantageously integrated in accordance with the present invention will become evident as the description progresses.

It is to be noted at this time that the program switches provided at each stop position could be incorporated with the stops 30 on the form bar 31 if not too many switches were involved, and such an arrangement is within the scope of this invention. However, in the illustrative embodiment of the present invention being described herein, it is preferred to separate these program switches from the mechanical stops 30 in order to permit each to serve to its best advantage, and most particularly, to permit a relatively large number of program switches to be provided corresponding to each stop position in order to achieve the greatest flexibility of machine operation, as will become evident, hereinafter.

Figure 2:
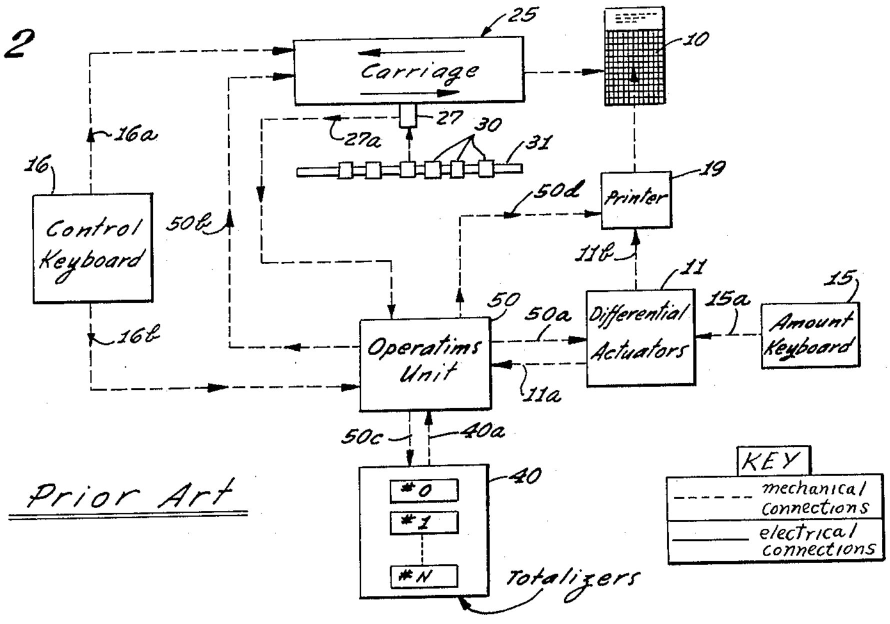
FIG. 2 is a block diagram schematically illustrating the construction and operation of a prior art mechanical accounting machine.

BRIEF DESCRIPTION OF THE ACCOUNTING MACHINE OF PATENT NOS. 2,626,749 AND 2,930,523 (FIG. 2)

Before continuing the description of the accounting device of the present invention, it will be helpful at this point to temporarily return to the embodiment of the accounting machine disclosed in the aforementioned Patent Nos. 2,626,749 and 2,930,523 to consider its general construction and mode of operation as an aid to understanding the construction and operation of the present invention following thereafter. For this purpose, reference is made to FIG. 2 which schematically illustrates the structure and operation of the accounting machine disclosed in the aforementioned patents. From FIG. 2, it will be seen that the machine may be considered as functionally divided into a relatively small number of units which are designated by the same numerals as like structures in FIG. 1, the dashed lines in FIG. 2 representing mechanical outputs applied between units in the directions indicated by the respective associated arrows.

It is to be understood that the arrangement shown in FIG. 2 is provided in this schematic manner in order to permit the operation of the machine to be more easily understood and does not necessarily represent the actual structural design and/or physical arrangement of the machine, which physical arrangement and structural design are quite adequately disclosed in the aforementioned patents.

Now considering the schematic arrangement of FIG. 2 in more detail, it will be seen that the accounting machine of the aforementioned patents includes a moveable carriage 25 having a record form 10 disposed therein in a manner similar to that illustrated in FIG. 1. The carriage 25 includes a carriage sensing means 27 (not shown in FIG. 1) which is constructed and arranged (as fully disclosed in the aforementioned patents) to sense the constructional design of each stop 30 on form bar 31 as the carriage 25 moves to each respective stop position during the performance of an accounting operation. As a result of sensing the constructional design of a stop 30, the carriage sensing means 27 produces a mechanical output 27*a* representative of stop design, which output 27*a* is fed to an operations unit 50, which includes, among other things, the various mechanisms required for cycling the machine through the standard cycle of operations performed at each stop position. This mechanical output 27*a* fed to operations unit 50 serves to determine the particular operations which are to be performed by the operations unit 50 during the cycle of machine operations at each stop position. As also indicated in FIG. 2, the carriage 25 is itself subject to being controlled by a mechanical output 50*b* provided by the operations unit 50 during the cycle of machine operations, as well as by a mechanical output 16*a* produced as a result of the operator manually depressing a carriage control key on the control keyboard 16, which control keyboard 16 is intended to represent all of the control keyboards 6*a*, 6*b*, 6*c*, and 6*d* in FIG. 1.

Continuing with the description of the schematic diagram of FIG. 2 which corresponds to the embodiment disclosed in the aforementioned patents, it will be understood from the foregoing paragraph that, as a result of receiving the mechanical output 27*a* from the carriage sensing means 27, the operations unit 50 acts during the cycle of machine operation performed threby at each stop position to cause performance of those operations called for by the constructional design of the particular stop 30 in which the carriage 25 resides. Such operations are, of course, subject to being modified to some extent by a mechanical output 16*a* from the control keyboard 16 produced as a result of the operator having previously depressed one or more control keys thereof.

Also shown in FIG. 2 are a plurality of totalizers #0, #1, . . . #N generally indicated by the numeral 40, each totalizer serving as a mechanical accumulator to which a mechanical output 50*c* representing a number may be applied. Each totalizer is capable of accumulating the algebraic total of any such numbers applied thereto, except that negative totals are stored as complements. The accumulation represented by each totalizer will thus be hereinafter referred to simply as a "total," which is consistent with the terminology used in the aforementioned patent. Besides accumulating numbers applied thereto, each totalizer is also capable of applying its total as a mechanical output 40*a* to the operations unit 50, as a result of which, the total stored in the selected totalizer may be retained (sub-total operation) or returned to zero (clearing operation). The construction, arrangement and operation of such totalizers 40 are disclosed in considerable detail in the aforementioned patents and will not be repeated here.

In addition to the above-described functional units, FIG. 2 also schematically represents the amount keyboard 15 on which various amounts (such as the price of merchandise, freight charges, number of hours worked, etc.) may be set up and entered into the machine by the operator manually depressing appropriate ones of the amount keys. As mentioned previously, the constructional design of the stops 30 are ordinarily chosen so that, when the carriage 25 arrives at a stop which requires data to be provided by the operator, operation of the machine will not be initiated until the operator manually depresses a motor bar (*5a*, *5b*, or *5c* in FIG. 1) of the control keyboard 16. Thus, where external data is required, the operator is given an opportunity to set up a desired amount in the amount keyboard 15 before initiating the performance of the operations which are to be performed at that stop position. Then, during an early portion of the cycle of operation at that stop position, a mechanical output 15*a* representative of the keys depressed on the amount keyboard 15 is caused to set up a plurality of differential actuators 11 to a number in accordance therewith. The number represented by the settings of the differential actuators 11 is used to supply a mechanical output 11*a* to the operations unit 50, which in turn applies the number to a selected one or ones of the totalizers 40, as determined by either the stop constructional design or the control keyboard 16.

It will be remembered that for stop positions which do not require an entry by the operator, the cycle of machine operations is ordinarily automatically initiated when the carriage 25 arrives thereat; in such a situation, the differential actuators 11 are ordinarily again set at an early portion of the cycle of machine operation at that stop position, but this time the amount keyboard 15 is ignored and the actuators 11 are set in accordance with a total represented by the mechanical output 50*a* supplied by the operations unit 50, which total in turn is derived from a selected one of the totalizers 40 chosen in accordance with the stop constructional design or the control keyboard 16.

Thus, it will be understood that during an early portion of the cycle of machine operation at a stop position, the differential actuators 11 are ordinarily set (in accordance with the stop constructional design or the control keyboard 16) to a number supplied from either the amount keyboard 15, or from a selected one of the totalizers 40. It is this number set up in the actuators 11 during the early portion of the cycle of machine operation at a stop position which may be applied (that is, added algebraically) to the total in a selected one or ones of the totalizers 40 during the remaining portion of the cycle at that stop position. It is also this number set up in the actuators 11, while a mechanical output 50*d* from the operaprinted out in the column of the record form 10 corresponding to the stop position in which the carriage 25 resides. More specifically, a mechanical output 11*b* from the actuators 11 serves to set the printer 19 to print out the number represented by the settings of the actuators 11, while a mechanical output 50*d* from the operations unit 50 (derived from the constructional design of the stop 30 or the control keyboard 16) determines whether printing is to occur and, if so, the particular form that the printing is to have, such as black or red printing, suppression of the cents numerals, etc. Towards the end of the cycle of machine operations at each stop position, the actuators 11 are automatically returned to a home position, the carriage 25 is released to proceed to the next stop position (unless the stop construction indicates otherwise), and the machine is readied for operation at the next stop.

In summary of FIG. 2 it should now be understood that during the cycle of operation at each stop position, the differential actuators 11 may be set at an early portion of the cycle to a number in accordance with either an amount in the amount keyboard 15, or in accordance with a total from a selected one of the totalizers 40, as determined by the stop constructional design and/or the control keyboard 16. Thereafter, during the remainder of the cycle, the settings of the differential actuators 11 may be used to cause the number set up therein to be printed out by printer 19 and/or to be added (algebraically) to a selected one or ones of the totalizers 40, also as determined by the stop constructional design or the control keyboard. Towards the end of the cycle of machine operations at a stop position, the actuators 11 are returned to a home position, the carriage 25 is released to proceed to the next stop position (unless the stop construction indicates otherwise), and the machine is prepared for operation at the next stop position.

In the specific embodiment disclosed in the aforementioned patents, there are various restrictions on which totalizers may be selected and a special "X" totalizer and a special overdraft mechanism are provided to permit true credit balances to be printed out from the totalizers instead of complements. However, such expedients need not be considered here since, as will become evident hereinafter, the present invention completely eliminates the problem of complements.

From the foregoing description of the basic construction and arrangement of the accounting machine disclosed in the aforementioned patents, it should now be evident that this machine is capable of performing a wide variety of accounting operations, typical applications being given in the aforementioned patents. It will be understood from these illustrative applications that one of the chief features of the machine resides in its capability to employ selected ones of the totalizers 40 in FIG. 2 to accumulate the totals of particular items and, where desired, to automatically print out the accumulated totals in respective columns of the record form 10. For example, in the typical application described in the aforementioned Patent No. 2,626,749, which involves the handling of the monthly accounts payable of a department store having a plurality of financially independent departments, it will be noted that as the data on the invoices of each vendor are being entered on the vendor ledger cards (and by means of carbon paper on the departmental journal sheet), the various totalizers are accumulating the totals of different items of information, and printing out their totals in appropriate columns. Totalizer #1, for example, is chosen to accumulate the net balance payable to a particular vendor. Thus, at every stop position in which an amount is entered which affects the net balance payable to this vendor, the stop constructional design is chosen to cause the entered amount (acting through the differential actuators 11 and the operations unit 50 as described previously) to be added or subtracted into totalizer #1. Of course, this same amount may be added or subtracted into any other desired totalizer (or totalizers) which may be accumulating different items of information. After all of the amounts corresponding to this particular vendor have been entered, the carriage 25 is tabulated to a stop position having a constructional design which selects totalizer #1 and causes it to act through the operations unit 50 (as also described previously) to set up the differential actuators 11 so that the accumulated total in totalizer #1 (corresponding to the net balance payable to this vendor) may be printed out in its respective column. Other totalizers may be operated in a similar manner to accumulate and print out various other accumulated totals such as retail selling price, discounts, freight charges, etc., all as described in the aforementioned Patent No. 2,626,749.

The above description of the accounting machine disclosed in the aforementioned patents should be of value in providing a background for the description of the present invention to follow: Of course, many of the features of the embodiment of the aforementioned patents have not been considered, such as key locking and automatic key release features, motor bar control features, symbol printing features, and features derivable by the operator depressing appropriate keys on the control keyboard 16. However, such features are quite adequately disclosed in the aforementioned patents and it is to be understood that any or all of them may be incorporated in the present invention in a like manner, except as may be indicated otherwise herein. It is also to be understood that although much of the description of the present invention will be with reference to schematic showings in the drawings, the description will be sufficient when taken with the disclosures in the aforementioned patents and the patents cited therein, as well as other prior art, to readily enable one skilled in the art to provide suitable specific structure as may be required to achieve the advantages and features of the present invention.

Figure 3:
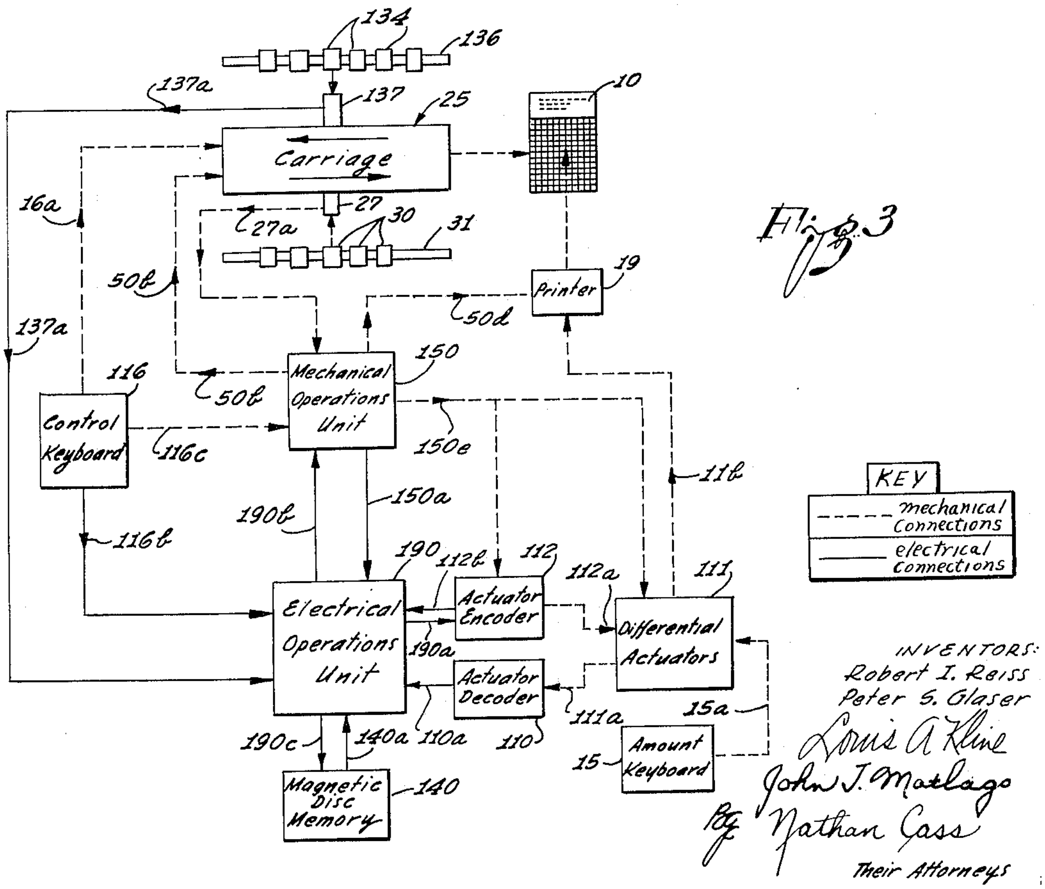
Prior Art Fig. 3
FIG. 3 is a block diagram schematically illustrating the construction and operation of a typical embodiment of an accounting device in accordance with the invention.

BASIC CONSTRUCTION AND OPERATION OF A PREFERRED EMBODIMENT OF THE PRESENT INVENTION (FIG. 3)

FIG. 3 schematically illustrates a preferred embodiment of an accounting device in accordance with the present invention, the manner of illustration being similar to that used in FIG. 2 for the embodiment of the aforementioned patents. Since the embodiment of the present invention includes both electrical and mechanical functions (unlike the embodiment of the aforementioned patents which is essentially mechanical), FIG. 3 additionally provides representations of electrical outputs from the various units as well as mechanical outputs. More specifically, the dashed lines in FIG. 3 (similarly to FIG. 2) represent mechanical outputs which are applied between units in the directions indicated by their respective associated arrows; on the other hand, the solid lines in FIG. 3 represent electrical outputs which are also applied between units in the directions indicated by their respective associated arrows.

It is to be understood that like FIG. 2, the arrangement shown in FIG. 3 is provided in this schematic form in order to permit the present invention to be more easily understood, and does not necessarily represent the actual structural design and/or physical arrangement of the device. In this connection, it is to be noted that most of the mechanical portions of the present invention may preferably be provided in the same general form as illustrated in the accounting machine of the aforementioned patents. The specific structure and arrangement of such mechanical portions will therefore not be considered in detail herein. Any mechanical portions which are basically different from those disclosed in the aforementioned patents or which are not readily providable in view of the present state of the art, will be described in sufficient detail herein to enable those skilled in the art to either modify the related mechanical portion disclosed in the embodiment of the aforementioned patents, or to provide other suitable specific structure based on knowledge already available in the art. As is conventional, the electrical portions of the preferred embodiment will, for the most part, be described almost entirely with reference to schematic representations in the drawings. Such representations should be quite adequate since those skilled in the art will readily be able to embody the electrical functions represented thereby into a variety of suitable structural arrangements.

In considering FIG. 3, it is to be noted at the outset that those units and mechanical outputs in FIG. 3 which preferably have the same constructional form as those of FIG. 2 are designated by the same numerals, such as the record form 10, the carriage 25, the stops 30 on form bar 31, the carriage sensing means 27, the printer 19, the amount keyboard 15, and the mechanical outputs 11*b*, 15*a*, 16*a*, 27*a*, 50*b*, and 50*d*. All other units and outputs shown in FIG. 3 have 100 level numeral designations, which may be considered significant to the extent that those units and outputs in FIG. 3 which are related to, or are modifications of, similar units and outputs in FIG. 2 are provided with numeral designations exactly 100 greater than the numeral designations of their corresponding units and outputs in FIG. 2.

Now taking up FIG. 3 in more detail, it will be seen that the moveable carriage 25 (as in FIG. 2) has a record form 10 disposed therein in a manner similar to that shown in FIG. 1. It will also be seen that (as in FIG. 2) the carriage 25 in FIG. 3 includes a carriage sensing means 27 for sensing the constructional design of a stop 30 when the carriage 25 resides in that stop position, and for producing a mechanical output 27*a* representative thereof. However, unlike in FIG. 2, each stop 30 in FIG. 3 is preferably used only to control the printing format and carriage tabulation operations (and other associated and miscellaneous mechanical operations which are to be performed when the carriage 25 is in that stop position. The remaining operations to be performed at each stop position are determined, in the preferred embodiment of the present invention illustrated in FIG. 3, by the states of a series of selectively controllable program switches 134 provided on a rear form bar 136 adjacent to the back of the carriage 25, each series of program switches 134 being selectively positioned to correspond to a respective stop 30 on the front form bar 31. A rear carriage sensing means 137 included with the carriage 25 then permits the states of the series of program switches 134 at a particular stop position to be sensed concurrently with the sensing of the constructional design of the corresponding stop 30 by the front carriage sensing means 27.

It will therefore be understood that when the carriage 25 arrives at each stop position and the cycle of machine operation is initiated (either automatically or by the operator depressing a motor bar *5a*, *5b*, or *5c* in FIG. 1), the front sensing means 27 will sense the constructional design of the respective stop 30 to produce a mechanical output 27*a* representative of the printing format and carriage tabulation functions to be performed at that stop position while, at the same time, the rear carriage sensing means 137 will sense the states of the corresponding series of program switches 134 and provide an electrical output 137*a* (preferably in binary digital form) which is representative of the remaining operations to be performed at that stop position. As was the case for the keyboard 16 in FIG. 2, the operator by manually depressing appropriate keys of the control keyboard 116 in FIG. 3 is able to control carriage positioning and, in addition, is able to modify to some extent the program of operations called for at a particular stop position by both the stop constructional design and the states of the program switches. These functions of the control keyboard 116 are indicated in FIG. 3 by the mechanical outputs 16*a*, 116*b* and 116*c* applied from the control keyboard 116 to the carriage 25, the electrical operations unit 190, and the mechanical operations unit 150, respectively.

To provide for the efficient utilization of the mechanical and electrical outputs 27*a* and 137*a* thus derived from the front and rear carriage sensing means 27 and 137, respectively, the mechanical operations unit 150 is provided to receive the mechanical output 27*a*, and the electrical operations unit 190 is provided to receive the electrical output 137*a*. Considering the mechanical operations unit 150 first, it is to be noted that this unit 150 is preferably constructed and arranged to cycle the machine through the basic single cycle of operations performed at each stop position in the same general manner as does the operations unit 50 in FIG. 2. In so doing, the unit 150 may cooperate with the carriage sensing means 27, the carriage 25, the printer 19, the actuators 111, and the control keyboard 116 (by way of mechanical outputs 27*a*, 150*b*, 150*d*, 150*e*, and 116*c*, respectively) in substantially the same manner as does the operations unit 50 in the FIG. 2 representation of the embodiment of the aforementioned patent. However, since the stops 30, are preferably used only to control the printing format and carriage tabulation functions and no longer need communicate with totalizers such as 40 in FIG. 2, the portions of the operations unit 50 of FIG. 2 which are no longer necessary may advantageously be eliminated from the mechanical operations unit 150 of FIG. 3, thereby making the unit 150 considerably less complex. The only additional structure which is then required in the mechanical operations unit 150 is that required for communication with the electrical operations unit 190. Such additional structure may be of two basic forms. First, cam-type switches (which may be conventional) are provided in the mechanical operations unit 150 for producing electrical output signals 150*a* to synchronize various operations of the electronic operations unit 190 with the cycle of machine operations being performed by mechanical operations unit 150 at each stop position; secondly, solenoids (which may also be conventional) are provided in the mechanical operations unit 150 in order to convert electrical signals 190*b* received from the electrical operations unit 190 into mechanical outputs which are then able to control such functions as carriage tabulation, printing format, and automatic cycle initiation in cooperation with the stop constructional design. These features will be considered in further detail hereinafter.

Turning for a moment to a consideration of the control keyboard 116 in FIG. 3, it should be noted that the carriage control keys and the motor bars (*5a*, *5b*, and *5c* in FIG. 1) of the control keyboard 116 are preferably retained in the same form as in the embodiment of the aforementioned patent. However, in order to provide electrical outputs for feeding to the electrical operations unit, many of the remaining control keys are chosen so that, when each is depressed, it causes a respective switch to be closed and a respective electrical output 116*b* to thereby be applied to the electrical operations unit 190. Such switches are well known in the art and may readily be provided in various possible ways.

Now returning to the electrical operations unit 190 in FIG. 3, it is to be understood that because of the limited use made of the mechanical operations unit 150 in this embodiment, the major portion of the accounting operations to be performed at each stop position is necessarily taken over by the electrical operations unit 190. As will hereinafter be shown, the electrical operations unit 190 is able to perform all of such operations previously performable by the operations unit 50 in FIG. 2, at higher speed, and with more flexibility and, in addition, is able to achieve a very significant improvement in the computing capability of the overall accounting device with only a relatively small increase in complexity and expense.

With there brief comments in view, the manner in which the electrical operations unit 190 fits into the overall system will now be described. As described in connection with FIG. 2, one of the chief features of the type of accounting device disclosed in the aforementioned patents resides in its ability to accumulate the totals of particular items in selected totalizers 40 and, where desired, to automatically print out the accumulated totals from selected totalizers in respectice columns of the record form 10. In the embodiment of the present invention illustrated in FIG. 3, this same feature is also of considerable importance, but in this embodiment the mechanical totalizers 40 of FIG. 2 are eliminated and the totalizer functions are instead performed by a magnetic disc memory 140 operating in cooperation with the electrical operations unit 190. It will be understood from the previously described embodiment of FIG. 2 that the totalizers 40 perform the functions of both storage and accumulation.

On the other hand, in the embodiment of the present invention illustrated in FIG. 3, the disc memory 140 provides merely for the storage of totals, while accumulation (as well as other arithmetic operations) are performed electrically in the electrical operations unit 190. For example, the disc memory 140 is capable of transferring a total from a selected storage location therein (in the form of an electrical output 140*a*) to the electrical operations unit 190 for arithmetic manipulation, after which, the result is transferred by the electrical operations unit 190 (in the form of an electrical output 190*c*) back to a selected storage location in the disc memory 140, which storage location may be the same or different from the previous one. It is to be noted that, in a manner analogous to the FIG. 2 embodiment, the particular storage locations of the disc memory 140 from which, or to which, a number or total is to be transferred (taken) during operations at a stop position, are determined in accordance with the states of the series of program switches 134 provided at that stop position, except as may be modified by the operator having manually depressed appropriate keys on the control keyboard 116.

From the above brief description of the preferred embodiment of the present invention illustrated in FIG. 3, it should be recognizable, even at this early stage of the description, that the present invention not only makes it possible to accumulate and store a greatly increased number of totals (because of the high capacity capability of a magnetic disc memory), but also, makes it possible to take advantage of electrical processing techniques to achieve multiplication, division, and other processing functions, as well as just accumulation. And, as will hereinafter be explained in detail, the structure and arrangement of the present invention is such that electrical processing is performed in a manner which permits full advantage to be taken of the existing mechanical operating capability, whereby a significant reduction in the complexity and expense of the electrical circuitry is achieved over that which would otherwise be necessary to provide the same computing capability. Further advantages are obtained in the present invention by choosing the magnetic disc memory 140 of FIG. 3 to be of the type disclosed in the commonly assigned copending patent application, Ser. No. 765,440, filed Oct. 6, 1958, now U.S. Patent No. 3,068,480, issued Dec. 11, 1962 which has the important characteristic that such a disc memory can be made quite inexpensively (using a single bearing for mounting the disc) while still being able to achieve high capacity magnetic storage, as well as convenient communication with the electrical operations unit 190.

Continuing with the basic description of the preferred embodiment of the present invention illustrated in FIG. 3, it will first be described how the FIG. 3 embodiment is capable of performing the same type of operations as performed by the FIG. 2 embodiment, following which, it will be explained how much more complex data processing operations (such as multiplication and division) may also be performed by the FIG. 3 embodiment because of its increased computing capability and flexibility.

It will be remembered from the previous description of the FIG. 2 embodiment that the constructional design of a stop 30 may be chosen so that when the carriage arrives at that stop position, machine operations may either be initiated automatically, or an opportunity may be given to the operator to enter an amount by way of the amount keyboard 15 before manually initiating machine operation by depressing a motor bar on the control keyboard. Such operations are also possible in the embodiment of FIG. 3 and may be accomplished in a like manner. It will also be remembered from the description of the FIG. 2 embodiment that during an early portion of the cycle of machine operations at a stop position, the differential actuators 11 may be set to a number in accordance with either an amount in the amount keyboard 15 (if the stop is one which permits entry of an amount by the operator), or in accordance with a total from a selected one of the totalizers 40, and it is this number to which the actuators 11 are set which may be printed out by the printer 19, if printing is called for by the stop constructional design. Similarly, in the FIG. 3 embodiment, the differential actuators 111 may be set at an early portion of the cycle of machine operations at a stop position to a number corresponding to an amount in the amount keyboard 15, or corresponding to a total in a selected storage location in the disc memory 140, and it is this number which may likewise be printed out by the printer 19.

If the differential actuators 111 are to be set in accordance with an amount in the amount keyboard 15, this operation may be accomplished in the FIG. 3 embodiment in the same manner as in FIG. 2. However, if the number to which the actuators 111 are to be set is a total from a selected storage location in the disc memory 140, this operation is accomplished in a different manner because of the different nature of the FIG. 3 embodiment. The manner in which such an operation is accomplished at a stop position is as follows: During an early portion of the machine cycle (and in response to an initiating signal supplied by the mechanical operations unit 150), the electrical operations causes the total stored in the selected storage location in the disc memory 140 (which selection is determined by the states of the program switches 134 or by the control keyboard 116) to be compared with an output 112*b* from an actuator encoder 112. The encoder output 112*b* represents the positioning of the actuators 111 as the mechanical output 150*e* from the mechanical operations unit 150 cycles the actuators 111 during the standard cycle of machine operations at each stop position. As a result of the comparison, the electrical operations unit 190 applies signals 190*a* to the actuator encoder 112 which act by means of mechanical outputs 112*a* to set the differential actuators 111 in accordance with the total in the selected storage location of the disc memory 140. Once the actuators 111 are set, the number set up therein may then be printed out in the same manner as in the embodiment of the aforementioned patents, the printing format (or non-printing) being determined by the stop constructional design, also in the same manner as in the FIG. 2 embodiment of the aforementioned patents.

Having generally described how the embodiment of FIG. 3 is able to set up the differential actuators 111 at an early portion of the cycle of operations at a stop position to a number supplied from either the amount keyboard 15 or from a selected storage location of the disc memory 140, it will now be described how the FIG. 3 embodiment is able to accomplish the further operation of the FIG. 2 embodiment which involves causing the number set up in the actuators 111 to be added to, or subtracted from the accumulated total stored in one or more selected ones of the totalizers 40. To accomplish this further operation in the FIG. 3 embodiment, the mechanical output 111*a* representing the number set up in the differential actuators 111 (as described above) is first converted by the actuator decoder 110 into an electrical output 110*a* for feeding to the electrical operations unit 190. Then, in response to a suitable initiating signal supplied by the mechanical operations unit 150, the electrical operations unit 190 extracts, in electrical form, the total stored in a first selected storage location of the disc memory 140, the selection being determined by the states of the program switches 134 at the stop position in which the carriage 25 resides, or by the operator having depressed appropriate keys on the control keyboard 116. The electrical operations unit 190 then causes the electrical output 110*a* of the actuator decoder (which represents the number set up in the actuators 111 during the machine cycle) to be electrically adapted to or subtracted from the total extracted from the first selected storage location in the disc memory 140, following which, the resultant total may either be returned to the same storage location (as is ordinarily desired), or to any other storage location, again determined by the states of the program switches 136 at the respective stop position (or by the control keyboard 116). After this resultant total has been put away in the desired storage location of the disc memory 140, the totals in any desired number of other selected storage locations to which it is desired to add, or subtract, the number set up in the actuators 111 during the cycle of operations at the same stop position may, in turn, be similarly extracted from the disc memory 140, the output 110*a* of actuator decoder 110 added to or subtracted therefrom, and the resultant total then returned to the same or some other storage location in the disc memory 140, the storage locations again being determined by the states of the program switches at that stop position (or by the control keyboard 116).

As in the FIG. 2 embodiment, towards the end of the cycle at each stop position, the actuators 111 are automatically returned to a home position, the carriage 25 is released to proceed to the next stop position (unless the stop constructional design indicates otherwise), and the machine is prepared for operations at the next stop position.

From the foregoing, it should be evident how the preferred embodiment of the present invention schematically illustrated in FIG. 3 is able to perform the same type of operations performable by the embodiment of the aforementioned patents—that is, as the carriage 25 travels across the machine during the performance of accounting operations using the embodiment of FIG. 3, the totals of particular items may be accumulated, and the accumulated totals printed out when desired in appropriate columns of the record form 10, in the same manner as in the embodiment of the aforementioned patent. It should also be evident from the foregoing description of FIG. 3 that since the numbers operated on are converted into electrical form, other types of arithmetic operations which can conveniently be performed electrically, such as multiplication or division, may also be performed instead of just addition or subtraction. Thus, in the present invention, whenever a more complicated arithmetic operation is desired to be performed, operation may be basically the same as described in FIG. 3 for addition or subtraction, except that instead of performing addition or subtraction on the numbers applied to the electrical operations unit 190, multiplication or division or any other arithmetic operation can conveniently be performed by providing appropriate electrical circuitry for this purpose. Furthermore, the particular type of arithmetic operation which it is desired be performed at each stop position may conveniently be programmed into each corresponding series of program switches 134 along with the other program required at that stop position. It will be understood, therefore, that the accounting device of the present invention permits multiplication or division to be performed automatically, without the aid of the operator. This is in contrast to the machine of the aforementioned patents, in which any required multiplication or division must be manually performed by the operator, either by hand, by the use of tables, or by the use of a separate calculator.

An additional advantage of the preferred embodiment of the present invention schematically illustrated in FIG. 3 resides in its further capability of being programmed at desired stop positions (by appropriately setting the corresponding program switches 134 thereat) so that the electrical operations unit 190 will examine any total or other number or numbers applied thereto, or generated thereby as a result of arithmetic operations, and in response to such an examination, will provide an electrical output 190*b* representative of the total, or other number or numbers examined. This electrical output 190*b* may then be fed to the mechanical operations unit 150 to actuate one or more conventional types of solenoids provided therein (not shown in FIG. 3) whose mechanical output (or outputs) may then be used, in cooperation with the mechanical output 27*a* from the front carriage sensing means 27, to permit the printing format and/or the carriage tabulation to be controlled. For example, the program switches 134 at a particular stop position may be programmed so that the electrical operations unit 190 will examine the resultant total of a particular arithmetic operation, and upon finding the result negative (indicating a credit balance), will provide an electrical output signal 190*b* to activate an appropriate solenoid in themechanical output unit 150, whose mechanical output acts to cause the carriage 25 to advance to a particular stop position at which appropriate action will be taken such as, for example, causing red printing of the credit balance in a credit balance column of the record form 10.

It is to be noted that in the accounting machine disclosed in the aforementioned patents, control of the carriage 25 and the printing format is also possible in response to the examination of a particular totalizer. However, because of the mechanical nature of the totalizers, the total which can be examined is most restricted so that only limited advantage can be taken of this feature in accounting operations.

Besides the features summarized above, still further and most important features of the present invention reside in the specific construction and arrangement of the electrical operations unit 190, as well as in the specific manner in which the differential actuators 111 and the electrical operations unit 190 in FIG. 3 are coupled to one another (by way of the actuator decoder 110 and the actuator encoder 112) so that the electrical circuitry required to perform the various arithmetic and other electrical operations is reduced to a minimum. Because of such features, the resultant accounting device is able to retain the essential simplicity and inexpensiveness of the machine disclosed in the aforementioned patents while offering high capacity storage, increased computing capabilities, and greater flexibility, ordinarily obtained only in much higher priced and more complex electronic computer systems.

Before beginning a more detailed consideration of the preferred embodiment of the invention illustrated in FIG. 3, it will be helpful to return momentarily to the perspective view of FIG. 1 in order to relate the FIG. 1 structure to FIG. 3. It will be remembered that the FIG. 1 structure was described as representing the external appearance of the keyboards and mechanical portions of a preferred embodiment of the present invention. Thus, it will now be understood from the previous description of FIG. 3 that the FIG. 1 structure may be considered to include all portions of the accounting device illustrated in FIG. 3, except for the operations unit 190 and the disc memory 140, which may be considered as being included in a separate structure (not shown in FIG. 1), which separate structure is electrically interconnected to the FIG. 1 structure by means of the electrical cable 29. As mentioned previously when FIG. 1 was first discussed, these two structures are preferably provided in close proximity to one another, and are preferably constructed and arranged so that the entire accounting device retains its desk-model form.

CONSTRUCTION AND OPERATION OF THE AMOUNT KEYBOARD 15, THE DIFFERENTIAL ACTUATORS 111, AND THE ACTUATOR DECODER AND ENCODER 110 AND 112 (FIGS. 4–7)

Having described the basic construction and operation of the preferred embodiment of the present invention using the schematic representation of FIG. 3, a more detailed description will now be given of the amount keyboard 15, the differential actuators 111, and the actuator decoder and encoder 110 and 112 using the cross-sectional, partially schematic views of FIGS. 4–6 and the auxiliary view of FIG. 7. The main purpose of this description will be to demonstrate how the differential actuators 111 may be set, at an early portion of machine operation at a stop position, to a number either in accordance with an amount in the amount keyboard 15, or in accordance with a total from a selected storage location in the disc memory 140 (FIG. 3). It will also be described how the resultant actuator settings are decoded into electrical form for use by the electrical operations unit 190. Initially, it may be noted that FIG. 4 illustrates a carriage stop 30 on fixed form bar 31, a typical carriage sensing means 27, a type sector 13 (FIG. 1), and a record form 10 in rotatable platen 20, all of which were previously discussed.

Before considering FIGS. 4–7 in detail, it is to be understood that these figures represent greatly simplified views of a cross section of the mechanical portion of the accounting device of the present invention, which cross section will be seen to be basically similar to that shown and described in detail in the aforementioned Patent No. 2,930,523 (and most particularly in FIG. 5A thereof), except that the totalizer wheels and associated mechanisms are no longer needed, since these functions (as pointed out previously) are performed in the present invention by the disc memory 140 and the electrical operations unit 190 in FIG. 3. Consequently, while much of the miscellaneous mechanical structure is not shown in FIGS. 4–7, the important basic mechanical structure which is necessary to a complete understanding of the present invention is shown in FIGS. 4–7, and a brief description thereof will now be given in order that the various modifications of the machine which may be made in accordance with the present invention may be fully understood. For further details, reference may be had to the disclosures of the aforementioned patents.

Figures 4, 7:
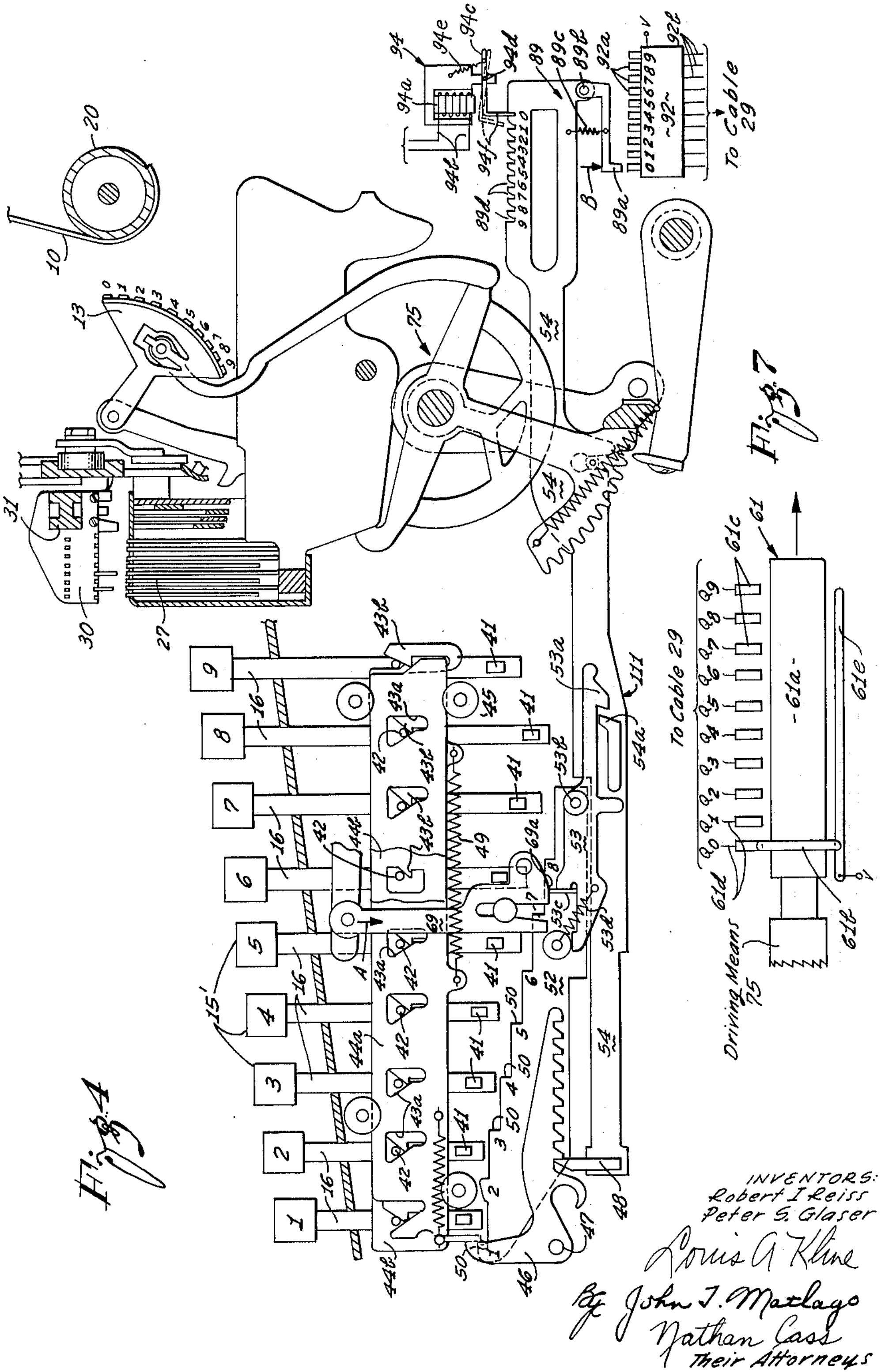
FIGS. 4–6 are partial, cross sectional views of the accounting device of FIG. 1 taken just to the right of a row of amount keys, and will be used to illustrate how a typical differential actuator may be set to a number in accordance with a depressed key in a respective row of the amount keyboard, or in accordance with a number from a selected location in the disc memory.
FIG. 7 is a view of a portion of the accounting device of the present invention illustrating how electrical indications are provided corresponding to the position of the mechanical driving means which drives the actuator during each cycle of machine operation at a stop position.
Figures 5, 6:
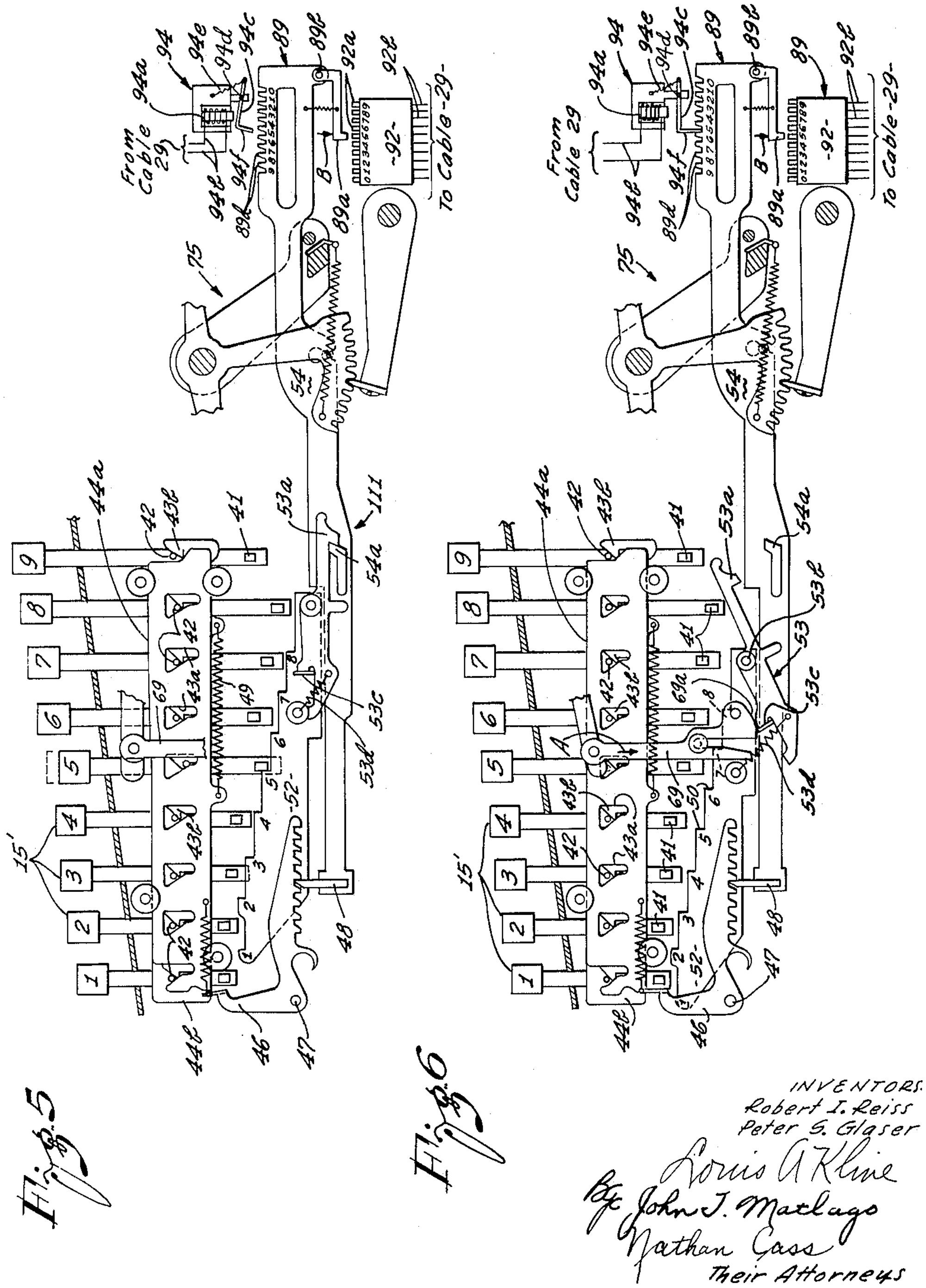

Inasmuch as each denomination row of amount keys of the amount keyboard 15 is identical with the other, only a single typical row of keys 15' and the respective differential actuator 111 corresponding thereto (comprised of portions 52, 53, and 54) are shown on FIGS. 4–6. For convenience of illustration and as an aid to a better understanding of FIGS. 4–6, the amount keys 15' and various portions of the differential actuator 111 have been numbered in accordance with the decimal digit values (0, 1, 2, . . . 9) represented thereby, it being understood that such decimal numbers ordinarily appear only on the top of the keys 15' in each row.

In considering the structure illustrated in FIGS. 4–7 it will first be explained how the typical differential actuator 111 shown therein is capable of being set to a position corresponding to a depressed key 15'. As shown in FIG. 4, each key 15' includes a stem 16 having a stud 41 located on the downwardly projecting portion of the stem 16, and a pin 42 located near the center of the stem 16. Diagonal-walled cam slots **43*a* and 43*b* (best shown in FIG. 4) are provided in latching slides 44*a* and 44*b*, respectively, so that when one of the amount keys 15' is depressed, the pin 42 of the depressed key, in its downward movement, rides on cam slot 43*a* so as to force slide 44*a* to the left against the action of spring 49. After the upper surface of the pin 42 passes beyond the projecting nose of slot 43*b* of latching slide 44*b*, the spring 49 returns latching slide 44*a* a slight distance back to the left to latch the nose of slot 43*b* over the pin 42. The result is that the pin 42 of the depressed key is locked in its depressed position, as shown for key #5. Depression of another amount key 15' after one key has already been depressed causes the pin 42 of the former to shift slide 44*a* to the right again, which releases the formerly depressed key, thereby providing what is termed in the art as "flexible bank construction." Thus, the depression of a second key 15' in a row which already has a key depressed causes any previously depressed key to be released, while the newly depressed key 15'** is locked in place.

Still referring to FIG. 4, as a further result of a depressed key 15' being locked into place and slide **44*a* being forced to the left by pin 42 of the depressed key, zero-stop pawl 46 integrally connected to slide 44*a* is caused to be rotated in a counter clockwise direction about its pivot 47 against the action of spring 51, thereby releasing block 48 which forms an integral part of the differential actuator 111 of the typical amount row shown in FIG. 4. Thus, when the machine operation cycle is initiated at a stop position by the operator depressing a motor bar (5*a*, 5*b*, or 5*c* in FIG. 1), the typical differential actuator 111 in FIG. 4 (which for this part of the description may be considered as a single piece comprised of portions 52, 53, and 54) will be free to be driven by driving means 75 towards the rear of the machine (that is, to the right in FIG. 4) until a respective and like numbered shoulder 50 of portion 52 of the actuator 111 engages the stud 41 of the depressed key 15' in each respective row, thereby positioning each actuator 111 in accordance with the particular amount key 15' that has been depressed, as illustrated in FIG. 5 for key #5. Since each amount row is provided with a differential actuator 111 in the same manner as illustrated for the typical row in FIGS. 4 and 5, initiation of machine operation will result in causing each differential actuator 111 to be driven by the common driving means 75 to a lateral position representative of the particular key 15' which is depressed in its respective row. The lateral positions of all of the differential actuators will thus represent the amount entered into the amount keyboard 15** at that stop position.

As mentioned in the previous paragraph, the drive means, generally indicated by the numeral 75 in FIGS. 4–7, is the common means which is capable of driving the differential actuators in unison to the right after the initiation of machine operation at the stop position in which the carriage 25 (FIGS. 1 and 3) resides. Such drive means 75 may be considered as included within the mechanical operations unit 150 in FIG. 3, the coupling to the actuators 111 being represented in FIG. 3 by the mechanical output **150*e* therefrom. The specific manner in which the drive means 75 is constructed and arranged as well as the specific manner in which coupling is made to the actuators 111 are described in considerable detail in the aforementioned patents and will not be repeated herein. It will be sufficient merely to note that portion 54 of each differential actuator 111 may be coupled to drive means 75 in the same manner as disclosed in the aforementioned patents so that, during the cycle of machine operations at a stop position, portion 54 of each differential actuator 111 is spring-urged by drive means 75 to the rear of the machine during the first portion of the cycle so as to permit setting the actuators 111 to a lateral position in accordance with either an amount set up in the amount keyboard 15 (as described above and illustrated in FIG. 5), or in accordance with a total from a selected storage location in the disc memory 140 (to be described later in connection with FIG. 6.). The resultant lateral positioning of each differential actuator 111 is then transmitted to a respective type sector 13 of printer 19 (FIG. 3) by suitable linkages so as to permit the decimal digit represented by the lateral positioning of each actuator 111 to be printed out on record form 10, which may be in the same manner as described in the aforementioned patents. Towards the end of the cycle, after the actuators have been decoded into electrical form (as will next be described), and after printing has taken place (if called for by the stop constructional design), driving means 75 then acts to restore each actuator 111** back to its home position, as illustrated in FIG. 4.

Having generally described how a typical differential actuator 111 is set to a lateral position in accordance with a depressed amount key 15' (as illustrated in FIG. 5), it will not be explained how the lateral positioning of each differential actuator is decoded into electrical form so as to achieve the function previously described for the actuator decoder 110 in FIG. 3. Referring again to FIG. 4, it will be seen that the extreme right end of each differential actuator 111 is provided with an integral decoder-encoder member 89 having on its lower half, a decoder arm 89a rotatable about pivot 89b and normally retained in the position shown in FIG. 4 by the action of spring 89c. Cooperating with arm 89a is a switch assembly 92 having a plurality of push button-type switches 92a and a plurality of respective lead wires 92b, the latter being connected to the electronic operation unit 190 by way of cable 29. A similar switch assembly 92 is provided in each amount row, each of which may be of well-known construction such that if a particular switch 92a is depressed (downward in FIG. 4) it will remain depressed and cause the voltage V applied to the switch assembly 92 to be applied to a respective lead wire 92b. Preferably, the switch assembly 92 (similar to the amount keyboard 15) is of flexible bank construction so that only one switch 92a may be closed at a time, the depression of a second switch automatically releasing a previously depressed switch.

The positioning of the switches 92a with respect to arm 89a is such that arm 89a will always be in a position to depress a switch 92a which corresponds to the same decimal digit as represented by the lateral position of the differential actuator, as illustrated, for example, for the decimal digit #5 in FIG. 5. Thus, once the actuator 111 is set to a particular lateral position representing a decimal digit, the same decimal digit may be transferred to switch assembly 92 simply by causing decoder arm 89a to be rocked counterclockwise in FIG. 4 (as indicated by arrow B) about pivot 89b to depress and close the switch 92a above which arm 89a resides, which switch 92a will then necessarily correspond to the same decimal digit as represented by the lateral position of the actuator. The rocking action of arm 89a which closes the switch 92b over which the arm 89a is above is preferably caused to occur at the same time that printing is to take place so that the actuators may be returned to home position by the mechanical operating unit 150 (FIG. 3) during the latter portion of the cycle without having to wait for other operations to be completed. The switch assembly 92 in each row will then store the actuator settings for the remainder of the cycle for suitable processing by the electrical operations unit 190, as will hereinafter be described. It should now be evident, therefore, that the actuator decoder 110 previously described in connection with FIG. 3 may be considered as being comprised of the portions in each row typified in FIG. 4 by the switch assembly 92 and the lower half of member 89 including decoder arm 89a.

It should now be apparent from the foregoing description of FIGS. 4 and 5 how each differential actuator 111 may be set at an early portion of machine operation at a stop position to a lateral position corresponding to the decimal digit represented by the depressed key in each respective row and, further, how the decoder-encoder member 89 of each actuator serves to convert the lateral positioning of each actuator into a respective electrical indication for feeding to the electrical operations unit 190 (FIG. 3). With this previous description as a basis, it will next be explained, using FIGS. 6 and 7 how the differential actuators 111 may be set to a number in accordance with a total from a selected storage location in the disc memory 140 (FIG. 3). It will be remembered that such a situation occurs when the carriage 25 arrives at a stop position which is programmed to permit the automatic initiation of machine operation thereat, in which case, the amount keyboard 15 is ignored and the differential actuators 111 are set in accordance with a total from a selected location in the disc memory 140. It should be noted that the same actuator decoder 110 (represented in FIG. 4 by switch assembly 92 and the lower half of member 89 including decoder arm 89a) is used for decoding the actuators 111 regardless of whether they are set in accordance with the amount keyboard 15, or, as will now be described, in accordance with a selected storage location in the disc memory 140. Thus, the description of the actuator decoder 110 need not be repeated.

However, it will be necessary for this part of the description relating to the manner in which the differential actuators 111 are set in accordance with a total from a selected storage location in the disc memory 140 (FIG. 3) to consider the construction of the typical differential actuator 111 shown in FIG. 4 in somewhat more detail. It will be seen in FIG. 4 that, as briefly pointed out previously, the differential actuator is comprised of the three portions 52, 53 and 54 which will be more specifically referred to as the amount portion 52, the disengaging portion 53, and the driven portion 54. The amount portion 52 is that portion of the actuator 111 which is provided with shoulders 50 capable of cooperating with the studs 41 and like-numbered keys 15' in order to laterally position the actuator 111 in accordance with a depressed key 15', as described previously. The driven portion 54 of the actuator 111 is that portion which is driven to the right in FIG. 4 by driving means 75, as also described previously. The engaging portion 53 is pivotally affixed to portion 52 and is that portion of the actuator 111 which causes portions 52, 53 and 54 to remain engaged during the previously described operation where it is desired that the actuator 111 be laterally positioned in accordance with a depressed key 15'. More specifically, during such operation, engaging portion 53 is caused to remain in the position shown in FIG. 4 so that, when driven portion 54 is driven to the right in FIG. 4 by driving means 75, lever member 53a (of disengaging portion 53) coacts with block 54a (of driven portion 54) to cause portions 52 and 53 to be driven to the right along therewith, as illustrated in FIG. 5.

On the other hand, when the carriage 25 arrives at a stop position at which it is desired that each actuator 111 be laterally positioned in accordance with a respective decimal digit of a total from the disc memory (instead of in accordance with a depressed key in the respective row of the amount keyboard), the driven portion 54 of the actuator 111 is separated from portions 52 and 53 so that only portion 54 moves. This separation is accomplished by causing member 69 in FIG. 4 to be driven downward in the direction of the arrow A, whereupon (as shown in FIG. 6) cam surface 69a of member 69 acts on adjacent flange 53c of engaging portion 53 to cause portion 53 to be rotated about pivot 53b against the bias of spring 53d (which ordinarily retains engaging portion 53 in the position shown in FIG. 4). As a result, member 53a of engaging portion 53 is moved out of the path of block 54a of driven portion 54 so that, when portion 54 is driven to the right in FIG. 4 by driving means 75, block 54a is able to pass under lever member 53a. Thus, portions 52 and 53 of the actuator 111 will not be pulled along with driven portion 54, but will remain in their zero position, as illustrated in FIG. 6. It should be noted that in order to permit driven portion 54 to be freed for driving by driving means 75 even though no key 15' has been depressed, the movement of member 69 downward is also caused to release the zero-stop lever and free block 48 of portion 54 in the same manner as if a key 15' were depressed. It should also be noted that even if a key 15' were depressed, it would have no effect in this type of operation, since the amount portion 52 remains fixed in its zero position, as shown in FIGS. 4 and 6.

It should now be apparent from the foregoing description that when the carriage 25 arrives at a stop position programmed for automatic operation, the settings of the amount keyboard 15 are ignored and only the driven portion 54 of each actuator 111 is freed to be driven by driving means 75. The manner in which each differential actuator 111 is then caused to be stopped in a lateral position in accordance with a respective decimal digit of a total from a selected location in the disc memory 140 will now be explained with reference to the typical actuator 111 shown in FIGS. 4 and 6 and the associated structure schematically illustrated in FIG. 7. Referring again to the extreme right end of the actuator 111 in FIG. 4, it will be seen that each decoder-encoder member 89 (which was previously considered in explaining how the lateral positioning of each actuator 111 is decoded into electrical form using decoder arm **89*a* on the lower half thereof) also includes, on the upper half thereof, a plurality of notches 89*d* which are numbered (in a manner similar to the numbering of switch contacts 92*a* and their associated lead wires 92*b*) so that each represents a decimal digit corresponding to a respective lateral position of actuator 111. Cooperating with these notches 89*d* is a solenoid means 94 (schematically illustrated in FIG. 4) comprising a solenoid 94*a* having a winding 94*b*, and a movable finger 94*c* rotatable about a pivot 94*d*, and normally biased by spring 94*e* in a direction so that the hook 94*f* of finger 94*c* is normally in the de-energized position shown by the solid line representation thereof in FIG. 4. This solid line representation of finger 94*c* and hook 94*f*, thus, indicates its position when no energizing signal is applied to winding 94*b*, while the dashed representation of finger 94*c* and hook 94*f* in FIG. 4 indicates the position thereof when an energizing signal is applied to winding 94*b*. The positioning of the notches 89*d* with respect to the hook 94*f* is such that the hook 94*f* will always be in a position to engage a notch 89*d* which corresponds to the same decimal digit as represented by the lateral position of the differential actuator 111. For example, it will be seen in FIG. 4 that the hook 94*f* is in engagement with the notch 89*d* corresponding to the decimal digit #0, which is in agreement with the decimal digit represented by the lateral position of the actuator 111, as well as being in agreement with the decoder arm 89*a* which is above the #0 switch 92*a*. Similarly, in FIG. 6, the hook 94*f* will be seen to be in engagement with the notch 89*d* corresponding to the decimal digit #5, which is also in agreement with the decimal digit represented by the lateral position of the actuator 111, as well as with the decoder arm 89*a*. Also, it is to be noted in FIG. 5 that although the solenoid means 94 plays no part in the type of operation illustrated in which the actuator 111 is shown to be set to a lateral position in accordance with the depressed key #5 (the hook 94*f* being kept clear of notches 89*d* during such operation), the hook 94*f* is still in a position so that it would be capable of engaging the notch 89*d* corresponding to decimal digit #5, in agreement with the lateral position of the actuator 111**.

Thus, it should be apparent from the previous paragraph that for any position of the differential actuator 111, the hook **94*f* of finger 94*c* will be in a position so as to be capable of engaging the particular notch 89*d* corresponding to the same decimal digit as represented by the lateral position of the actuator 111. With this knowledge in mind, the manner in which differential actuators 111 are set in accordance with a total from a selected storage location in the disc memory 140 (FIG. 3) may now be explained in a relatively simple manner with additional reference to FIG. 7. First, the solenoid means 94 in each row is initially energized by a signal provided (by way of cable 29 in FIG. 1) from electrical operations unit 190 (FIG. 3) so as to cause the hook 94*f* to be lifted clear of the notches 89*d*, as illustrated by the dashed representation of the finger 94*c* and hook 94*f* in FIG. 4. Then, when member 69 moves downward to effectively separate portions 52 and 53 of each actuator 111 from portion 54 (as described previously) and concurrently frees block 48 from zero-stop lever 46, driven portion 54 will be free to be driven (to the right in FIG. 4) by driving means 75**.

The lateral position of the driven portions 54 of all of the actuators 111 as they are driven in unison by driving means 75 is conveniently determined by the arrangement schematically illustrated in FIG. 7 in which an auxiliary assembly 61 is provided having a member **61*a* connected to driving means 75 so as to move in unison therewith. A wiper ring 61*b* attached to member 61 and insulated therefrom is then able to cooperate with a plurality of switch contacts 61*c* so that (in a manner similar to hook 94*f* and arm 89*a* in FIG. 4) wiper arm 61*b* will always be in a position so as to contact the particular switch contact 61*c* corresponding to the same decimal digit as represented by the position of the driving means 75. Thus, as the portions 54 of the actuators 111 are being driven (to the right in FIGS. 4 and 7) wiper arm 61*b* will sequentially connect each switch contact 61*c* to strip contact 61*e* (which in turn is connected to voltage V) in synchronism with the decimal digit position represented by driving means 75, the results of which are fed by lead wires 61*d* as signals $Q_0$, $Q_1$, . . . $Q_9$ to electrical operations unit 190 (FIG. 3) by way of cable 29 (FIG. 1). The electrical operations unit 190 then compares the output of assembly 61 with each of the decimal digits of the selected total from the disc memory to which it is desired that the actuators be set. Each time driving means 75 arrives at a position corresponding to a decimal digit of the selected total, the electrical operations unit 190 recognizes the condition from the voltage V appearing at the respective Q output of assembly 61 and in response thereto de-energizes the solenoid means 94 (FIG. 4) of the amount row which represents the same decimal digit as the selected total (each amount row corresponding to a respective decimal digit of the total). As a result, the hook 94*f* of the de-energized solenoid means 94 will drop and engage the particular notch 89*d* it happens to be opposite at that time, which notch 89*d* will correspond (in accordance with the previous discussion) to the same decimal digit as represented by the lateral position of the driving means 75**, which in turn will correspond to the respective decimal digit of the selected total.

As an example, FIG. 6 illustrates the situation where the hook **94*f* (as a result of a comparison such as described in the previous paragraph) has been dropped in the #5 notch 89*d*, thereby causing the driven portion 54 of actuator 111 to be set to a lateral position corresponding to the decimal digit #5, and the decoder arm 89*a* to be set above the #5 switch contact 92*a*. As another example, if the respective decimal digit to which the actuator 111 in FIG. 4 is to be set is #0, the electrical operations unit 190 will cause hook 94*f* to be dropped before portion 54 of actuator 111 is driven any significant distance, thereby assuring that the dropped hook 94*f* will catch the #10 notch 89*d* to retain the portion 54 of actuator 111, as well as decoder arm 89*a***, in the decimal digit #0 position.

With the hook **94*f* in each row having been dropped in a respective notch 89*d* in accordance with a respective decimal digit, as described above, each hook 94*f* will remain so engaged at least until the time for printing has occurred, during which the setting of each actuator 111 is transferred to its respective switch assembly 92 in the same manner as described previously. Thereafter, each solenoid means 94 is energized to remove its hook 94*f* from the notch 89*d* into which it was caused to fall, permitting driving means 75 to return each portion 54 back to its zero or home position as shown in FIG. 4 during the latter portion of the machine cycle. Each solenoid means 94 is then de-energized, again, causing its hook 94*f* to fall into the #0 notch 89*d*, as indicated by the solid line representation of finger 94*c* and hook 94*f* in FIG. 4. Also, member 69 is returned to its original position as shown in FIG. 4 sometime after block 54*a* of portion 54 has passed under lever 53*a* of engaging portion 53, the block 54*a* slipping under lever 53*a* again when portion 54** is returned to its home or zero position.

From the foregoing, it should now be evident that just as the actuator decoder 110 in FIG. 3 was shown to be represented by the lower half of encoder-decoder member 89 in FIG. 4 including decoder arm **89*a*, switch contacts 89*b* and lead wires 89*c*, the actuator encoder 112 of FIG. 3 can similarly be shown to be represented in each row by the upper half of encoder-decoder 89 in FIG. 4, including the notches 89*d* and the solenoid means 94 and the auxiliary member 61 of FIG. 7. It is, of course, to be noted as briefly mentioned earlier, that the solenoid means 94 necessarily remains energized during the type of operation illustrated in FIG. 5 where each actuator 111 is set in accordance with a depressed key 15'. This is done in order to keep the hook 94*f* clear of the notches 89*d* since, in such operation, each actuator 111 is to be set only by the depressed key 15'** in each respective row.

It should further be noted that, regardless of whether the actuators 111 are set in accordance with an amount in the amount keyboard or in accordance with the total from a selected storage location in the disc memory 140, printing of the number set up in the actuators 111 onto record form 10 and transfer of each actuator setting to its respective switch assembly 92 occurs in the same manner as indicated previously, following which, each actuator 111 is returned to its zero or home position as shown in FIG. 4. The carriage 25 is then ordinarily released from the stop position in which it resides, and permitted to advance to the next stop position at which operations are to be performed.

Before leaving this portion of the description which is concerned with FIGS. 4–7, a final point may be noted, namely, that it is not essential that each differential actuator 111 be separable as has been described herein. If separation were not provided, such as might occur if the non-separable form of construction shown in FIG. 3A of the aforementioned Patent No. 2,626,749, were to be used (instead of the separable construction of FIG. 5A of aforementioned Patent No. 2,930,530) it would then be necessary, upon initiation of an automatic machine cycle where the amount keyboard settings are to be ignored, to prevent any depressed key in a row from engaging the amount portion of the actuator which would necessarily move along with the rest of the actuator if separability were not provided. This could be prevented simply by causing any depressed amount keys to be automatically reset whenever this type of automatic operation is to take place at a stop position. While such non-separable construction (as pointed out above) could be used for each actuator, it is of very considerable advantage to use the separable construction described herein, since it permits an amount to be set up on the amount keyboard 15 at the beginning of an accounting operation (or at some intermediate point) and to remain there unused while the carriage 25 advances to perform the operations required at one or more automatic stop positions. Then, when the carriage 25 arrives at the stop position which is to use the amount set up in the amount keyboard 15, operation at that stop position may proceed automatically without the operator having to enter the amount, since it will already be available in the keyboard 15, and the carriage may then automatically advance to any number of automatic stop positions following the stop position which required the amount, all without the aid of the operator. The possible savings in time is obvious. Furthermore, the arrangement of the stops and the programming thereof for the performance of a particular accounting operation may be such as to make the most advantageous use of this capability.

BASIC CONSTRUCTION AND OPERATION OF THE ELECTRICAL OPERATIONS UNIT 190 AND THE DISC MEMORY 140 (FIGS. 8–14)

Having described the pertinent mechanical portions of the present invention, a more detailed consideration of the basic construction and arrangement of the electrical operations unit 190 and the disc memory 140 of FIG. 3 will now be presented. As pointed out previously, these portions will be described in connection with schematic showings in the drawings which should be quite adequate, in view of the state of the computer art, to permit those skilled in the art to readily practice the present invention and achieve the features and advantages thereof. In this connection it is to be noted that the present invention resides essentially in the combination of already known types of electrical circuitry, each of which by itself can readily be provided by those skilled in the art. For this reason details of electrical circuitry will not ordinarily be shown except as may be necessary or desirable to provide a complete and full understanding of the present invention.

Figure 8:
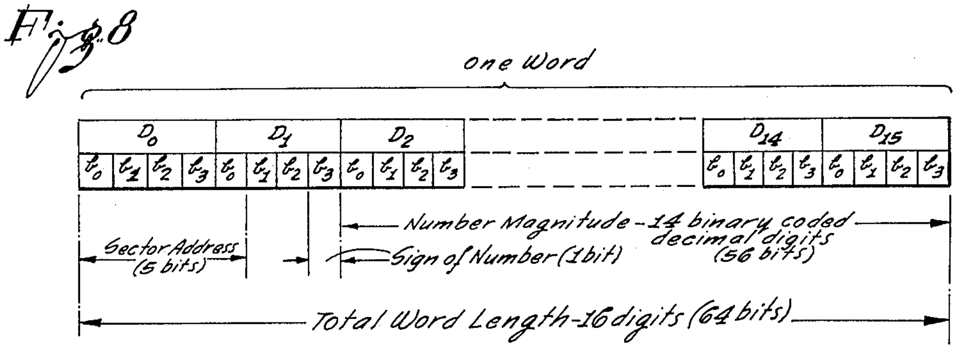
FIG. 8 is a schematic diagram illustrating a typical basic word format which may be used in the accounting device of the present invention.

Initially, it will be helpful to refer to FIG. 8 which illustrates the typical basic word format which may be used in the embodiment of the present invention being described herein. As is well known, a word designates nothing more than a group of information which may conveniently be considered as a unit for data processing operations. As will be seen in FIG. 8, the typical word illustrated therein has a word length of 64 binary bits $D_0b_0$–$D_{15}b_3$ divided into the 16 decimal digits $D_0$–$D_{15}$, each decimal digit being made up of the four bits $b_0$, $b_1$, $b_2$, and $b_3$. As further shown in FIG. 8, the word $D_0b_0$–$D_{15}b_3$ is also divided into the following portions: (a) an address portion comprised of the five bits $D_0b_0$–$D_1b_0$ (which as will hereinafter be described represents in binary form the address of one of the twenty sectors into which the disc of the disc memory 140 is divided), (b) a number magnitude (that is, the absolute value of a number) comprised of the 56 bits $D_2b_0$–$D_{15}b_3$, and (c) a one-bit sign comprised of bit $D_1b_3$ representing the sign of the number whose magnitude is represented by bits $D_2b_0$–$D_{15}b_3$. The remaining bits $D_1b_1$ and $D_1b_2$ are not needed in the preferred embodiment of the present invention and may therefore be considered as unused and of no consequence for the remainder of this description.

Figure 9:
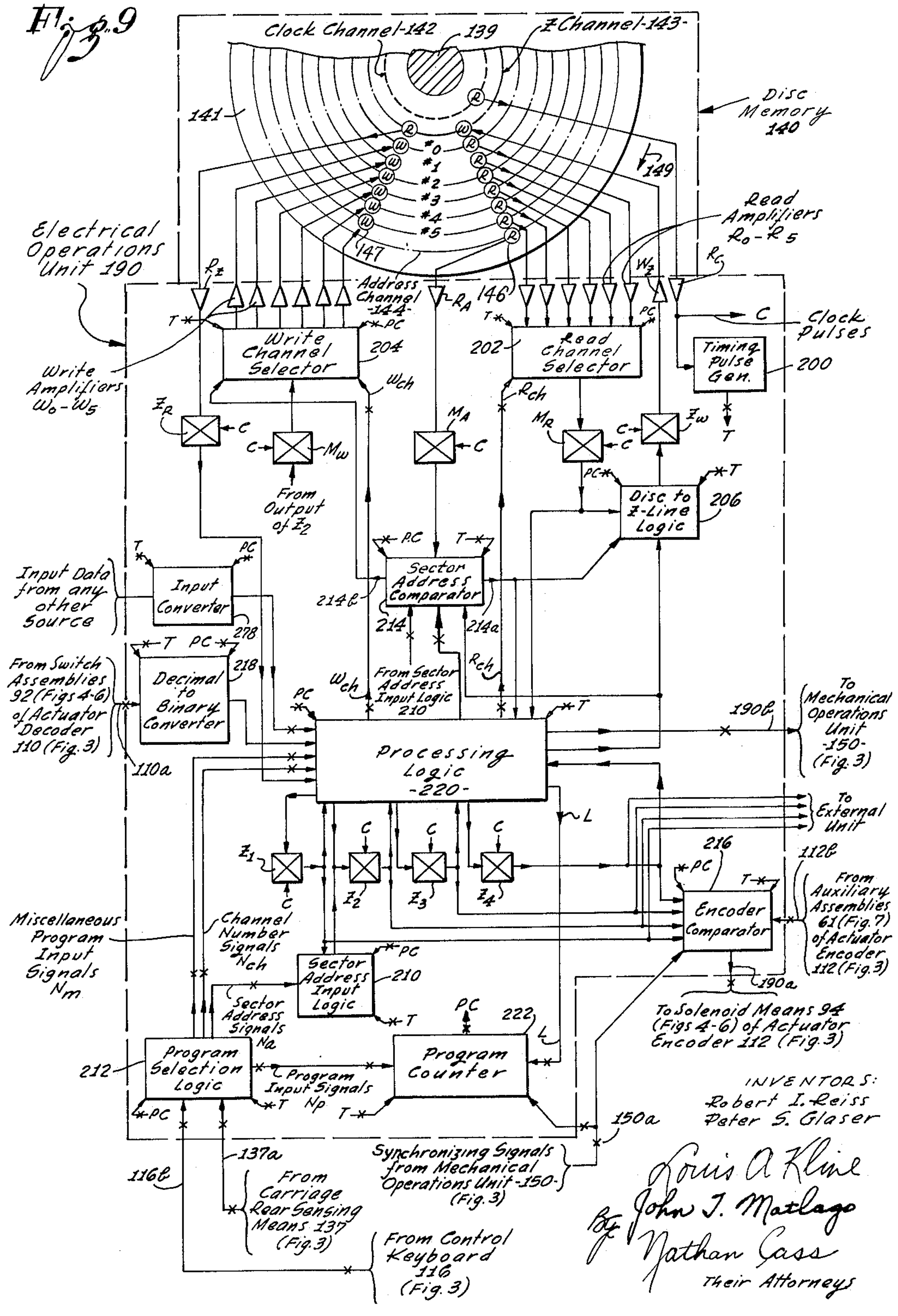
FIG. 9 is an electrical block diagram illustrating the construction and arrangement of the electrical operations unit 190 and the disc memory 140 of FIG. 3.

Turning now to FIG. 9, a schematic diagram is shown of the overall construction and arrangement of the electrical operations unit 190 and the disc memory 140 which were broadly shown in block form in FIG. 3. The disc memory 140, as pointed out previously, is preferably of the type disclosed in the commonly assigned copending patent application Ser. No. 765,440, filed Oct. 6, 1958, now U.S. Patent No. 3,068,480, issued Dec. 11, 1962 and, in a like manner, comprises a disc 141 affixed to a drive shaft 139, which rotates the disc 141 in a clockwise direction as indicated by the arrow 149. For the purpose of this description, it may conveniently be assumed that the disc 141 is divided into twenty sectors $S_0$ to $S_{19}$ and nine channels, as broadly shown in FIG. 10, each sector of each channel being in turn divided into 64 bit storage areas so as to correspond to the 64 bits of the basic word shown in FIG. 8. Referring to FIG. 9, the make-up of the nine channels is as follows: (a) a permanently recorded clock channel 142 chosen to provide exactly 1280 output pulses per disc revolution, which is 64 output pulses per sector, (b) a Z-channel 143 to be used along with flip-flops $Z_R$, $Z_1$, $Z_2$, $Z_3$, $Z_4$, and $Z_W$ to form a recirculating Z-line, as will hereinafter be described, (c) six information channels #0 to #5, each of which is capable of storing a word in corresponding bit storage areas in each of the twenty sectors $S_0$–$S_{19}$ (FIG. 10) around the disc, thereby giving each of the six information channels a storage capacity of twenty words and the disc memory 140 an overall storage capacity of 120 words (so as to be able to store 120 totals), and (d) a permanently recorded address channel 144 in which there is recorded in each of the twenty sectors $S_0$–$S_{19}$ only the respective sector address number in the address portion thereof—that is, each of the twenty sectors $S_0$–$S_{19}$ of the channel 144 has permanently recorded therein, in binary form, the respective sector address number in those areas of each sector corresponding to bits $D_0b_0$–$D_1b_0$ of the typical word shown in FIG. 8.

Hereinafter, the 64 bit storage areas in each sector of the information channels #0–#5 will be referred to by the designations $I_0b_0$–$I_{15}b_3$ in order to distinguish them from the words recorded therein, which words will be designated as $D_0b_0$–$D_{15}b_3$ as in FIG. 8, or with other letters for the decimal digits such as $A_0b_0$–$A_{15}b_3$, $B_0b_0$–$B_{15}b_3$, $C_0b_0$–$C_{15}b_3$, etc. For example, the word $D_0b_0$–$D_{15}b_3$ when recorded in a sector of an information channel will be recorded in respective bit areas $I_0b_0$–$I_{15}b_3$ of the sector. The five permanently recorded bits in each sector of the address channel 144 which represent the sector address number will hereinafter be designated as $Y_0b_0$, $Y_0b_1$, $Y_0b_2$, $Y_0b_3$ and $Y_1b_0$.

Still referring to the disc memory 140 shown in FIG. 9, the above described channels on the disc 141 are provided with conventional read and/or write heads for reading and/or writing into the channels. A read head is designated by an R-labeled circle in the path of the channel, while a write head is designated by a W-labeled circle, such as the read head 146 and the write head 147 of information channel #5. The clock channel 142 and the address channel 144 are provided only with read heads, since the data in these channels is intended to be permanent and no writing is to be performed therein. The remaining channels—that is, the 6 information channels #0–#5 and the Z-channel—each include both read and write heads in order to permit both reading and writing to take place. For clockwise rotation of the disc 141 (as indicated by the arrow 149 in FIG. 9), the positioning of the read and write heads in each of the information channels #0–#6 is such that the read head will precede the write head, the spacing therebetween being chosen so that the write head will be exactly one word period behind the read head. In the Z-channel, the positioning of the read and write heads is reversed. The spacing between the read and write heads of the Z-channel being chosen to be six bits less than a word period in order to permit the Z-channel 143 to serve as a portion of a recirculating Z-line as will hereinafter be explained.

Turning now to the electrical operations unit 190 shown in FIG. 9, it will be seen that each read and write head of the disc memory 140 is associated with a conventional corresponding read or write amplifier in the electrical operations unit 190, each amplifier being represented in FIG. 9 by an open arrow pointed in the direction of signal flow. More specifically, read amplifiers $R_C$ and $R_A$ are provided for the read heads of the clock channel 142 and the address channel 144, respectively, read amplifiers $R_0$–$R_5$ and write amplifiers $W_0$–$W_5$ are provided for the respective information channels #0–#5, and read amplifier $R_Z$ and write amplifier $W_Z$ are provided for the Z-channel 143.

The output of the clock read amplifier $R_C$ provides the clock pulses C for the system. For a typical disc speed of 1800 revolutions per minute, the 1280 clock pulses permanently recorded in the clock channel 142 will occur at approximately 26 microsecond intervals, representing a clock frequency rate of approximately 38.4 kilocycles per second. As will hereinafter be explained, the clock pulses C are fed to the flip-flops in the unit 190 in order to control the switching thereof. The clock pulses C are fed also to a timing pulse generator 200 for the purpose of generating a series of timing signals, represented by the letter T in FIG. 9, for use in controlling the time of operation of various portions of the logic, as well as for controlling the advancement of the program, as will also be described hereinafter.

Before proceeding further with the description of the electrical operations unit 190 in FIG. 9, it will be helpful to point out a number of conventions with regard to the significance of some of the schematic representations employed in FIG. 9. First it is to be noted that each separately shown flip-flop in FIG. 9, such as for example flip-flops $M_A$ and $Z_2$, are represented by a box having an "X" therein. Thus, $M_W$, $M_A$, $M_R$, $Z_R$, $Z_1$, $Z_2$, $Z_3$, $Z_4$, and $Z_W$ in FIG. 9 are all flip-flops. The flip-flops are preferably of the well-known type, such that the application of each clock pulse C thereto, causes the logical signal appearing at the input of the flip-flop to set the flip-flop in accordance therewith in response to the removal of each clock pulse—that is, in response to the trailing edge of each clock pulse C. Or stated another way, during each bit period (which is the period between clock pulses) the state of each flip-flop will have been set in accordance with the logical signal which was present at the input to the flip-flop during the previous bit period. Thus, it will be understood that each of these flip-flops transfers binary data therethrough with a delay of one bit period.

The second point to note in connection with the schematic representation of FIG. 9 is with regard to the manner in which input signals are applied to the portions shown in the form of rectangular blocks—namely, the timing pulse generator 200, the read and write channel selectors 202 and 204, the disc to Z-line logic 206, the sector address input logic 210, the program selector logic 212, the sector address comparator 214, the encoder comparator 216, the decimal to binary converter 218, the processing logic 220, the input converter 278 and the program counter 222. Each of these rectangular blocks represents an appropriate combination of logical circuits (including flip-flops in some) for converting, processing, comparing, and/or controlling the flow of data, or for generating control signals for controlling the performance of predetermined operations. The input signal notation used for each such rectangular block will now be described.

Considering, information data input signals first, these are applied to a rectangular block so as to be perpendicular to one of the sides thereof as shown, for example, by the information data signal applied to the write channel selector 204 from the output of flip-flop $M_W$. Control signals, on the other hand, which are not information data, but merely determine the type of operations to be performed in a rectangular block (such as the PC signals), or control the time at which operations are to occur (such as the T signals), are applied at the corner of each rectangular block unit as shown, for example, by the PC and T signals applied to the sector address comparator 214.

As far as outputs from the rectangular blocks are concerned, both control signals and information data signals are shown as emanating perpendicularly from a side of each block. However, those outputs which are control signals may be recognized by noting whether they are fed to a corner, or perpendicularly to a side of another block.

As far as both input and output signals are concerned, it is to be further noted that an "X" is provided on some of the input and output lines, such as for example, the PC and T lines. This is done in order to indicate that each such "X" marked line may represent a plurality of electrical lead wires as well as just a single line; all of the other input and output signal lines in FIG. 9 which are not marked with an "X" represent only a single electrical lead wire such as, for example, the input and output lines applied to the Z flip-flops. Also, it is to be understood that similarly designated "X" marked lines (such as the PC and T lines) may represent different combinations of lead wires, since the main purpose of such "X" marked lines in FIG. 9 is to indicate their origin rather than any specific combination thereof. For example, although a T input is shown as being applied to many of the rectangular blocks in FIG. 9, such T inputs may represent different combinations of the lead wires carrying timing pulses generated by timing pulse generator 200. The specific lead wires which are fed to particular ones of the rectangular blocks in FIG. 9 will become evident as the description progresses.

A final preliminary point which may be noted at this time is that data is handled and operated on by electrical operations unit 190 almost entirely in a serial binary manner so as to permit reducing the electrical circuitry required to a minimum. There are situations where this basic serial binary cannot be used. However, these situations are handled in an expeditious manner with a minimum of additional circuitry by the advantageous use of the recirculating Z-line, as will become evident hereinafter.

With the above preliminary points in view, the description of FIG. 9 may now be continued, the next portion to be considered being the program counter 222. It is to be understood that in performing the various operations required at each stop position, the electrical operations unit 190 (in a manner similar to certain types of conventional electronic computers as disclosed for example, in Patent No. 2,954,166) is capable of being advanced by means of program counts PC produced by the program counter 222 through certain predetermined operation states or blocks, in a variable manner, depending upon the program called for by the program switches 134 (FIG. 3) and/or the control keyboard 116 (FIG. 3), as well as being dependent upon the results of the operations performed in each operation block. More specifically, the program counter 222 is capable of producing a predetermined plurality of program counts (represented by PC in FIG. 9), each of which corresponds to an operation block, and each of which is applied as a control signal to activate a different predetermined combination of the logical circuits provided in the electrical operations unit 190. As a result, whenever the program counter 222 resides in a state representative of a particular program count, only the respective combination of logical circuits corresponding to that program count will be made active for operation. Each of the overall operations which it is desired that the electrical operations unit 190 be capable of performing at a stop position (such as addition, multiplication, etc.) may then be provided by causing the program counter 222 to be advanced in the proper order through those particular program counts which will produce the successive activation of the logical circuits of the electrical operations unit 190 required to perform the desired overall operations required to each stop position. In advancing through any particular plurality of program counts in order to perform a desired overall operation, the program counter 222 may advance consecutively, or may skip to any other higher or lower count, or may remain in a particular count for any required time.

Control of the sequence of program counts to which the program counter 222 advances at each stop position is basically determined by the program switches 134 and/or the control keyboard 116 in FIG. 3, the outputs 137*a* and 116*b* therefrom being fed way of program logic 212 to form program input signals $N_p$ for feeding to the program counter 222, as shown in FIG. 9. The program logic 212 is provided for the purpose of determining which of the two program input signal sources (the program switches 134 or the control keyboard 116) should be used if there is a conflict therebetween. Besides the program input signals $N_p$, the proper advancement of the program counter 222 also requires that it be aware of certain results or decisions made in response to the operations performed during each program count. This information is provided by decision signals L fed to the program counter 222 from the processing logic 220. These decision signals L cooperate with the program input signals $N_p$ to determine the next program count of the program counter 222, while the timing pulses T and the synchronizing signals 150*a* (also fed to the program counter 222) determine the particular time at which advancement to this next program count occurs.

Figures 10, 11:
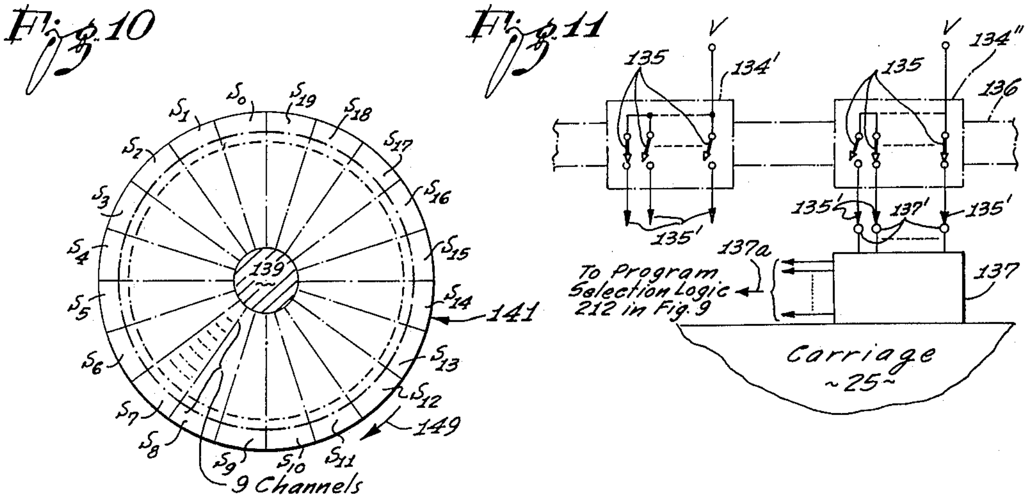
FIG. 10 is a schematic diagram of the disc 141 of FIG. 9 illustrating the arrangement of channels and sectors thereon.
FIG. 11 is a schematic view illustrating a typical construction and arrangement of the program switches 134 of FIG. 3.

Before proceeding further with FIG. 9 a temporary departure will be made to FIG. 11 which schematically indicates a typical manner in which the program switches 134 (broadly shown in FIG. 3) may be constructed and arranged to provide the various signals 137*a* required at each carriage stop position to control the manner of advancement of the program counter 222, as described in the previous paragraph. Referring to FIG. 11, two groups 134′ and 134″ of program switches on rear form bar 136 are illustrated corresponding to two typical carriage stop positions, the carriage 25 being shown in FIG. 11 as residing in the stop position corresponding to the group of program switches represented by the numeral 134″. It will be seen that each group of program switches includes a plurality of individual single-pole, double-throw switches 135, each of which may be manually set to an open or closed condition, depending on the program required at the stop position corresponding thereto. Since the moveable contact of each switch 135 is connected to an electrical voltage source V, the respective wiper arm 135′ which is connected to the fixed contact of each switch 135 will have a voltage thereon only if its respective switch 35 is closed. The signals on the wiper arms 135′ of each group of program switches can thus conveniently represent the desired program to be performed at each respective stop position. Then, when the carriage 25 arrives at each stop position (as illustrated in FIG. 11 for the stop position corresponding to group 134″), the respective signals on wiper arms 135′ make electrical contact with respective cooperating contacts 137′ provided on carriage sensing means 137, which in turn feeds the program signals 137*a* to the program selection logic 212 in FIG. 9. It is to be understood that each group of program switches, such as the groups 134′ and 134″ illustrated in FIG. 11, may be adjustably positioned on form bar 136 to correspond to the positioning of the front stops 30 (FIG. 3) which, as pointed out previously, determine the positions at which the carriage 25 will stop during the performance of an accounting operation. Also, suitable mechanical or electrical storage means are preferably provided in the carriage sensing means 137 for temporarily storing the states of the program switches detected at each stop position, thereby permitting the carriage to be released to advance to the next stop position prior to the completion (or performance) of the electrical operations required at that stop position.

Now returning to FIG. 9 again, it is to be recognized that one of the advantages of employing a program counter approach to the mechanization of data processing operations arises because such an approach makes it possible to mechanize each logical circuit required for a particular computer operation just once; then, whenever the logical operation represented by a predetermined logical circuit is required for one or more program counts (or operation blocks), the predetermined logical circuit may conveniently be rendered operative by suitably feeding the corresponding program count or counts thereto. Time sharing of logical circuits thereby becomes possible, permitting the overall electrical circuitry required to be reduced. Consequently, FIG. 9 may not only represent a specific structural arrangement which could advantageously be employed in accordance with the invention, but also, may be considered as representing merely the basic functional operations required to be performed in carrying out logical operations as the program counter 222 advances through its various program counts. In the latter situation, the specific logical circuitry required to perform each function need only exist in the particular program count or counts in which it is required. Thus, the same flip-flop and associated diodes which, for example, may be used in providing the logical operations required for the processing logic 220 during a particular one of the program counts PC, could also be used during a different program count in performing the logical operations required by the sector address comparator 214 at that program count.

Now that the basic design approach of FIG. 9 has been considered, the description of FIG. 9 will next proceed to consider how each of the portions of the electrical operations unit 190 illustrated in FIG. 9 operates in the preferred embodiment of the present invention. For this description it will not be necessary for a full and complete understanding of the invention to consider all of the program counts in detail, nor will it be necessary to consider in detail the specific logical circuits of the electrical operations unit 190 which are caused to be activated at each program count. The manner in which such logical circuits may be mechanized in response to the sequencing of the program counter 222 is well within the skill of the art and will become evident as the description progresses.

Thus, continuing with the description of the electrical operations unit 190 in FIG. 9 it is to be noted that for each stop position at which the carriage 25 (FIG. 3) may reside, four types of program signals ($N_p$, $N_a$, $N_{ch}$ and $N_m$) are capable of being provided from the output of the program selection logic 212, which is in turn fed by the program switches 134 and/or the control keyboard 116 of FIG. 3, as well as being controlled by the timing signals T and the program counts PC. These four types of program signals $N_p$, $N_a$, $N_{ch}$ and $N_m$ are as follows: (1) program input signals $N_p$ applied to the program counter 222 to determine the advancement thereof as described previously, (2) channel number signals $N_{ch}$ applied to the processing logic 220 to produce the read and write channel selection signals $R_{ch}$ and $W_{ch}$, which in turn control the selection of the read and write amplifiers $R_0$–$R_5$ and $W_0$–$W_5$ so as to determine the particular one or ones of the information channels #0–#5, in which reading and/or writing is to occur during each carriage stop position, (3) sector address signals $N_a$ applied in serial binary form to the sector address input logic 210 to determine the particular sectors $S_0$–$S_{19}$ (FIG. 10) of the information channel or channels selected by channel selection signals $R_{ch}$ and $W_{ch}$ in which reading and/or writing is to occur, and (4) miscellaneous program input signals $N_m$ which are fed to the processing logic 220 to control various other desired operations.

Figure 12:
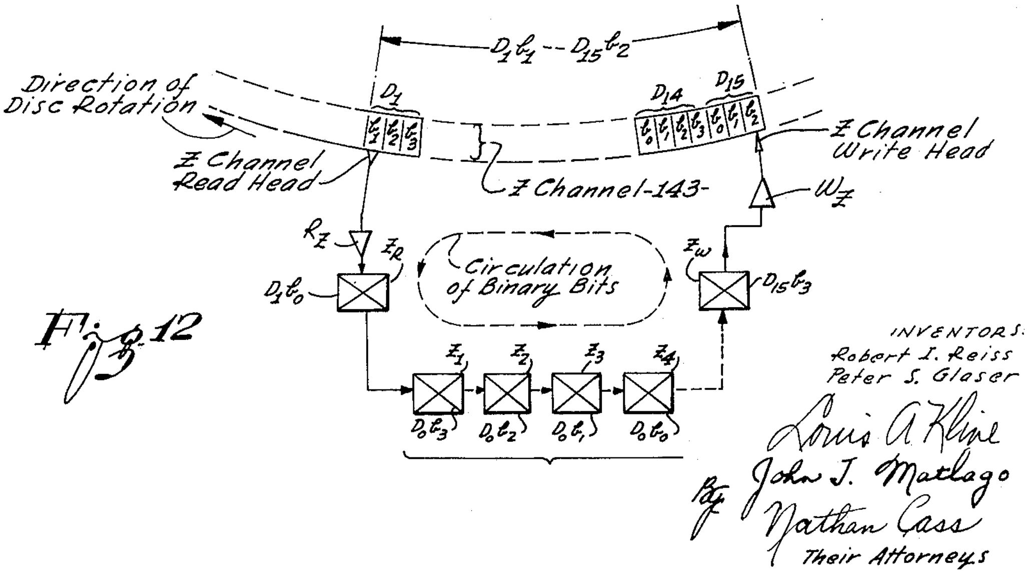
FIG. 12 is an electrical block diagram schematically illustrating the construction and arrangement of the recirculating Z-line of FIG. 9.

Next to be considered in FIG. 9 is the recirculating Z-line which, as pointed out previously, is made up of the Z-channel 143 of the disc memory 140, and the six flip-flops $Z_R$, $Z_1$, $Z_2$, $Z_3$, $Z_4$, and $Z_W$ of the electrical operations unit 190. In the recirculating condition of the Z-line, the sector address input logic 210 (between flip-flops $Z_1$ and $Z_2$), the disc to Z-line logic 206 (between flip-flops $Z_4$ and $Z_W$), and the processing logic 220 (between each pair of Z flip-flops) are all in states such that each Z flip-flop receives its inputs from the preceding flip-flop, while feeding its output to the following flip-flop, as schematically illustrated in FIG. 12. In such a recirculating condition of the Z-line, binary data continually circulates around the loop formed by the Z-channel 143 of the disc 141 and the six Z flip-flops. Since, as mentioned previously, the length of the Z channel 143 is six bits less than a word (a word being 64 bits as shown in FIG. 8), the Z-line will be capable of recirculating a full word therein, 6 bits of the word being in the six Z-flip-flops, while the remaining 58 bits are in the Z-channel 143 of the disc 141. Since nothing else is to be stored on the remainder of the Z-channel 143 of the disc 141, it will be understood that a word will continuously circulate around the Z-line in synchronism with the clock pulses C read from the clock channel 142 of the disc 141 as the disc rotates.

It will be noted that FIG. 12 illustrates the situation where the typical word illustrated in FIG. 8 comprised of the 64 bits $D_0b_0$–$D_{15}b_3$ is being circulated in the Z-line, the dashed lines shown between the Z flip-flops being provided to indicate that the logic portions 206, 210, and 220 in FIG. 9 are in states which permit Z-line circulation. At the particular instant represented in FIG. 12 the decimal digit $D_0$, made up of bits $D_0b_0$, $D_0b_1$, $D_0b_2$, and $D_0b_3$, is stored in flip-flops $Z_4$, $Z_3$, $Z_2$ and $Z_1$, respectively, bit $D_1b_0$ of decimal digit $D_1$ is stored in flip-flop $Z_R$, bit $D_{15}b_3$ of decimal digit $D_{15}$ is stored in flip-flop $Z_W$, and bits $D_1b_0$–$D_{15}b_2$ (the remaining bits of the word) are stored in the Z channel 143 of the disc. In response to the next clock pulse, bits $D_1b_0$, $D_0b_3$, $D_0b_2$, $D_0b_1$ and $D_0b_0$ will be advanced to flip-flops $Z_1$, $Z_2$, $Z_3$, $Z_4$, and $Z_W$, respectively, bit $D_{15}b_3$ in flip-flop $Z_W$ will be written in the Z-channel 143, and bit $D_1b_1$ in the Z-channel 143 will be advanced to flip-flop $Z_R$. Operation occurs in a like manner for each subsequent clock pulse so that, as the disc 141 rotates, the word is continuously circulated in the Z-line in synchronism with the clock pulses C.

Figure 13:
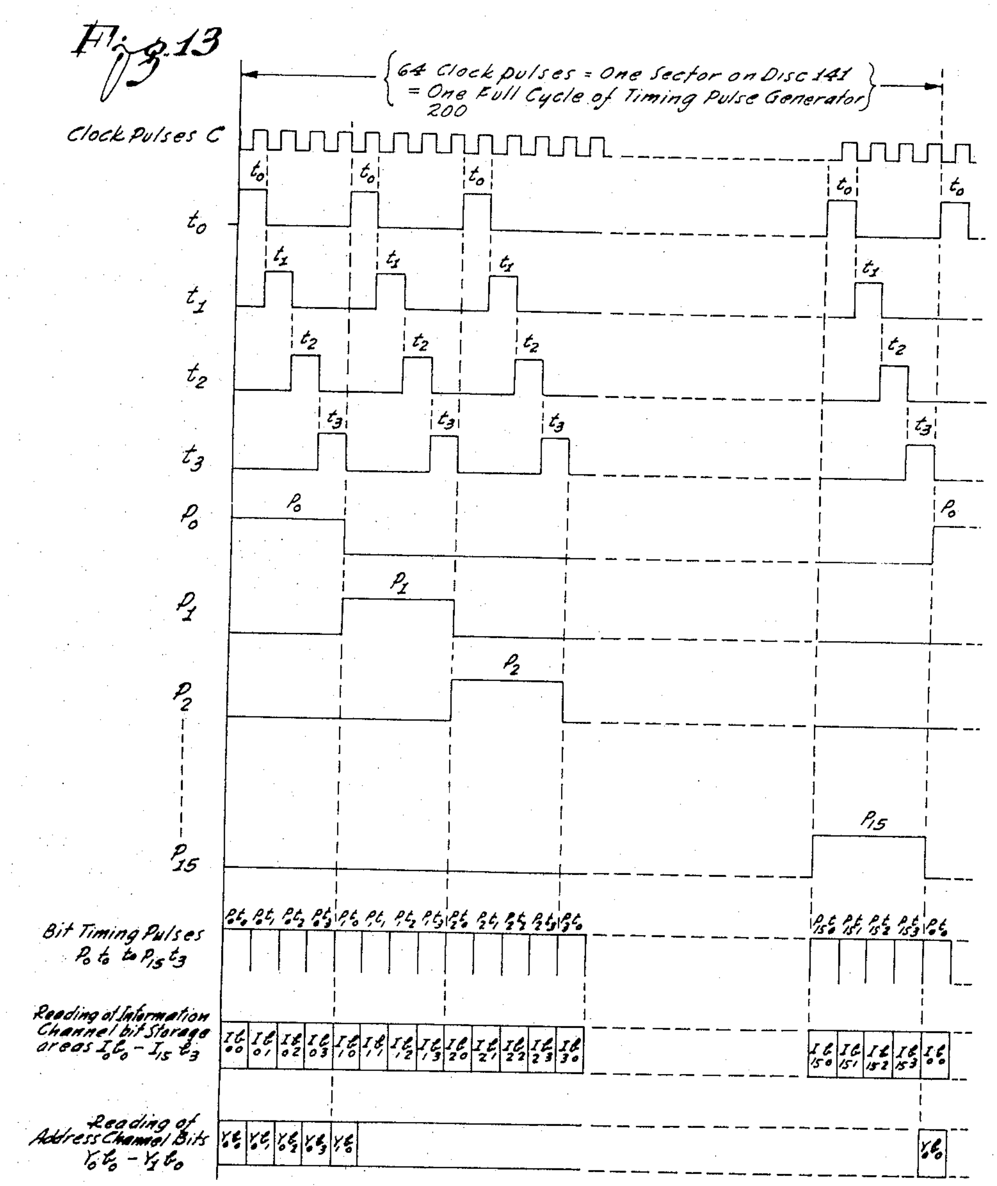
FIG. 13 is a series of graphs illustrating the timing pulses produced by the timing pulse generator 200 in FIG 9.

Next to be considered in detail in FIG. 9 is the timing pulse generator 200 and the timing pulses T produced thereby. FIG. 13 illustrates the various timing pulses produced by the timing pulse generator during each cycle thereof, a cycle being equal to sixty-four clock pulses which, as pointed out previously, is the number of clock pulses C contained in each sector on the disc 141. As will be seen from FIG. 13, during each cycle the timing pulse generator 200 produces sixteen decimal digit pulses $P_0$–$P_{15}$, each of which is in turn divided into the four bit pulses $t_0$, $t_1$, $t_2$, and $t_3$. The decimal digit pulses $P_0$–$P_{15}$ are suitably combined with the bit pulses $t_0$–$t_3$, so that a unique bit timing pulse is obtained for each of the sixty-four bit periods constituting a sector, as indicated by the sixty-four bit timing pulses $P_0t_0$–$P_{15}t_3$ in the third from the bottom graph in FIG. 13. The relationship of these bit timing pulses $P_0t_0$–$P_{15}t_3$ to the read heads of the address channel 144 and the four information channels #0–#5 in FIG. 9 is such that each of the bit timing pulses $P_0t_0$–$P_{15}t_3$ occurs when the read heads of these channels are reading the same corresponding word bit area in the same sector of the disc, as illustrated by the bottom two graphs in FIG. 13 which show the relationship of the information channel bit areas $I_0b_0$–$I_{15}b_3$ and the address channel bits $Y_0b_0$–$Y_1b_0$ to the bit timing pulses $P_0b_0$–$P_{15}t_3$ in each sector of the disc. For example, during the occurrence of bit timing pulse $P_0t_3$ in sector $S_{14}$ (see FIG. 10), the read head of each of the inforation channels #0–#5 will be reading the same corresponding bit storage area $I_0b_3$ in the same sector $S_{14}$ of the disc, while the read head of the address channel 144 will likewise be reading the corresponding $Y_0b_3$ bit, also in sector $S_{14}$.

It is to be understood, of course, that the above described relationship of the read heads in FIG. 9 (as well as the write heads) can be achieved for various other physical locations of these heads on the disc 141 besides those shown in FIG. 9, the FIG. 9 arrangement being chosen merely for convenience of illustration. This also applies to the location of the channels on the disc, which may be provided in any convenient order.

Having explained the relationship between the bit timing pulses $P_0t_0$–$P_{15}t_3$ with respect to the information channel bit storage areas $I_0b_0$–$I_{15}b_3$ and the address channel bits $Y_0b_0$–$Y_1b_0$, it will now be expedient to explain in detail how a word from a selected location in the disc memory 140 (that is, a word in a selected information channel and a selected sector of the disc 141) is transferred into the Z-line. First, a brief description of the overall operation will be given to provide a background for the more detailed description which follows thereafter. Briefly, when it is desired to transfer a desired word in the disc memory 140 into the Z-line, the channel number signals $N_{ch}$ from the program selection logic 212 are caused to act through the processing logic 220 to provide the proper channel selection signals $R_{ch}$ and $W_{ch}$ to the read and write channel selectors 202 and 204 so as to select the read and write amplifiers of the particular one of the information channels #0–#5 containing the word which is to be entered into the Z-line. Next, the sector containing the word to be entered into the Z-line is found by a procedure called "sectoring" which begins with the sector address input logic 210 entering the sector address of the desired word into the Z-line between flip-flops $Z_1$ and $Z_2$ during an appropriate time period. Thereafter, the sector address of the word circulates in the Z-line and, while circulating, is compared in the sector address comparator 214 with the sector address bits permanently recorded in the address channel 144 of each sector of the disc 141. When the particular sector is found for which the address entered into the Z-line corresponds to the address bits permanently recorded in that sector on the disc, indicating that the sector containing the word to be read into the Z-line has been found, the sector address comparator 214 then controls the disc to Z-line logic 206 so as to cause the word from the selected sector and channel on the disc to be read into the Z-line between flip-flops $Z_4$ and $Z_W$ by way of the read channel selector 202 and the read flip-flop $M_R$, following which, the selected word will circulate in the Z-line. When the write head of the selected information channel then traverses the selected word one sector period after the read head, the comparator 214 controls the Z-line to disc logic 208 so as to permit the word which has just been read into the Z-line (and which is circulating therein) to be either erased from the sector of the information channel from which it was obtained (totaling operation) or retained (sub-totaling operation), depending upon the write channel selection signals $N_{ch}$.

The reverse operation of transferring a word from the Z-line to a selected channel and sector of the disc memory is similar to that described above—that is, the write channel selector 204 is caused to select the appropriate channel, and the same "sectoring" procedure using the sector address comparator 214 is employed to locate the sector address corresponding to the address of the word circulating in the Z-line. When the correct sector is found, the sector address comparator 214 then controls the write channel selector 204 so as to cause the word circulating in the Z-line to be read into the selected sector and channel of the disc from the output of flip-flop $Z_2$ by way of the write flip-flop $M_W$ and the write channel selector 204.

The above-described operations of transferring a word from a selected channel and sector of the disc 141 into the Z-line, and vice versa, will now be explained in more detail with reference to FIG. 14 in order to permit a full and complete understanding thereof, the operation of transferring a word from the Z-line to the disc memory being considered first. For the purpose of this first detailed description, the desired word to be transferred into the Z-line will be assumed to be located in sector $S_{14}$ of channel #5, and may be considered as represented by the 64 bits $A_0b_0$–$A_{15}b_3$, of which the five bits $A_0b_0$–$A_1b_0$ represent the sector address $S_{14}$. Thus, at the start of this operation, the program selection logic 212 (in response to signals provided by the program switches 134 or the keyboard 116) will act through the processing logic 220 to produce the proper channel selection signals $W_{ch}$ and $R_{ch}$ for the read and write channel selectors 202 and 204 so as to permit selection of the read and write amplifiers of channel #5, which is the channel containing the word to be entered into the Z-line. The correct sector $S_{14}$ of channel #5 where the desired word is located is then found by the above referred to "sectoring" procedure which will now be considered in detail.

Sectoring is initiated by causing the sector address input logic 210, the processing logic 222, and the disc to Z-line logic 206 to be in states which permit circulation between all Z flip-flops, except between flip-flops $Z_1$ and $Z_2$—that is, the output from $Z_1$ is prevented from being fed to the input of $Z_2$, and may be considered as being discarded and of no further use. Then, during the five bit timing pulses $P_{15}t_2$–$P_0t_2$ (indicated as the address input period in FIG. 14), the sector address $S_{14}$ which is represented by bits $A_0b_0$–$A_1b_0$ is caused to be fed to the input of flip-flop $Z_2$ (in serial binary form) from the sector address input logic 210, the sector address $A_0b_0$–$A_1b_0$ being derived from the program switches 134 or the control keyboard 116 acting through the program selection logic 212. After the occurrence of bit timing pulses $P_{15}t_2$–$P_0t_0$, normal circulation between flip-flops $Z_1$ and $Z_2$ is again permitted to occur, and the output of the sector address input logic 210 is inhibited.

Figure 14:
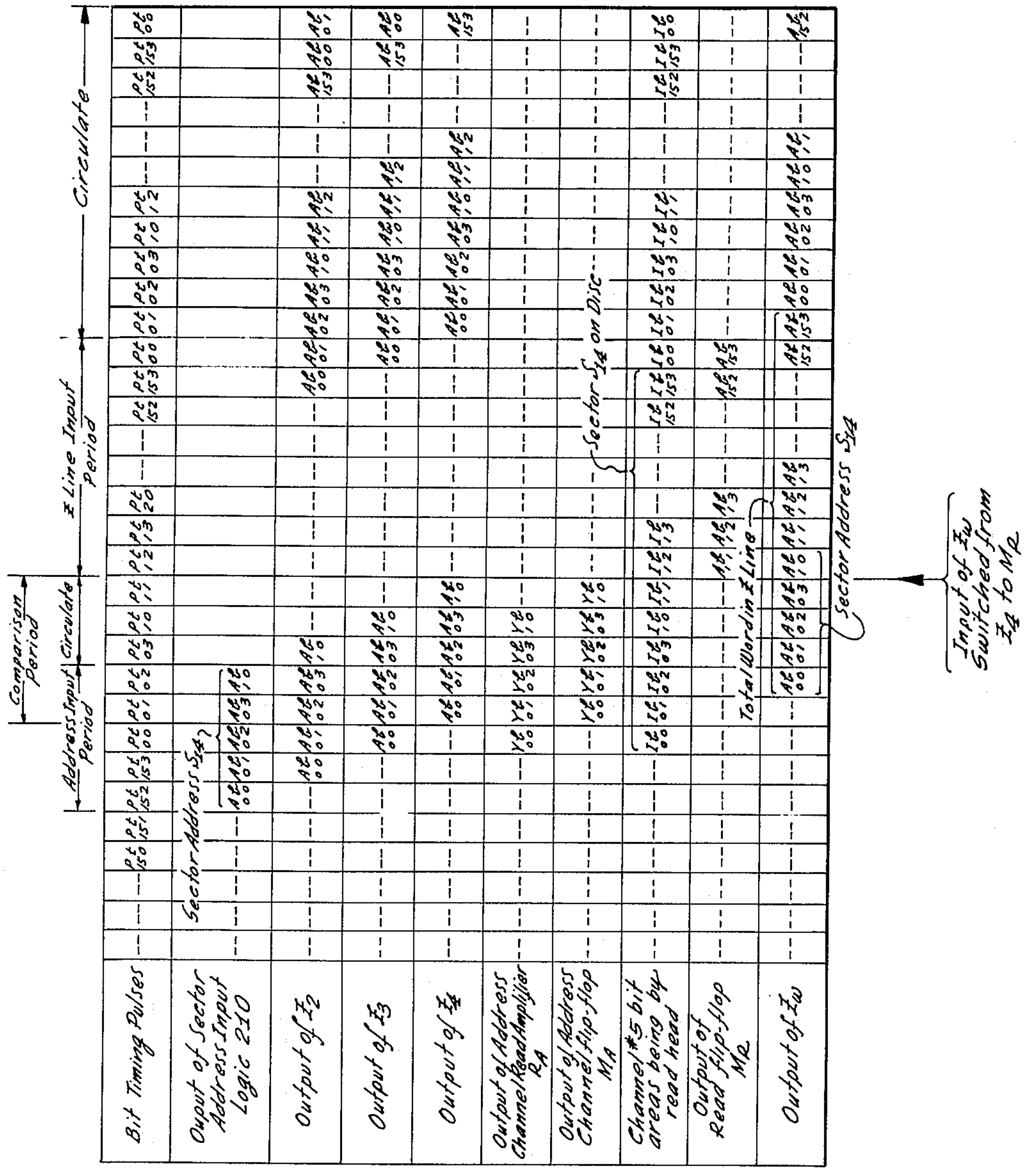
FIG. 14 is a series of graphs illustrating the relationship between signals appearing in the Z flip-flops of the Z-line and other portions of FIG. 9, and will be used in explaining how a word is transferred to the Z-line from a selected location in the disc memory, and vice versa.

The top half of FIG. 14 illustrates the relationship between the outputs of the sector address input logic 210 and the $Z_2$, $Z_3$, and $Z_4$ flip-flops as a result of the sector address $S_{14}$ (represented by bits $A_0b_0$–$A_1b_0$) being applied to the input of $Z_2$ during the address input period constituted by the bit timing pulses $P_{15}t_2$–$P_0t_2$. FIG. 14 also illustrates the relationship between the sector address bits $Y_0b_0$–$Y_1b_0$ of the particular sector on the disc being read at that time by the address channel read amplifier $R_A$, as well as the resultant output of the address channel flip-flop $M_A$ to which the address channel read amplifier signals are fed. It will be recognized from FIG. 14 that the data appearing at the input of each flip-flop during a given bit period appears at the output thereof during the next bit period. This is because, as pointed out previously, each flip-flop switches in response to the removal of each clock pulse C, data thereby propagating through each flip-flop with a delay of one bit period. Thus, the data appearing at the output of each Z flip-flop will be delayed one bit period with respect to the previous flip-flop as shown in FIG. 14, while the data at the output of the $M_A$ flip-flop will be delayed one bit period with respect to the sector address bits being read by the address channel read head appearing at the address channel read amplifier $R_A$.

Referring now to FIG. 14 along with FIG. 9, it will be understood that, as a result of initiating entry of the first bit $A_0b_0$ of the sector address $A_0b_0$–$A_1b_0$ into flip-flop $Z_2$ during bit timing pulse $P_{15}t_2$, the sector address $S_{14}$ (or $A_0b_0$–$A_1b_0$) will circulate in the Z-line in a manner such that the bits $A_0b_0$–$A_1b_0$ will appear at the output of flip-flop $Z_4$ during the timing pulses $P_0t_1$–$P_1t_1$ in every sector as the disc 141 rotates; and it will be understood from FIG. 14 that the appearance of these bits $A_0b_0$–$A_1b_0$ at the output of $Z_4$ will be in synchronism, bit for bit, with the corresponding bits $Y_0b_0$–$Y_1b_0$ appearing at the output of the address channel flip-flop $M_A$ during the same bit timing pulses $P_0t_1$–$P_1t_1$ in each sector. Thus, by feeding the outputs of flip-flops $Z_4$ and $M_A$ to the sector address comparator 214, as shown in FIG. 9, and activating the comparator 214 during the bit timing pulses $P_0t_1$–$P_1t_1$ (indicated as the comparison period in FIG. 14), it is possible to compare the sector address $A_0b_0$–$A_1b_0$ of the desired word with the permanently recorded address channel bits $Y_0b_0$–$Y_1b_0$ in each sector of the disc 141. When a correct comparison is determined by the comparator 214, the correct sector $S_{14}$ of the selected channel #5 will be found and the word therein will then be in a proper position to be recorded into the Z-line.

In FIG. 14, it is assumed, in order to simplify the figure, that a proper comparison between $A_0b_0$–$A_1b_0$ and $Y_0b_0$–$Y_1b_0$ occurs during the first comparison period $P_0t_1$–$P_1t_1$ following the initial bit timing pulse $P_{15}t_2$ which initiated "sectoring." Such a correct comparison in the first comparison period $P_0t_1$–$P_1t_1$ is, of course, unlikely but may be assumed for illustrative purposes, since the operations to be described once a correct comparison is made are the same whether the correct sector is found on the first comparison (as illustrated in FIG. 14) or after many comparisons by the comparator 214 over a plurality of sectors.

Thus, referring to FIG. 14 more specifically, as well as to FIG. 9, it is to be understood that during the first comparison period $P_0t_1$–$P_1t_1$, the address bits $A_0b_0$–$A_1b_0$ appearing at the output of flip-flop $Z_4$ are compared in the comparator 214, bit by bit, with the permanently recorded address channel bits $Y_0b_0$–$Y_1b_0$ in the particular sector which is being traversed by the address channel read head at that time. Since it is assumed for the purposes of this description that a correct comparison is made on the first try, it follows that the first address channel bits $Y_0b_0$–$Y_1b_0$ encountered will necessarily correspond to sector $S_{14}$ in agreement with the sector address represented by bits $A_0b_0$–$A_1b_0$. In response to this correct comparison having been found during the first comparison period $P_0t_1$–$P_1t_1$, the comparator 214, during the next following bit timing pulses $P_1t_2$–$P_0t_0$ (denoted as the Z-line input period in FIG. 14), will be caused to apply an appropriate control signal to the disc to Z-line logic 206 so that the input applied to flip-flop $Z_W$ will no longer be the output of flip-flop $Z_4$ (which is of no concern during bits $P_1t_0$–$P_0t_0$), but instead, will be the output of the read flip-flop $M_R$. Since the output of flip-flop $M_R$ during the Z-line input period $P_1t_2$–$P_0t_0$ contains the remaining bits $A_1b_1$–$A_{15}b_3$ of the word in the selected sector $S_{14}$ of the selected channel #5 which is to be entered into the Z-line, as shown in FIG. 14, the full word $A_0b_0$–$A_{15}b_3$ will be in the Z-line after the end of the Z-line input period $P_1t_2$–$P_0t_0$; it will be remembered that the address bits $A_0b_0$–$A_1b_0$ were previously entered into the Z-line during the address input period $P_{15}t_2$–$P_0t_2$, as described earlier, and therefore need not be obtained from the selected channel and sector. With the entire word $A_0b_0$–$A_{15}b_3$ thus having been entered into the Z-line, the control signal applied to the disc to Z-line logic 206 from the comparator 214 is removed at the end of bit timing pulse $P_0t_0$ to switch the input of $Z_W$ back to $Z_4$ again, so as to permit the word $A_0b_0$–$A_{15}b_3$ which has just been placed in the Z-line to circulate therein.

Because the write head of each information channel trails the read head by exactly one sector on the disc 141 (which is equivalent to one word period or 64 clock pulses), the word in sector $S_{14}$ which was placed in the Z-line (as described above) can be erased from sector $S_{14}$ of channel #5 by applying zero bits to the channel #5 write head as it traverses the bit areas $I_0b_0$–$I_{15}b_3$ of sector $S_{14}$ one sector (or 64 clock pulses) later than the channel #5 read head, which will occur during timing pulses $P_0t_0$–$P_{15}t_3$. If only a subtotaling operation is desired in which the selected word in the disc is not to be erased, such subtotaling may be accomplished simply by causing the write channel selection signals $W_{ch}$ to select none of the write amplifiers $W_0$–$W_5$, thereby preventing zero bits from being fed to the selected write amplifier during the erasing period.

Having described in detail the manner in which a word from a selected channel and sector of the disc 141 in FIG. 9 is transferred into the Z-line, the details of the reverse operation of transferring a word circulating in the Z-line into a selected channel and sector of the disc 141 will be considered next. For this purpose, it will be assumed that the same $D_0b_0$–$D_{15}b_3$ is circulating in the Z-line and that it is desired to transfer this word to sector $S_2$ of channel #3 of the disc 14. Similar to the operation of transferring a word from the disc to the Z-line, the write channel selector 204 in FIG. 9 is first set by channel selection signals $W_{ch}$ to select write amplifier $W_3$ during the writing operation, and the sector address on the disc where the word is to be transferred is entered into the Z-line by way of the sector address input logic 210, as described previously. Next, the appropriate sector of the disc 141 in which the word in the Z-line is to be written is found, which is accomplished by the previously described "sectoring" operation in which the sector address bits appearing at the output of flip-flop $Z_4$ are compared during the comparison period $P_0t_1$–$P_1t_1$ with the output of the address channel flip-flop $M_A$ in sector address comparator 214, in the same manner as illustrated in FIG. 14 for the operation of transferring a word from the disc to the Z-line. When the correct sector is found (which is sector $S_2$ in accordance with the previous assumption), the sector address comparator 214 acts to cause the word $D_0b_0$–$D_{15}b_3$ circulating in the Z-line to be written, during an appropriate writing period, from the output of flip-flop $Z_2$ into the respective bit areas $I_0b_0$–$I_{15}b_3$ of sector $S_2$ of the selected channel #3 by way of the write flip-flop $M_W$ and the write channel selector 204. Referring to FIG. 14 it will be understood that the appropriate writing period is the period $P_0t_0$–$P_{15}t_3$ following a correct comparison period $P_0t_1$–$P_1t_1$. Such a writing period $P_0t_0$–$P_{15}t_3$ is correct because it will cause the bits $D_0b_0$–$D_{15}b_3$ appearing at the output of flip-flop $Z_2$ during bit timing pulses $P_{15}t_3$–$P_{15}t_2$ to be applied to the input of the write flip-flop $M_W$ one bit period earlier than the period $P_0t_0$–$P_{15}t_3$ during which the channel #3 write head passes over the bit areas $I_0b_0$–$I_{15}b_3$ of sector $S_2$, which exactly compensates for the one bit period delay introduced by the write flip-flop $M_W$.

It is to be noted with respect to the above-described operation of transferring a word from the Z-line into a selected sector and channel of the disc that the writing period $P_0t_0$–$P_{15}t_3$ has been described as being chosen so that the entire word $D_0b_0$–$D_{15}b_3$, including the address bits $D_0b_0$–$D_1b_0$ and the unused bits $D_1b_1$ and $D_1b_2$, are written into the selected sector $S_2$, as well as the remaining bits $D_1b_3$–$D_{15}b_3$ of the word containing the number magnitude and sign (see FIG. 8). However, since the sector address channel 144 of the disc 141 already stores the appropriate address bits corresponding to each sector, which bits are available for sector identification during "sectoring" (as well as other operations where required), the address portion of the word need not be transferred from the Z-line into its corresponding bit areas $I_0b_0$–$I_1b_0$ of the selected channel. Thus, bit areas $I_0b_0$–$I_1b_0$ in each sector of the information channels on the disc may, if desired, be ignored as may the bit areas $I_1b_1$ and $I_1b_2$ corresponding to the unused bits of a word. The only portion of the word which need be written into the selected sector, therefore, is the total and its sign represented by bits $D_1b_3$–$D_{15}b_3$ of the typical word assumed to be circulating in the Z-line. As a result, the writing period $P_0t_0$–$P_{15}t_3$ in FIG. 14 (as well as the previously referred to erasing period) could be changed to $P_1t_3$–$P_{15}t_3$ which is all that is needed to permit writing the total and sign bits $D_1b_3$–$D_{15}b_3$ into the selected sector $S_2$ of channel #3. It is to be noted that the fact that no address is stored in bit areas $I_0b_0$–$I_1b_0$ of a sector of an information channel will not interfere with the operation of transferring a word from a selected channel and sector of the disc into the Z-line since, as described in connection with this operation, the Z-line obtains the desired sector address by way of the sector address input logic 210 and does not rely on the address contained in the selected sector of the disc.

Being able to ignore bit areas $I_0b_0$–$I_1b_2$ of each sector of the information channels of the disc, as described above, is advantageous when a NRZ (non-return to zero) type of recording is used on the disc, since the write amplifier may be turned on to provide a binary zero output prior to reaching the first bit $I_1b_3$ containing data which is of significance. This permits each write amplifier to start later in each sector so as not to interfere with data recorded in the last bit area of a previous sector, and is additionally useful during reading of a sector in that it provides a reliable zero output level at the beginning of each sector which permits a more reliable recognition of the bits following.

From the foregoing it should now be evident how the Z-line cooperates with the disc memory 140, the sector address comparator 214, and the Z-line to disc logic 206 so as to permit a word to be transferred from a selected sector and channel of the disc memory 140 into the Z-line, and vice versa. Besides serving in this manner, the Z-line also serves as the working register during the performance of data processing operations, as well as serving as an input and an output register; and these functions are accomplished despite the fact that the Z-line uses only the six storage flip-flops $Z_W$, $Z_1$, $Z_2$, $Z_3$, $Z_4$, and $Z_R$ for handling the entire 64 bit word, which could require as much as sixty-four flip-flops to accomplish such functions in approaches other than the present invention. These features of the Z-line will become evident from the further description herein which will explain how the Z-line cooperates with the processing logic 220 and the encoder comparator 216 during the performance of a typical cycle of operations at a stop position. It will also become evident that this multi-purpose capability of the Z-line makes possible a significant reduction in the overall circuitry required for the electrical operations unit 190, while still permitting considerable flexibility and a high order data processing capability.

Reviewing the basic cycle of machine operation, it will be remembered from the description of the preferred embodiment of the invention shown in FIG. 3 that when the carriage 25 arrives at a stop position, the cycle of operations to be performed at that stop position may be initiated automatically or by the operator manually depressing a motor bar, depending upon the constructional design of the stop 30. Then, during the first portion of the cycle, the differential actuators 111 are set to a lateral position in accordance with either a number represented by depressed keys in the amount keyboard, or a number from a selected location in the disc memory, 140, as previously described in connection with FIG. 4–7. During the remainder of the cycle of operations at each stop position, the number thus set up in the actuators 111 is printed out by printer 19 (FIG. 3) and transferred to the actuator decoder 110, after which the actuators are returned to their home position and the carriage is released to advance to the next stop position. Once the number set up in the actuators is transferred to the actuator decoder 110, it may be processed with any other number or numbers in the disc memory, which may involve addition, subtraction, multiplication, division, etc. as determined by the settings of the program switches 134 and/or the control keyboard 116, the resultant numbers generated as a result of the processing being returned to appropriate locations in the disc memory 140. If processing is not completed by the end of the mechanical operations cycle, initiation of the cycle at the next stop position is inhibited until the processing initiated at the previous stop position is completed.

As was also pointed out previously, the program switches 134 may be programmed (or the control keyboard set) so that any result or results generated during processing may be examined by the electrical operations unit 190 and, in response to such examination or examinations, an electrical output or outputs 190*b* produced thereby at the present stop position (or at the next stop position) for feeding to the mechanical operations unit 150 so as to permit control of the printing format and/or carriage advancement in cooperation with the mechanical output (or outputs) 27*a* from the front carriage sensing means 27.

COOPERATION BETWEEN MECHANICAL AND ELECTRICAL PORTIONS (FIGS. 15–19)

Figure 15:
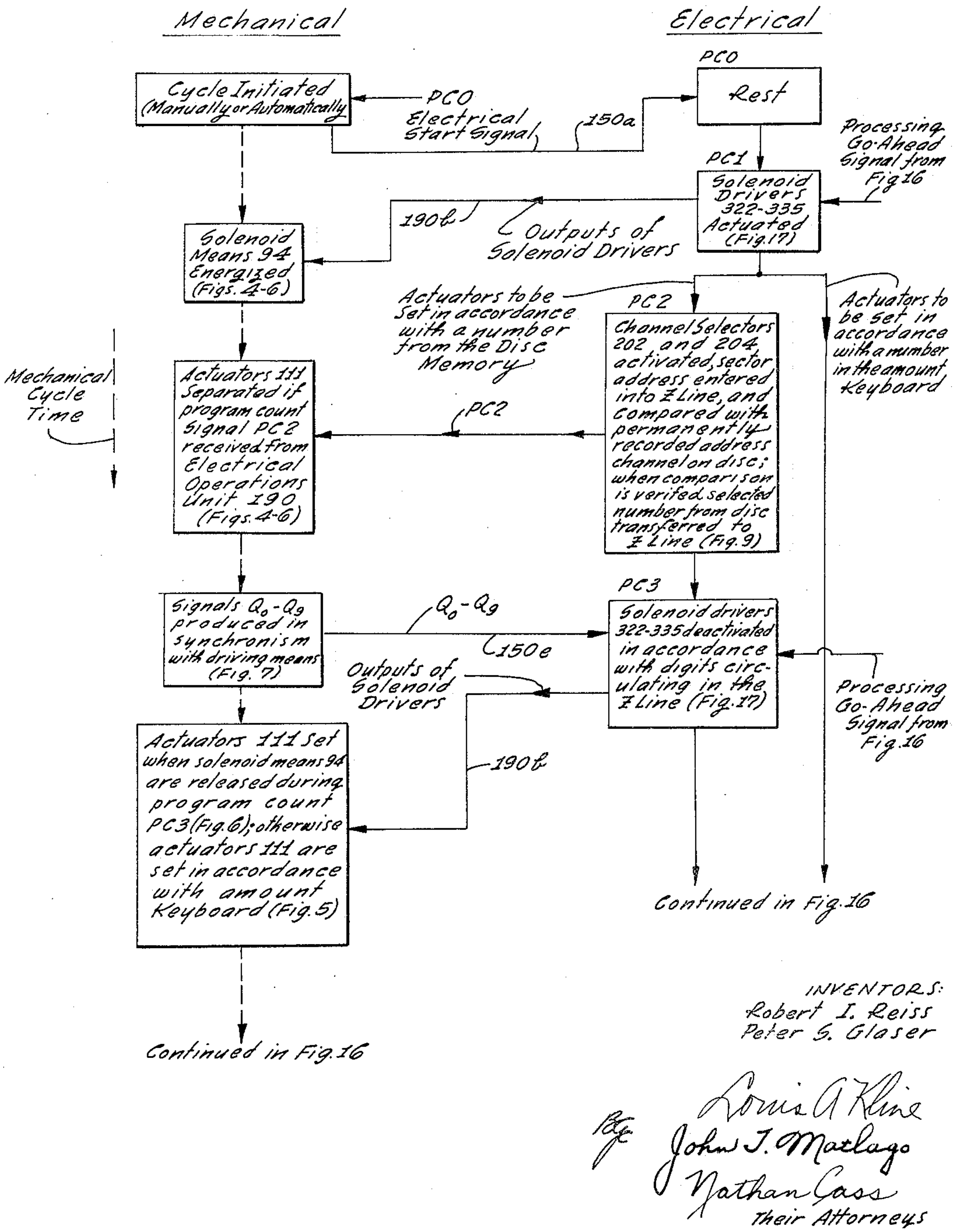
FIGS. 15 and 16 are charts illustrating typical performance of the mechanical and electrical portions of the accounting device of FIG. 3 during the cycle of operations at a stop position.
Figure 16:
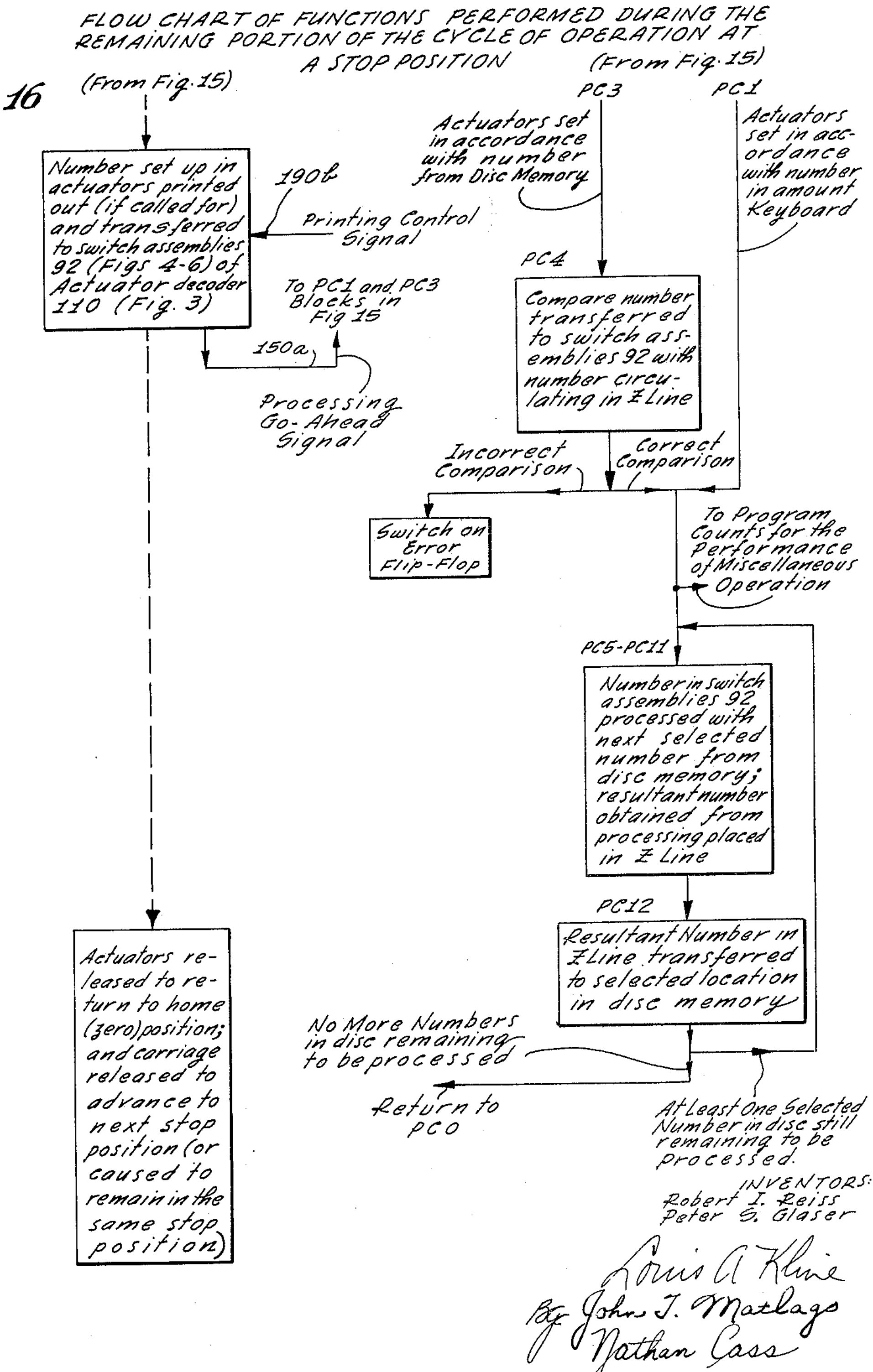

The manner in which the electrical operations unit 190 of FIG. 9, and particularly the Z-line, may typically operate with the mechanical operations unit 150 during the above summarized basic cycle of machine operations will now be described in detail. During this description, it may be found helpful to refer from time to time to the flow charts of FIG. 15 and 16 which summarize the more important functions performed by the mechanical operations unit 150 and the electrical operations unit 190 during the cycle of operations at a stop position. The left side of FIGS. 15 and 16 indicate the mechanical functions performed as cycle time increases downwardly, while the right side of FIGS. 15 and 16 indicates the electrical functions performed as the program counter 222 (FIG. 9) advances to its various program counts. It is to be noted that in accordance with the convention used in FIGS. 2 and 3 the flow lines representing the flow of mechanical functions in FIGS. 15 and 16 are shown by dashed lines, while the flow lines representing the flow of electrical functions are shown by solid lines. It is also to be noted in FIGS. 15 and 16 that the interconnecting lines which provide communication between the mechanical operations unit 150 and the electrical operations unit 190 are designated in the same manner as in FIGS. 3 and 9 so as to permit the origin of these communication signals to be readily determined.

It will first be assumed for this detailed description that the constructional design of the stop in which the carriage resides is such that the actuators 111 (FIG. 3) are to be set to a number from a selected location in the disc memory 140—specifically channel #3, sector $S_2$—of the disc 141 in FIG. 9, since this type of operation intimately involves the electrical operations unit 190. The alternate operation of setting the actuators in accordance with a number in the amount keyboard 15 (FIG. 3) will be considered afterwards.

It will be understood from FIG. 15 that the electrical operations unit 190 is initiated into operation by an electrical start signal 150*a* (shown applied to program block PC0 in FIG. 15) provided by the mechanical operations unit 150 a short time after the mechanical cycle of operations have been initiated at a stop position, either automatically or by the operator depressing a motor bar. This electrical start signal causes the program counter 222 (FIG. 9) of the electrical operations unit 190 to advance to program count PC1 during which siutable solenoid drivers in the encoder comparator 216 (FIG. 9) act to energize the solenoid means 94 of the actuator encoder 112 (FIG. 3) so as to free the actuators 111 for setting in accordance with a number in the amount keyboard or the disc memory, as previously described in connection with FIGS. 4–7. If the states of the program switches 134 are such that the actuators 111 are to be set in accordance with a number from channel #3, sector $S_2$ of the disc memory (as is presently being assumed) then, after energization of the solenoid drivers, the program counter 222 will be caused to advance from program count PC1 to program count PC2, during which the electrical operations unit 190 will act to transfer the number (or total) and sign stored in channel #3, sector $S_2$ of the disc memory into the Z-line in the manner previously described in detail in connection with FIGS. 9 and 14.

As also explained previously, the number and sign in channel #3, sector $S_2$ may be retained if a subtotaling operation is called for at the stop position, or may be erased if a totaling operation is desired.

With the desired number and sign stored in sector $S_2$ of channel #3 of the disc memeory having been transferred into the Z-line during program count PC2, it is next required that the differential actuators 111 (FIG. 3) be set in accordance with the number now circulating in the Z-line, which will be assumed to be represented by digits $D_1b_3$–$D_{15}b_3$ of which $D_1b_3$ represents the sign and $D_2b_0$–$D_{15}b_3$ represents the number. This is accomplished by causing the program counter 222, in response to the desired number and sign having been transferred from the disc memory 140 to the Z-line, to advance to program count PC3, during which each decimal digit of the number circulating in the Z-line will be used by the encoder comparator 216 in FIG. 9 to cause each solenoid means 94 (FIGS. 4–6) to be actuated at the time necessary to drop the finger 94*b* in the corresponding notch 89*b* of its respective differential actuator 111, as previously described in connection with FIGS. 6 and 7. The specific manner in which this operation is performed will now be considered in detail.

Initially, it is to be understood that the time required to transfer the number and sign from the disc memory to the Z-line is relatively short (of the order of 100 milliseconds) so that this operation will not introduce any significant delay into the mechanical operating cycle. For the purposes of the present description, therefore, it is merely necessary to note that by the time the program counter advances to program count PC3 in which the actuators 111 are to be set by the number circulating in the Z-line, the encoder comparator 216 of the electrical operations unit 190 will have energized the solenoid means 94 of each actuator 111 (by means of solenoid driver signals 190*b*) to raise the hook 94*f* free of the notches 89*d* of the driven portion 54 of each actuator to be driven by driving means 75 (to the right in FIG. 4) as described earlier in connection with FIGS. 4–6. Also, the driven portions 54 of each actuator 111 will have been separated from its amount portion 52 (as is required for this type of operation) in response to program count signal PC2 fed to the mechanical operations unit 150 by way of one of the output lines 190*b*, as indicated in FIG. 15. At the start of program count PC3 the driven portion 54 will not yet have moved out of its decimal digit zero position.

Referring again to FIGS. 12 and 14, it will be understood that because of the time period chosen to enter a word into the Z-line from the disc memory, the four bits corresponding to each of the decimal digits $D_2$–$D_{15}$ of the number assumed to be circulating in the Z-line will appear in flip-flops $Z_1$–$Z_4$ during respective timing pulses $P_2t_1$, $P_3t_1$, $P_4t_1$ . . . $P_{15}t_1$. For example, during bit timing pulse $P_2t_1$, the decimal digit $D_2$ represented by bits $D_2b_0$–$D_2b_3$ will be in flip-flops $Z_1$–$Z_4$. Similarly, during bit timing pulses $P_1t_1$, $P_3t_1$ . . . $P_{15}t_1$, respective decimal digits $D_1$, $D_2$, $D_3$ . . . $D_{15}$ will be in flip-flops $Z_1$–$Z_4$.

The movement of the actuators 111 by the driving means 75 (FIGS. 4–7) is normally quite slow with respect to the movement of the disc memory 140 (FIG. 9) and is sufficiently slow so that the actuators 111 will reside in each decimal digit position for long enough to permit at least one complete revolution of the disc 141, thereby permitting all the decimal digits of the word circulating in the Z-line to be compared in turn (at respective $t_1$ pulse times) with the decimal digit position of the driving means 75, the position of the driving means being available from signals $Q_0$–$Q_9$ provided by the auxiliary assembly 61 of FIG. 7. Whenever a digit of the number circulating in the Z-line matches a decimal digit position of the drive means 75, the respective actuator (there being fourteen actuators respectively corresponding to the fourteen decimal digits $D_2$–$D_{15}$ of the Z-line to be stored therein) is stopped by a suitable de-energizing signal applied from the actuator comparator 216 to the respective solenoid means 94 (FIGS. 4–6), causing the hook 94*f* of the de-energized solenoid means 94 to drop into the notch 89*d* which corresponds to the same decimal digit as the respective decimal digit in the Z-line, as shown for example in FIG. 6. Thus, by the time that the driving means 75 has completed its travel (to the right in FIGS. 4–7), each actuator 111 will have been stopped in a lateral position corresponding to a respective decimal digit of the number circulating in the Z-line. It is to be noted from the previous description of FIGS. 4–7 that during the cycle of operations at a stop position, each actuator 111 remains in synchronism with the driving means 75 until it is stopped, which may be either by the hook 94*f* in an appropriate notch 89*d* (FIG. 6) or by the amount portion 52 engaging a stud 41 of a depressed amount key 15' (FIG. 5).

Figures 17, 18:
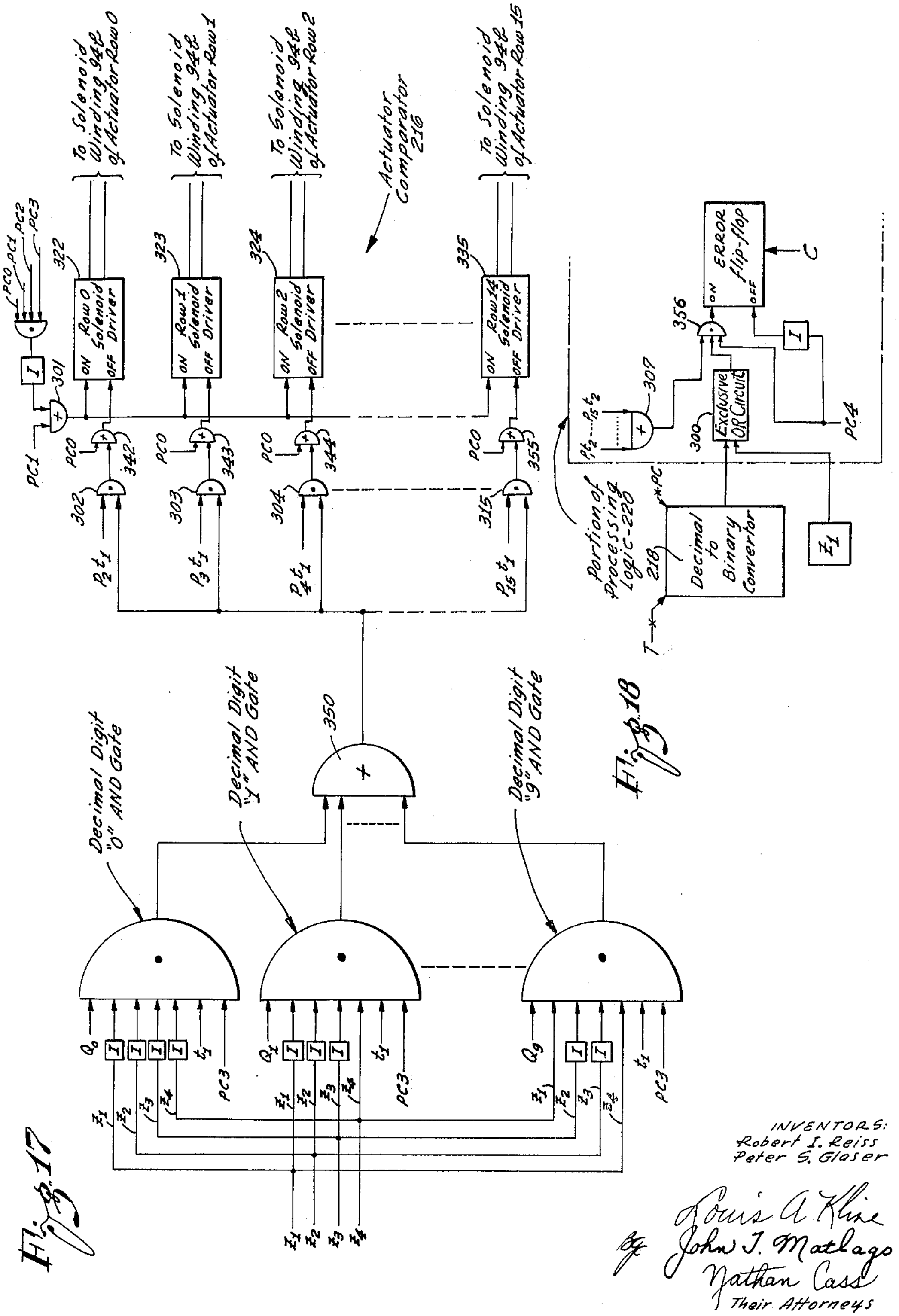
FIG. 17 is an electrical block and circuit diagram illustrating a preferred embodiment of the encoder comparator 216 of FIG. 9.
FIG. 18 is an electrical block and circuit diagram of a portion of FIG. 9 illustrating how the setting of the actuators in accordance with a selected number in the disc memory can be checked during program count PC4 of FIG. 16.

A preferred embodiment of the actuator comparator 216 shown in block form in FIG. 9 will now be considered with reference to FIG. 17 in order to provide a full and complete understanding of the manner in which the actuators 111 are set in accordance with a number circulating in the Z-line. Referring to FIG. 17 it will be seen that the outputs of the four flip-flops $Z_1$–$Z_4$ are fed (either directly or through an inverter I) to ten decimal digit AND gates, each AND gate corresponding to a respective one of the ten digits 0, 1, 2, . . . 9, of the decimal system. As shown, each of these AND gates is represented in a conventional manner as a semicircle with a dot therein. Also fed to each of these decimal digit AND gates in FIG. 17 are the program count signal PC3, the timing signal $t_1$ (FIG. 13), and a respective one of the output $Q_0$, $Q_1$, . . . $Q_9$, the latter being merely respective outputs from the lead wires 61 of the auxiliary assembly 61 in FIG. 7.

It will be understood that an AND gate, such as the decimal digit AND gates illustrated in FIG. 15, will provide a "true" output (that is, a binary "1" output signal) only when all of its inputs are "true" (that is, all binary "1's"). Similarly, the output of each of the $Z_1$–$Z_4$ flip-flops will be "true" when the flip-flop stores a binary "1," and "false" when the flip-flop stores a binary "0." Also, the timing signal $t_1$ will be "true" only for the duration of the timing pulse $t_1$ (FIG. 13) produced by the timing pulse generator 200 (FIG. 9), and the program count signal PC3 will be true only when the program counter 222 is in program count PC3. In addition, only one of the output signals $Q_0$, $Q_1$, . . . $Q_9$ will be "true" at a time depending upon the decimal digit position of the driving means 75. For example, $Q_1$ will be true only when wiper ring 61*b* is in contact with the switch contact corresponding to decimal digit "1," which occurs only when the driving means 75 is in a position corresponding to the decimal digit "1."

Continuing with the description of the preferred embodiment of the encoder comparator 216 illustrated in FIG. 17, it is to be noted that inverters I are provided in certain ones of the $Z_1$–$Z_4$ inputs to the decimal digit AND gates. These inverters I are chosen so that the resultant $Z_1$–$Z_4$ signals applied to each AND gate (after passing through the inverters) will all be true only when the decimal digit represented by the bits stored in the $Z_1$–$Z_4$ flip-flops at each respective timing pulse $t_1$ corresponds to the same decimal digit as represented by the respective one of the signals $Q_0$, $Q_1$, . . . $Q_9$ also applied to each AND gate. For example, the $Z_1$–$Z_4$ outputs applied to the decimal digit "0" AND gate (to which $Q_0$ is applied) will all be true after passing through inverters I only if the $Z_1$–$Z_4$ flip-flops contain the decimal digit "0," that is, if the $Z_1$–$Z_4$ flip-flop outputs are all false.

It will be understood, therefore, that a true output will be obtained from each decimal digit AND gate only under the following conditions: (1) program count PC3 is true, indicating that the program counter 222 is in the proper program count PC3 for this type of operation (2) timing pulse $t_1$ is true, indicating that a decimal digit of the word circulating in the Z-line is properly positioned in flip-flops $Z_1$–$Z_4$, (3) the respective one of the signals $Q_0$, $Q_1$, . . . $Q_9$ fed to the AND gate is true, indicating that the actuators have moved to a decimal digit position corresponding to the same decimal digit number as the decimal digit AND gate, and (4) the decimal digit presently contained in flip-flops $Z_1$–$Z_4$ at timing pulse $t_1$ corresponds to the same decimal digit as the AND gate, which means that the resultant signals fed to the AND gate from flip-flops $Z_1$–$Z_4$ (after passage through any inverters I) will all be true.

Still referring to the preferred embodiment of the encoder comparator 216 illustrated in FIG. 17, it will be seen that the outputs of the decimal digit AND gates are coupled through an OR gate 350 (represented by a semicircle having a plus sign therein) to a second set of fourteen AND gates 302, 303, . . . 315 which respectively correspond to the fourteen rows of actuators (a typical actuator being illustrated in FIGS. 4–6) which are provided to store respective ones of the fourteen digits $D_2$–$D_{15}$ of the word circulating in the Z-line. In addition to the output from or gate 350, each of these AND gates 302–315 is also fed by a respective one of the timing pulses (FIG. 13) $P_2t_1$, $P_3t_1$, $P_4t_1$, . . . $P_{15}t_1$ which, as pointed out previously occur when the decimal digits $D_2$, $D_3$, $D_4$, . . . $D_{15}$ are respectively positioned in flip-flops $Z_1$–$Z_4$.

The output of each of these fourteen AND gates 302–315 is fed to the "off" input of a respective one of the solenoid driver 322–335 through a respective one of the OR gates 342–355. Each solenoid driver in turn feeds a respective solenoid winding 94*b* of the solenoid means 94 in a corresponding one of the fourteen actuator rows. It will be noted that each of the OR gates 342–355 is also fed by program count PC0, and that the "on" input of each solenoid driver is fed by the program count signal PC1 through OR gate 301. Thus, each of the solenoid drivers 322–335 will be deactivated during program count PC0, will become activated to energize its respective solenoid means 94 in response to program count signal PC1, and will become deactivated again during program count PC3 to de-energize its respective solenoid means 94 when the outputs of the respective one of the AND gates 302–315 fed to the "off" input thereof becomes "true," as a result of which, the actuators are set in accordance with respective digits circulating in the Z-line, as will become clear from the following further description of FIG. 17.

The program counter 222 is advanced to program count PC3 (in which the actuator setting operation is performed) in response to the first bit timing pulse $P_0t_0$ occurring after operations in program count PC2 are completed, and as mentioned previously the actuators will still be in their initial decimal digit "0" position at this time. Thus, wiper ring 61*b* in FIG. 7 will be in contact with $Q_0$, causing the signal $Q_0$ applied to the decimal digit "0" AND gate in FIG. 17 to be true, all the other signals $Q_1$–$Q_9$ thereby being false.

As the driving means advances to the other decimal digit positions, only the respective one of the signals $Q_1$ . . . $Q_9$ corresponding thereto will become "true." As a result, only the respective decimal digit AND gate corresponding to the same decimal digit as the position of driving means 75 will be capable of providing a true output for each decimal digit position of the driving means 75.

As for the operation of the second set of AND gates 302–315 in FIG. 17, it will be remembered that the relative speeds of movement of the disc 141 (FIG. 9) and the driving means 75 is such that the driving means will remain in each decimal digit position, including the "0" position, for a sufficient time to at least permit all fourteen decimal digits $D_2$–$D_{15}$ of the number circulating in the Z-line to appear in flip-flops $Z_1$–$Z_4$ during respective $t_1$ timing pulses. Since the timing pulses $P_2t_1$–$P_{15}t_1$ applied to respective ones of the AND gates 302, 303, . . . 315 occur in synchronism with the appearance of respective ones of the decimal digits $D_2$, $D_3$, . . . $D_{15}$ in flip-flops $Z_1$–$Z_4$, it will be understood that as each decimal digit appears in flip-flops $Z_1$–$Z_4$, only a respective one of the AND gates 302–315 will be capable of providing a true output to deactivate its respective solenoid driver. Thus, each of the respective solenoid drivers 322–335 of the rows of actuators (which are fed by gates 302–315) can only be de-energized in response to its respective decimal digit in the Z-line, and this can occur only when the decimal digit in the Z-line is in agreement with the decimal digit position of the driving means 75, since only the respective one of the decimal digit AND gates will be capable of becoming true at each position of the driving means 75, as pointed out above.

A typical example of the setting of the actuators 111 in accordance with a particular illustrative number circulating in the Z-line will now be presented in order to describe in detail the operation of the preferred embodiment of the encoder comparator 216 of FIG. 17. For this example, it will be assumed that the number circulating in the Z-line to which the actuators are to be set is comprised of the fourteen decimal digits 14321520110430 corresponding to the fourteen decimal digits $D_2$, $D_3$, $D_4$, $D_5$, $D_6$, $D_7$. $D_8$, $D_9$, $D_{10}$, $D_{11}$, $D_{12}$, $D_{13}$, $D_{14}$, and $D_{15}$, of which $D_2$ represents the least significant digit "0," $D_3$ the next least significant digit "3," and so on. The remaining bits in the word circulating in the Z-line (except for the sign bit which controls whether red printing is to occur) do not play any part in setting the actuators and will thus be ignored for this example.

It will be noted that the least significant digit $D_2$ of the assumed number as well as the $D_5$, $D_8$, and $D_{15}$ digits are all "0." Thus, with the advancement of the program counter 222 to PC3 and the driving means initially in the "0" decimal digit position (so that $Q_0$ is true), the circulating of the assumed number in the Z-line will cause the output of the decimal digit "0" AND gate to become true during timing pulses $P_2t_1$, $P_5t_1$, $P_8t_1$, $P_{14}t_1$, which are the times at which these "0" decimal digits $D_2$, $D_5$, $D_8$, and $D_{14}$ appear in flip-flops $Z_1$–$Z_4$. Since AND gates 302, 305, 308 and 314 in FIG. 15 are also capable of becoming true during timing pulses $P_2t_1$, $P_5t_1$, $P_8t_1$, and $P_{14}t_1$, respectively, the true output appearing at the decimal digit "0" AND gate during each of these timing pulses will be fed through a corresponding one of the AND gates 302, 305, 308, and 314 to cause respective solenoid drivers 322, 325, 328, and 334, corresponding to actuator rows 0, 3, 7, and 13, to be de-energized, thereby setting these actuators to a "0" position in accordance with their respective decimal digits $D_2$, $D_5$, $D_8$, and $D_{14}$ of the number assumed to be circulating in the Z-line.

When the driving means 75 moves to the next decimal digit position, which is the decimal digit "1" position (so that $Q_1$ is true), the decimal digits of the assumed word in the Z-line will again circulate through flip-flops $Z_1$–$Z_4$. Since digits $D_6$ and $D_7$ are the "1" decimal digits of the assumed word, it will be understood that, in a like manner to that described above for the "0" position of the driving means 75, the decimal digit "1" AND gate will become true during timing pulses $P_6t_1$ and $P_7t_1$ which are the times when digits $D_6$ and $D_7$ respectively appear in flip-flops $Z_1$–$Z_4$. The true output appearing at the decimal digit "1" AND gate will, thus, pass through AND gates 306 and 307 at timing pulses $P_6t_1$ and $P_7t_1$ respectively (also similar to the operation described for the "0" position of driving means 75) to energize solenoid drivers 326 and 327 and thereby set the corresponding actuator rows 4 and 5 to the "1" decimal digit position in accordance with their respective decimal digits $D_6$ and $D_7$ of the word assumed to be circulating in the Z-line.

Similarly, as the driving means 75 moves to the remaining "2" through "9" decimal digit position, each of the respective decimal digit AND gates will in turn become operative to cause the corresponding decimal digits of the number circulating in the Z-line to act through respective ones of the AND gates 302–315 to de-energize respective ones of the solenoid means 94 at appropriate times, thereby setting the remaining actuators in accordance with their respective digits in the Z-line. Thus, when the driving means 75, has moved all the way to the right in FIGS. 4–7, so as to have resided in all of its ten decimal digit positions ("0"–"9"), each of the fourteen actuators will have been set in accordance with a respective decimal digit of the selected number in the disc memory 140, as illustrated, for example, in FIG. 6 which shows a typical actuator 111 set in the decimal digit "5."

Considering next the alternate operation where the stop position is one in which the actuators are to be set in accordance with the depressed keys in the amount keyboard 15 (rather than in accordance with a number in the disc memory as just considered above), then the program counter 222 of the electrical operations unit 190, having reached program count PC1 in response to the electrical start signal (FIG. 15), will be caused to remain in program count PC1. As a result, the above described operations which occurred during program counts PC2 and PC3 of transferring a word into the Z-line and setting the actuators in accordance therewith using the encoder comparator 216 will not take place, nor will the actuators be separated, since PC2 will not be fed to the mechanical operations unit 150 for this purpose (see FIG. 15). The only portion of the above operation which does occur is the activation of the solenoid drivers in program count PC1, which is done to free the actuators for driving by the driving means 75, regardless of whether they are to be set in accordance with a number in the disc memory 140 or in accordance with a number in the amount keyboard.

Since program counter 222 remains in program count PC1 when the actuators are to be set in accordance with the amount keyboard 15, the solenoid drivers 322–335 in FIG. 17 which were activated in program count PC1 will remain activated, and the actuators 111 will remain unseparated. Consequently, as the driving means 75 moves to the right in FIGS. 4–6 during the first portion of the cycle of operations at a stop position, each actuator will be set in accordance with its depressed key 15′ in the respective row of the amount keyboard, as illustrated for decimal digit "5" in FIG. 5. Thus, by the end of the first portion of the cycle of operations at a stop position (FIG. 15), the actuators 111 will have been set in accordance with either a number in the disc memory 140, or in accordance with a number set up in the amount keyboard 15.

It is to be understood that additional means may be provided (such as an additional actuator and an associated push button switch or relay) which is responsive to the sign bit $D_1b_2$ of the number circulating in the Z-line or to a suitable depressed key in the control keyboard, and which may also be set during the first portion of the cycle of operations at a stop position to control the type of printing which is to occur (for example, red printing if the sign bit is negative), and also to store the sign of the number for use in future processing of the number later in the cycle, as will become evident hereinafter.

The remaining portion of the cycle of operations at a stop position will now be considered with reference to FIG. 16. It will be seen from FIG. 16 that as the electrical operations unit 190 continues to remain in its last program count (PC1 or PC3), the mechanical operations unit 150 (FIG. 3) proceeds to cause the number set up in the actuators (which is in accordance with a number from the disc memory or the amount keyboard) to be printed out by the printer 19, and transferred to the switch assemblies 92 of the actuator decoder 110, as was previously described in detail in connection with FIGS. 4–7. Following the performance of these mechanical operations, a processing go ahead signal is transmitted by the mechanical operations unit 150 (on a suitable one of its output lines 150*a*) to initiate the remainder of the operations to be performed by the electrical operations unit 190 at the stop position, which operations then take place without further control from the mechanical operations unit 150. While the electrical operations unit 190 is completing the performance of these electrical operations, as indicated in FIG. 16, the mechanical operations unit 150 completes its mechanical operating cycle—that is, the actuators are returned to their home position (see FIG. 4) and the carriage is released to advance to the next stop position, or caused to remain in the same stop position, depending upon the stop constructional design, the states of the program switches 134 and/or the control keyboard 116. In this connection it is to be noted, as pointed out previously, that the rear carriage sensing means 137 (FIGS. 3 and 11) preferably includes storage means for temporarily storing for the duration of processing the detected states of the program states at a stop position, so as to permit the carriage to advance to the next stop position without waiting for the electrical processing operations to be completed. Also, it is to be noted in FIG. 17 that the inverse of program counts PC0, PC1, PC2, and PC3 are fed to the "on" input of each solenoid driver so as to cause each driver to be actuated after the program counter has advanced beyond PC3 so as to free the actuators for return to their home position. It is further to be noted that operation at each stop position is such that a new cycle of operations at the next stop position cannot be initiated until the electrical processing at the previous cycle has been completed, which is indicated by the program counter having been returned to its rest program count PC0. This rest program count signal PC0 is shown being fed to the first mechanical block in FIG. 15 to provide this control of the initiation of the machine cycle at each stop position.

Still referring to FIG. 16, it will be noted that the flow of information after completion of the first portion of operations at a stop position typically illustrated in FIG. 15, is either from program count PC1 (if the actuators were set in accordance with a number in the amount keyboard) or from program count PC3 (if the actuators were set in accordance with a number from the disc memory). If the flow is from program count PC1, then the processing go ahead signal supplied by the mechanical operations unit 150 (shown fed to the PC1 block in FIG. 15) causes the program counter 222 (FIG. 9) to advance from program count PC1 directly to program count PC5, as indicated in FIG. 16, which occurs at the next appearing $P_{15}t_3$ timing pulse following the appearance of the processing go ahead signal. If, on the other hand, the flow is from program count PC3, then the processing start signal (also fed to the PC3 program block in FIG. 15) causes the program counter to be first advanced to program count PC4 at the next $P_{15}t_3$ timing pulse, during which the number transferred to the switch assemblies 92 (FIGS. 4–6) of the actuator decoder 110 (FIG. 3) is compared bit by bit in serial binary fashion with the number circulating in the Z-line. This is done in order to check that the actuators were properly set in accordance with the number circulating in the Z-line and properly transferred to the switch assemblies 92.

Considering the operation in program count PC4 in more detail with reference to FIG. 9, it will be seen that the outputs 110*a* from the switch assemblies 92 (which are in decimal digit form) are converted to binary form by a conventional type of decimal to binary converter 218. The decimal to binary converter 218 is preferably constructed and arranged in conjunction with the timing signals T and the program count signals PC (specifically program count PC4) so that the binary outputs from the decimal to binary converter 218 during program count PC4 occur in synchronism with the binary bits appearing at the output of flip-flop $Z_1$ as the number in the Z-line circulates therein. It will be understood from FIG. 14 that in view of the time chosen to transfer the assumed number $D_2b_0$–$D_{15}b_3$ from the disc memory to the Z-line (during program count PC2), the binary bits of the number $D_2b_0$–$D_{15}b_3$ circulating in the Z-line will appear at the output of flip-flop $Z_1$ during bit timing pulses $P_1t_2$–$P_{15}t_2$, respectively. Thus, the binary bits $D_2b_0$–$D_{15}b_3$ corresponding to the number to which the switch assemblies 92 are set will likewise be caused to appear at the output of the decimal to binary converter 218 at bit timing pulses $P_1t_2$–$P_{15}t_2$, respectively.

Since the outputs of flip-flops $Z_1$ and the decimal to binary converter 218 are both fed to the processing logic 220 in FIG. 9 (in serial binary fashion) the processing logic 220 can conveniently compare the binary bits appearing at these two outputs during bit timing pulses $P_1t_2$–$P_{15}t_2$ and, if all the bits of each are not equal, cause an appropriate error flip-flop to be switched "on" to take appropriate corrective action. A typical circuit arrangement which may be provided in the processing logic 220 for this purpose is illustrated in FIG. 18. As shown, the output of the decimal to binary converter 218 is fed to an EXCLUSIVE OR circuit 300 along with the output of flip-flop $Z_1$, the output of the EXCLUSIVE OR circuit 300 being in turn fed by way of AND gate 356 to the "on" input of an error flip-flop. Also fed to AND gate 356 is the program count signal PC4 and the bit timing pulses $P_1t_2$–$P_{15}t_2$. It will be understood, therefore, that the operation of the circuit of FIG. 18 will be such that during timing pulses $P_1t_2$–$P_{15}t_2$ of program count PC4, the output of the EXCLUSIVE OR circuit 300 will become true to switch on the error flip-flop (and thereby initiate suitable corrective action, such as stopping the machine and lighting an error light) if any of the binary outputs of the decimal to binary converter 218 and the $Z_1$ flip-flop occurring during bit pulses $P_1t_2$–$P_{15}t_2$ are not alike.

At the next $P_{15}t_3$ bit timing pulse following a correct comparison in program count PC4, the program counter 222 is caused to advance to the selected plurality of program counts to be performed during the remainder of the cycle at the stop position, the particular program counts through which the program counter advances being determined by the states of the program switches and/or the control keyboard. It will be remembered that if the flow is from count PC1 (which occurs if the actuators are to be set in accordance with a number in the amount keyboard), the program counter 222 (FIG. 9) is advanced in response to the first $P_{15}t_3$ bit timing pulse following the processing go ahead signal. Thus, the advancement of the program counter to the selected plurality of program counts to be performed during the remainder of the cycle occurs at the same bit timing pulse $P_{15}t_3$ regardless of whether flow is from PC1 or PC4.

Two general types of operations which may be performed during the remainder of the cycle are illustrated in FIG. 16, it being understood, of course, that the invention is not limited to these two types. One of these types of operations involves processing of the number which has been set up in the switch assemblies 92 during the first portion of the cycle, with one or more selected numbers in the disc memory. The other type involves miscellaneous operations other than processing which may be required at a stop position, an example of which will be given later on in this description.

Considering the processing type of operation first, it will be seen from FIG. 16 that program counts PC5–PC12 are provided for this purpose, the block labeled PC5–PC11 representing one or more program counts to which the program counter may be advanced in the performance of a particular processing operation, as determined by the states of the program switches and/or the control keyboard. More specifically, as the program counter advances through one or more of the program counts PC5–PC11, the number set up in the switch assemblies 92 is processed in a suitable manner (which may involve addition, subtraction, multiplication, division, etc.) with a selected number from the disc memory, the result of the processing being placed back into the recirculating Z-line.

After operations in the selected ones of the program counts PC5–PC11 are completed, the program counter automatically advances to program count PC12 where the resultant number which has been placed in the Z-line is transferred to a selected location in the disc memory, in the same manner as described earlier in this description. If only one such number from the disc memory is to be processed with the number set up in the switch assemblies 92, then the program counter 222 is caused to return to the rest program count PC0, and the electrical operations unit 190 will remain in this rest program count PC0 until a new cycle is initiated at the next stop position. On the other hand, if additional numbers from the disc memory are to be processed with the number set up in the switch assemblies 92, then when program count PC12 is completed, the program counter will loop back to program counts PC5–PC11, as indicated in FIG. 16, to permit the next selected number in the disc memory to be processed with the number set up in the switch assemblies, which processing may be the same type or different from the processing of the previous number selected from the disc memory. This looping back from program count PC12 to program counts PC5–PC11 is repeated until there are no more numbers in the disc remaining to be processed with the number set up in the switch assemblies 92, whereupon the program counter will be caused to return to the rest program count PC0.

It is to be understood that the type of processing performable in particular ones of the program counts PC5–PC11 may be any desired type of processing, as long as the necessary logical circuitry is provided for performing each desired type of processing. The fact that the resultant number obtained from each processing in program counts PC5–PC11 is returned to the Z-line is highly advantageous, since the resultant number may then be conveniently returned to any selected location in the disc memory during the next program count PC12 in the manner previously described. Also, the fact that the resultant number of each processing is placed in the Z-line, permits the same Z-line to conveniently serve as an output buffer for feeding to an external unit in the event that it is desired to monitor the operation of the accounting device. This may be accomplished, as illustrated in FIG. 9, simply by feeding the outputs of the $Z_1$–$Z_4$ flip-flops to the external circuitry while the resultant number circulates in the Z-line.

It may be noted at this time that instead of processing a selected number from the disc memory with the number set up in the switch assemblies 92 during particular ones of program counts PC5–PC11, as described above, the program at a stop position could be chosen so that a selected number from the disc memory may be processed during particular ones of program counts PC5–PC11 with a number derived from an external input source. Such a number from an external input source is suitably time controlled by an input converter 278 shown in FIG. 9 (which is similar to the time control provided by the decimal to binary converter 118 for the number set up in the switch assemblies 92), so that the input number will be applied to the processing logic 220 in binary serial form in synchronism with the bits appearing at the output of flip-flop $Z_1$, just as occurs for the number set up in the switch assemblies 92. Thus, processing may occur in the same manner during particular ones of program counts PC5–PC11 whether a selected number from the disc memory is processed with the number set up in the switch assemblies 92, or with a number provided by an external input source.

It may further be noted at this time that during particular ones of program counts PC5–PC11, the result of a processing operation may be examined while in the Z-line, and in response thereto, cause suitable storage means in the processing logic 220 (or in a spare channel on the disc) to be set for examination or to control operations later on during processing in the same cycle, or during the cycle of operations at the next stop position.

Figure 19:
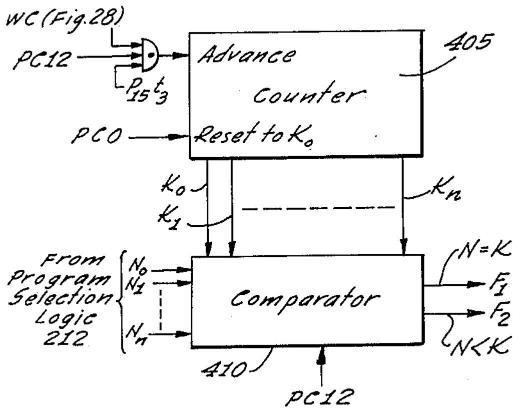
FIG. 19 is an electrical block diagram illustrating how "looping back" may be accomplished between program count PC12 and program counts PC5–PC11 of FIG. 16.

Reference will now be made to FIG. 19 to generally illustrate how looping back between program count PC12 and program counts PC5–PC11 may typically be accomplished. In FIG. 19 a counter 405 is shown which is constructed and arranged to produce counting signals on respective outputs $K_0, K_1, \ldots K_n$ as the counter is progressively advanced by each program count PC12 during a cycle of operations at a stop position, the counter being reset to its zero count by program count signal PC0. These outputs $K_0, K_1, \ldots K_n$ of the counter 405 are fed to a comparator 410 along with corresponding program outputs $N_0, N_1, \ldots N_n$ from the program selection logic 212 (FIG. 9) having signals thereon which represent the particular plurality of numbers from he disc memory which are to be processed at each stop position. The comparator 410 is constructed and arranged in any suitable manner to operate during program count PC12 to compare the count of the counter 405 with the number represented by the signals on $N_0, N_1, \ldots N_n$, and in response thereto, to provide an output signal $F_1$ if the value of N equals K, or an output signal $F_2$, if N is less than K. The signal $F_1$ serves to cause the program counter to advance to the rest count PC0 at the completion of program count PC12 while the signal $F_2$ causes the program counter to loop back to program counts PC5–PC11.

TYPICAL EXAMPLES OF PROCESSING (FIGS. 20–23)

In order to permit the capabilities of an accounting device constructed and arranged in accordance with the present invention to be clearly understood, some typical illustrative examples will now be given of the type of processing which may be performed in program counts PC5–PC11, following which an example will be given of a particular type of miscellaneous operation, namely a multiple print operation, which can be performed in a program count PC13 especially provided for this operation. Two examples of the type of processing performable in program counts PC5–PC11 are illustrated in FIGS. 20 and 21 which provide summaries of the activity in typical program counts PC5–PC7 which may be employed for addition and subtraction (FIG. 20), and in typical program counts PC8–PC11 which may be employed for multiplication.

Figure 20:
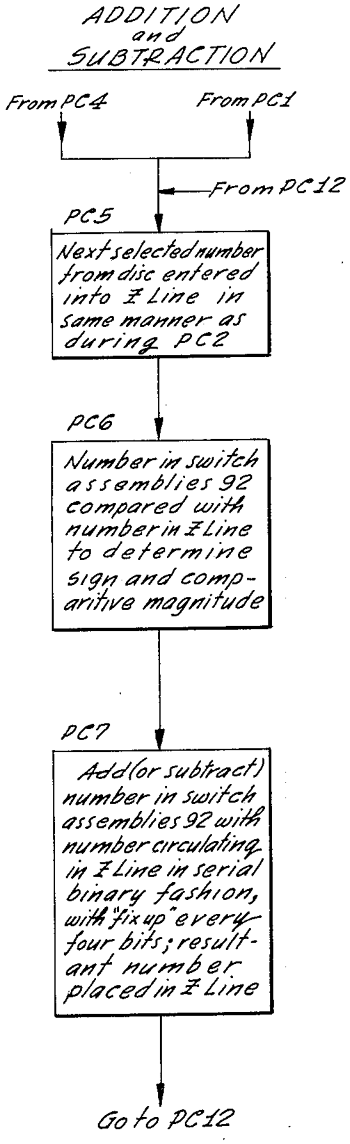
FIGS. 20 and 21 are flow charts illustrating how addition and subtraction (FIG. 20) and multiplication (FIG. 21) can typically be performed in particular ones of the program counts PC5–PC11 of FIG. 16.
Figure 21:
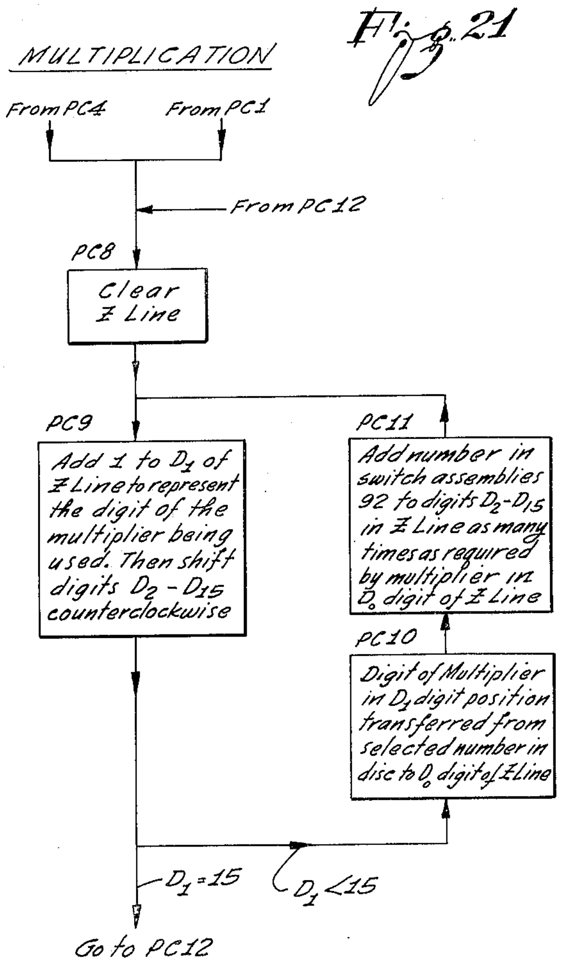

Considering addition and subtraction first, it will be seen from FIG. 20 that in performing addition or subtraction, the program counter 222 advances (from either program count PC4 or PC1) to program counts PC5, PC6 and PC7, in that order. In program count PC5, a selected number from the disc is entered into the Z-line in the same manner as described in connection with program count PC2, the program counter then automatically advancing to program count PC6.

In program count PC6, the number in the switch assemblies 92, which will be assumed to be represented by bits $A_2b_0$–$A_{15}b_3$ and the sign bit $A_1b_3$ (which may be in a separate relay), are compared with the number and sign entered into the Z-line from the selected location in the disc memory during program count PC5, which will be assumed to be represented by magnitude bits $B_2b_0$–$B_{15}b_3$ and sign bit $B_1b_3$. This operation in program count PC6 is provided in order to compare the magnitudes and signs of the two numbers so as to properly set the processing logic 220 in FIG. 9 for the addition or subtraction operation which is to be performed, a procedure well known in the art. Such a comparison may be accomplished by causing the processing logic 220 to simultaneously compare the output of flip-flop $Z_1$ and the decimal to binary converter 218 during bit timing pulses $P_1t_1$–$P_{15}t_1$, which is the period during which the sign and magnitude digits of the number circulating in the Z-line and the number set up in the switch assemblies 92 (or the input number from an external source) appear in synchronism with one another at the output of flip-flop $Z_1$ and the output of the decimal to binary converter 218, respectively, as first pointed out in connection with the discussion of program count PC4.

After operations in program count PC6 are completed, the program counter advances to program count PC7 during which the number $A_2b_0$–$A_{15}b_3$ in the switch assemblies 92 (or the input number from an external source) is added or subtracted (as the case may be) with the number $B_2b_0$–$B_{15}b_3$ circulating in the Z-line in serial binary fashion, with fix-up every four bits, the resultant number $A_2b_0$–$A_{15}b_3 \pm B_2b_0$–$B_{15}b_3$ being placed back into the Z-line. More specifically, addition or subtraction takes place in program count PC7 by causing the processing logic 220 to suitably add or subtract, in conventional serial binary fashion, the synchronized outputs provided by the $Z_1$ flip-flop and the decimal to binary inverter 218 during each bit timing pulse of the time period $P_1t_2$–$P_{15}t_1$. The resultant binary output obtained by such addition or subtraction of the outputs of $Z_1$ and the decimal to binary converter 218 during each bit timing pulse is fed to the input of flip-flop $Z_2$ during the same bit period. Thus, instead of flip-flop $Z_2$ being fed the output of flip-flop $Z_1$ during each such bit timing pulse, as occurs during normal circulation in the Z-line, the processing logic 220 feeds to the input of flop-flop $Z_2$ the resultant binary bit obtained from the addition or subtraction performed on the two bits appearing at the output of the decimal to binary converter 218 and the $Z_1$ flip-flop during the same bit timing pulse. The result of the addition or subtraction on each pair of bits is therefore immediately returned to the Z-line.

However, such bit by bit addition or subtraction by the processing logic 220 as described above, is not of itself sufficient to provide the proper result, when a true binary system is not employed. As pointed out early in this description, a binary coded decimal digit system is assumed to be employed in the typical embodiment being described herein, in which case, each decimal digit of a number is separately represented by four respective bits $b_0$, $b_1$, $b_2$, and $b_3$, instead of the entire number being represented by its binary equivalent. It is necessary, therefore, besides providing for a suitable carry bit from digit to digit, to provide for possible "fix-up" of the four binary bits representing the sum of each pair of two decimal digits after the processing of the last bits $b_3$ of each pair of digits. This is necessary in order to take care of the situation where the sum (or difference) of two decimal digits as a result of conventional serial binary addition or subtraction is greater than the decimal digit "9." In the preferred embodiment being described herein, this situation can readily be taken care of since, when the last (or most significant) bits ($b_3$) of each pair of decimal digits appear at the outputs of flip-flop $Z_1$ and the decimal to binary converter 218 (or the converter 278), the other three bits of the resultant decimal digit obtained from conventional binary additional or subtraction will still be in the Z flip-flops, the first or least significant bit ($b_0$) of the resultant decimal digit being in flip-flop $Z_4$. Thus, during the bit timing pulse when the last bit of each decimal digit is in flip-flop $Z_1$, the necessary "fix-up" may be provided simply by causing the processing logic 220 to look at the outputs of all four of the $Z_1$, $Z_2$, $Z_3$, and $Z_4$ flip-flops during each such bit timing pulse, as well as the output from the decimal to binary converter 218, and in response thereto, cause signals which properly represent addition of subtraction of each pair of decimal digits in the binary coded decimal system, to be fed to the next following flip-flop $Z_2$, $Z_3$, $Z_4$ and $Z_w$, respectively, during the same bit timing pulse. Also, during this last bit timing pulse, a proper carry will be generated by the processing logic 220 for use with the next pair of decimal digits. Thus, the result of the addition or subtraction is still immediately returned to the Z-line even though a binary coded decimal digit system is employed. At the end of the period $P_1t_2$–$P_{15}t_1$ in program count PC7, therefore, the number representing the result of the addition (or subtraction) between the number in the Z-line (which was transferred from a selected location in the disc memory) and the number in the switch assemblies 92 (or an input number from an external source) will be circulating in the Z-line in proper binary coded decimal form and will be ready for transfer to a selected location in the disc memory during program count PC12.

Before leaving the description of program counts PC5–PC7, it is to be noted that if all that is called for at a stop position is to transfer a number set up in the switch assemblies 92 (or a number from an external source) into the Z-line for storage in a selected location in the disc memory, this operation may easily be accomplished using the same program counts PC5–PC7 along with program count PC12, merely by causing the processing logic 220 to consider the output of flip-flop $Z_1$ as all binary "0's" in program count PC7 while performing normal addition, as described above. Then, at the end of program count PC7 the resultant number circulating in the Z-line will be the desired number which is to be inputed. Consequently, when the program counted 222 automatically advances to program count PC12 from program count PC7, the input number then circulating in the Z-line can be transferred to the desired location in the disc memory, thereby achieving the desired input operation.

Having described how addition and subtraction (as well as inputing) can be performed in program counts PC5–PC7, it will now be explained how multiplication can be performed using program counts PC8–PC11 which are summarized in FIG. 21. However, before considering these program counts PC8–PC11 in detail, it will be helpful to first briefly describe the general approach used for the multiplication operation.

The purpose of the multiplication operation to be performed during program counts PC8–PC11 is to cause the number set up in the switch assemblies 92 (or the number from an external source) to be multiplied by a number in a selected location in the disc memory, and the resultant number (that is, the product) placed in the Z-line for transfer to a selected location in the disc memory during program count PC12 to which operation proceeds after multiplication is completed in program counts PC8–PC11. For the multiplication operation, the number set up in the switch assemblies 92 (or the number from an external source) will be considered the multiplicand, and the number in the selected location in the disc memory will be considered the multiplier, the signs of the two numbers being ignored. Multiplication is then performed by successive serial addition and shifting in a manner so as to cause the partial products produced by each multiplier digit to be successively added into the Z-line in proper position location. More specifically, each digit of the multiplier in the disc memory is used, in turn, to cause the number in the switch assemblies 92 to be successively added into the Z-line as many times as indicated by the value of the multiplier digit. The resultant total in the Z-line after each such successive addition is then shifted prior to the successive addition of the number in the switch assemblies by the next digit of the multiplier, thereby assuring that the partial product produced by each multiplier digit will be properly located for addition with the total of the partial products of all previous multiplier digits. It is to be understood that each addition of a number in the switch assemblies and a number in the Z-line may be performed in a manner basically similar to that described in connection with FIG. 20, so that after the last multiplier digit has added its partial product to the Z-line, the required final product of the number in the switch assemblies and the number in the selected location of the disc memory will then be circulated in the Z-line and may, therefore, be readily transferred to a selected location in the disc memory during the program count PC12 following the multiplication operation.

In order to permit a minimum of flip-flops to be used during the above-described multiplication operation, it is advantageous to use the $D_1$ digit position of the Z-line to store the position of the particular multiplier digit which is being used at any given time, and to use the $D_0$ digit position of the Z-line to store the magnitude of each multiplier digit which is to be used for successive addition of the number in the switch assemblies into the Z-line. During the successive addition by each multiplier digit, the number in $D_0$ may be decreased by 1 for each addition of the number in the switch assemblies into the Z-line, so that the reduction of the number in $D_0$ to zero may be used to indicate that the proper number of successive additions have been performed in accordance with the magnitude of the multiplier digit. It is to be noted that suitable means (which need not be considered here) may be provided in the processing logic 220 to provide for rounding off the product, as well as for providing suitable action in the event of overflow, such as stopping the machine and lighting an overflow light.

With the above summary of the basic approach to multiplication in view, the particular program counts PC8–PC11 used for multiplication will now be considered in detail with reference to FIG. 21. Also, to aid in the description, a particular example of a multiplication operation will be considered with reference to FIG. 22, which illustrates the multiplication of the number 76,601, which will be assumed to have been set up in the switch assemblies 92, by the number 831 assumed to be in a selected location of the disc memory.

Figure 22:
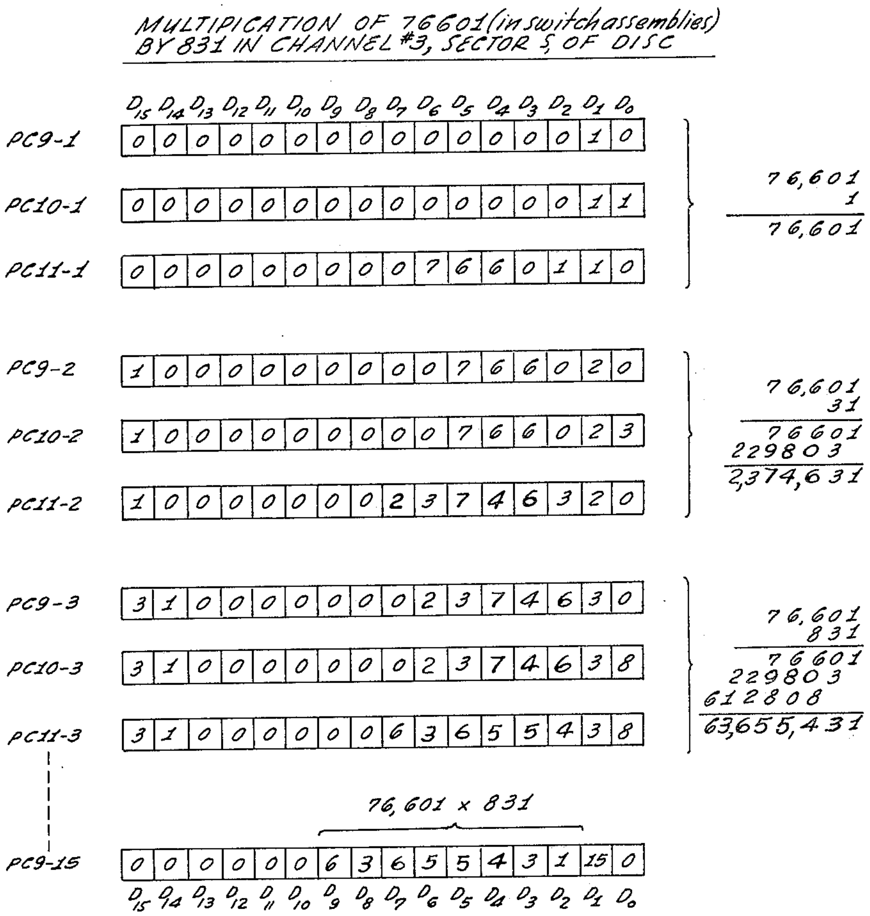
FIG. 22 is a schematic diagram which will be used in illustrating multiplication between two specific numbers in program counts PC8–PC11 of FIG. 21.

Referring to FIG. 21, it will be seen that the first program count to which the program counter advances in performing multiplication is program count PC8, during which the Z-line is cleared of any information which it might contain from previous operations. Such a clearing operation in program count PC8 may be performed simply by interrupting the Z-line between any pair of Z flip-flops for a sufficient time to clear the Z-line. After program count PC8, the program counter advances to program count PC9, during which the decimal digit "1" is added to the number stored in the $D_1$ digit position of the Z-line, which as pointed out in the previous summary of the multiplication operation, represents the particular multiplier digit which is being used. Since the Z-line was cleared in program count PC8, the first time that the program counter advances to program count PC9, the $D_1$ digit position of the Z-line will be "0" and adding a "1" thereto will cause a "1" to appear in the $D_1$ digit position as shown in the portion of FIG. 22 indicated as PC9–1, the "1" following the program count PC9 indicating that this is the first time that the program counter has advanced to program count PC9 in the multiplication operation. The same notation is used throughout FIG. 22 so that the number following the program count may be considered to indicate the number of times which each program count has been performed during the particular multiplication operation illustrated.

Also, in program count PC9, the $D_2$–$D_{15}$ digits in the Z-line are shifted counterclockwise (that is, $D_2$, $D_3$, . . . $D_{15}$ are shifted to $D_{15}$, $D_2$, . . . $D_{14}$, respectively) but this operation has no significance the first time that program count PC9 is performed since all of the digits $D_2$–$D_{15}$ in the Z-line are zero as a result of having been cleared during program count PC8. At the end of program count PC9, advancement to the next program count is determined by the magnitude of the number in the $D_1$ digit position of the Z-line. If $D_1$ is equal to 15, indicating that all of the digits of the multiplier have been used (multiplication then being completed), the program counter proceeds to program count PC12. However, if $D_1$ is less than 15, as during PC9–1 in FIG. 22, then operation proceeds to program count PC10.

In program count PC10, the multiplier digit in the position corresponding to $D_1$ of the Z-line is transferred to the $D_0$ digit position of the Z-line. This may be accomplished in basically the same manner (that is, using sectoring) as described in connection with program counts PC2 and PC5, except that only the particular multiplier digit indicated by the value of $D_1$ is transferred to the Z-line, the transfer always being to the $D_0$ digit position of the Z-line. Also, since during multiplication the $D_0$ and $D_1$ digit positions of the Z-line are not available to store the sector address of the multiplier in the disc memory, provision is made to feed the address bits from the sector address input logic 210 in FIG. 9 directly to the sector address comparator 214, as indicated by the lines 210*a*, the feeding of each sector address bit to the comparator 214 being suitably timed to occur in synchronism with the permanently recorded address channel bits appearing at the output of the address channel flip-flop $M_A$. Thus, by the end of the first operation in program count PC10, the Z-line will be as shown at PC10–1 in FIG. 22 in which the $D_1$ digit position of the Z-line will store a "1" to indicate that the first (least significant) digit of the multiplier is being used, and the $D_0$ digit position of the Z-line will contain the least significant digit of the multiplier 831, which is the digit "1."

In program count PC11 to which the program automatically advances after completing program count PC11, the multiplicand 76,601 in the switch assemblies 92 is added to digits $D_2$–$D_{15}$ in the Z-line (which may be basically similar to addition in program count PC7) as many times as is required by the multiplier in the $D_0$ digit position of the Z-line. Since the number in the $D_0$ digit position of the Z-line is "1," corresponding to the least significant digit of the number 831, the multiplicand 76,601 is added to the digits $D_2$–$D_{15}$ of the Z-line just once to give at the end of program count PC11 a state of the Z-line as shown at PC11–1 in FIG. 22. As mentioned previously during the summary of the multiplication operation, the digit in $D_0$ is decreased by 1 for each addition of the number in the switch assemblies into the Z-line, and it is the "0" state of $D_0$ which indicates that the number of additions required by the multiplier digit has been performed. Thus, at the end of program count PC11, the $D_0$ digit of the Z-line will also have been reduced to "0" (as shown at PC11–1 for example), in response to which, the program counter will advance back to program count PC8 to repeat operations in program counts PC9–PC11 for the next digit of the multiplier 831, which is the digit "3."

During the second advancement of the program counter through program counts PC9–PC11 (indicated at PC9–2, PC10–2, and PC11–3 in FIG. 22), operation is as follows: in program count PC9, the $D_1$ digit is increased to "2" and the $D_2$–$D_{15}$ digits are shifted one digit to the left to give the condition of the Z-line shown at PC9–2 in FIG. 22, the program counter then advancing to program count PC10 since $D_1<15$; in program count PC10, the second (in accordance with the "2" value of $D_1$) multiplier digit "3" of the multiplier 831 in the disc memory is transferred to $D_0$ to give the condition of the Z-line shown at PC10–2 in FIG. 22; and in program count PC11, the number in the switch assemblies 92 is added into the $D_2$–$D_{15}$ digits of the Z-line three times in accordance with the multiplier digit "3" to give the condition of the Z-line shown at PC11–2 in FIG. 22, the $D_0$ digit again being reduced to "0" by subtracting "1" therefrom for each addition, in response to which, the program counter again returns to program count PC8 for the third time.

Operation during the third advancement of the program counter through program counts PC9–PC11 is similar to the previous two advancements, the resultant condition of the Z-line at the end of each of the program counts PC9, PC10 and PC11 being shown at PC9–3, PC10–3 and PC11–3, respectively. Since the multiplier 831 has only three significant digits, the product of the multiplicand 76,601 by the multiplier 831 will be in the Z-line at the end of the third advancement through program counts PC9–PC11. However, advancement through program counts PC9–PC11 is permitted to occur fourteen times to permit a multiplier having fourteen significant digits to be handled.

When the program counter enters program count PC9 for the fifteenth time, $D_1$ will be increased from "14" to "15," and the $D_2$–$D_{15}$ digits will again each be shifted one digit to the left to give the resultant state of the Z-line shown at PC9–15 in FIG. 22. Since $D_1=15$, the program counter will not advance to program count PC10 again, as it did fourteen previous times, but will now advance to PC12 to permit the product 61,587,231 in the Z-line to be transferred to a selected location in the disc memory. It is to be noted that the least significant digit "1" of the product will be in the least significant digit position $D_2$ of the Z-line at the end of PC9–15, so that no shifting of the product is required to properly locate the product in the Z-line for transfer during program count PC12.

It is to be noted with respect to the above exemplary description of multiplication, that considerations of overflow, round-off, or decimal points were not included, but these can be taken care of in any of a variety of suitable ways which will be apparent from the description already presented.

Before leaving the consideration of the various types of processing which may be performed in particular ones of program counts PC5–PC11 (or additional program counts which might be provided for performing processing), it is to be understood that division may be performed as well as addition, subtraction and multiplication, as described in connection with FIGS. 20–22.

For example, if it is considered that the number in the selected location of the disc memory is the dividend, and the number set up in the switch assemblies 92 (or the number from an external source) is the divisor then, in performing the division operation, the dividend may be first transferred to the Z-line from the disc memory and the divisor then successively subtracted therefrom followed by appropriate shifting to obtain each quotient digit in its proper position location. However, since the Z-line is not available for storage of the quotient digits during the division operation (it being needed for the successive subtractions), the quotient digits may be stored as they are generated on an empty information channel of the disc. In so doing, it is preferable to avoid writing problems which might occur if quotient digits were attempted to be written next ot one another in the same sector of the channel. Such writing problems are conveniently avoided by writing each quotient digit on a different sector of the channel, and after all quotient digits are generated, they may then be suitably collected and transferred to the Z-line for subsequent transfer to a selected location in the disc memory during program count PC12.

Returning temporarily to FIG. 16, it will be remembered that after program counts PC1 or PC4 (depending upon whether the actuators were set in accordance with the amount keyboard or the disc memory), the operations performable in the remaining portion of the cycle of operations at a stop position were classified as being of two general types, it being understood that other types are also possible. The first type is that just described for program counts PC5–PC12 in which the number set up in the switch assemblies (or the number from an external source) is processed, in turn, with selected numbers from the disc memory and the processed results returned to selected locations in the disc memory. The second type involves miscellaneous or special types of operations which do not directly involve processing. A typical important type of such special operation is a multiple print operation, which will now be described with reference to FIG. 23 (along with FIG. 16) to generally illustrate how such special types of operations may be performed in accordance with the invention.

In order to permit the multiple print operation to be clearly understood, the purposes and the approach to the overall operation will first be briefly summarized. The purpose of the multiple print operation is to permit the numbers stored in various storage locations in the disc memory to be automatically printed out once the multiple print operation is initiated by the operator, or by the accounting device itself upon arriving at a stop position provided for this purpose. These storage locations whose numbers it is desired to print out may contain, for example, the results of a series of accounting operations which have been performed, such as, for example, the total amount of business done by each department in a departmentally organized company. Since the typical embodiment of the accounting device described herein is able to print out from only one storage location during each cycle, a series of cycles must be initiated (preferably at some stop position provided for the multiple print operation) if the numbers in many storage locations are to be printed out. The purpose of the program count PC13 shown in FIG. 23 is to permit such successive machine cycles to be initiated to cause a different predetermined storage location of the disc to be printed out each cycle, while operation remains within the general framework of the operations performable during each cycle, as illustrated in FIGS. 15 and 16.

In order to simplify the circuitry required for a multiple print operation, a particular channel in the disc memory, such as channel #6, may be chosen for those storage locations which are to contain the numbers to be printed out at the end of a series of accounting operations. As many sectors as are required for print out are then chosen on channel #6, starting with the last or twentieth sector $S_{20}$ and working downwardly to lower-numbered sectors ($S_{19}$, $S_{18}$, etc.). Then, whenever a multiple print operation is called for at a stop position, all that' the operator need do is to select the lowest sector of channel #6, and the accounting device will proceed to print out the number in this lowest sector, and will then continue to automatically perform successive cycles at the same stop position, printing out the number in the next higher sector each cycle, until the twentieth sector is printed out, after which machine cycling will cease and the machine will come to rest or, if desired, the carriage may be caused to advance to a new stop position.

Figure 23:
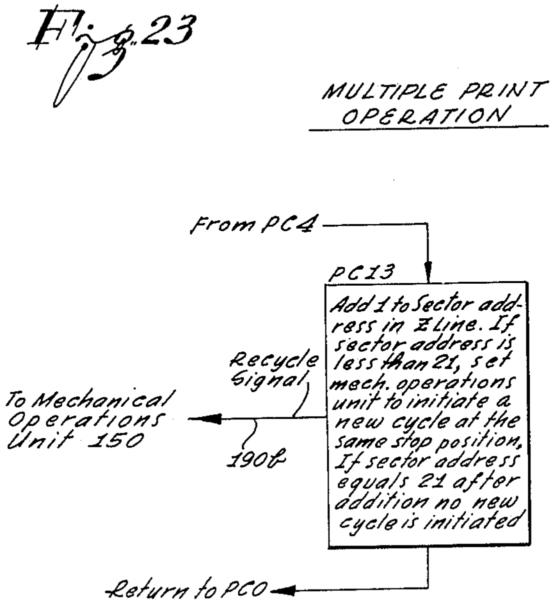
FIG. 23 is a flow chart illustrating how a multiple print operation can be performed in conjunction with a special program count PC13.

With the above brief description of the multiple print operation in view, program count PC13 to which the program counter advances in performing this multiple print operation will now be considered in detail with reference to FIGS. 15, 16 and 23. At the outset, it should be noted that a multiple print operation may be initiated automatically when the carriage arrives at the stop position provided for this purpose, or manually by the operator depressing a suitable motor bar (*5a*, *5b* or *5c* in FIG. 1). In the event of manual initiation of the multiple print operation, the operator may set the carriage in the multiple print stop position if it is not already there.

Upon initiation of the multiple print operation, whether automatically or by the operator depressing a control key, mechanical and electrical operations proceed as indicated in FIG. 15 with the program counter advancing from the rest count PC0 through counts PC1, PC2, PC3 and PC4. Advancement is through these program counts PC1–PC4 since the number to which the actuators are to be set during the multiple print operation is in accordance with a number from the disc memory, rather than from the amount keyboard. Operation through program count PC4 is the same as previously described in connection with FIGS. 15 and 16, with the mechanical portions proceeding to print out the number set up in the actuators. However, during the multiple print operation, the number to which the actuators are set, and which is thereby printed out, is the number contained in the lowest sector of channel #6, chosen either by the states of the program switches at the multiple print stop position, or by the operator depressing suitable keys on one of the control keyboards corresponding to the sector address desired.

After program count PC4, in the performance of the multiple print operation, the program counter will be caused to advance to the multiple print program count PC13. In program count PC13, "1" is added to the sector address which was previously entered into the Z-line during program count PC2, and the processing logic 220 is caused to produce a recycle signal which remains set until reset in reponse to the sector address reaching "21." This recycle signal is fed to the mechanical operations unit 150 on one of the output lines **190*b*, and when the program counter automatically advances back to program count PC0 after program count PC13 is completed, this recycle signal cooperates with the program count signal PC0** to cause the mechanical operations unit to automatically initiate a new cycle of operations at the same stop position after the first cycle has been completed.

During the next multiple print cycle thus initiated, the program counter again advances through program counts PC1–PC4; however, since the recycle signal has been set, the sector address input logic is inihibited from entering any new address into the Z-line during program count PC2. Thus, the address in the Z-line will continue to be the lowest sector address on channel #6 plus the "1" added during PC13 of the previous cycle, so that during program count PC3 the number in the next higher sector address on channel #6 will be set up in the actuators, and thereby will be printed out by the mechanical portions during the remaining portion of operations in the cycle. When program count PC4 is again completed, the program counter will again advance to the multiple print program count PC13 where "1" is again added to the sector address in the Z-line. Also, the recycle signal will remain set if the sector address after addition is less than "21" so as to cause a new cycle of operations to again be initiated at the same stop position when the program counter returns to program count PC0.

It will be understood that this advancement of the program counter through program counts PC1–PC4, then to PC13, and back to PC0 during successive cycles of the multiple print operation will continue as described above, with the number in the next highest sector of channel #6 being printed out on each successive cycle. When the addition of "1" to the sector address in program count PC13 produces a sector address of "21," indicating that the number in the last sector $S_{20}$ in channel #6 will be printed out during the cycle then being performed, the recycle signal is turned off to prevent initiation of a new multiple print cycle when the program counter returns to program count PC0 after program count PC13 is completed.

It is to be noted that as occurs when printing takes place in two different stop positions, during the multiple print operation the carriage is automatically caused to provide suitable line spacing between the printing of successive numbers. It is also to be noted that because the number in the selected location of the disc memory which is transferred to the Z-line may be either erased (totaled) or retained (subtotaled), during operation in program count PC2, the program switches at the multiple print stop position may choose either type of operation to cause the selected sectors in channel #6 to either be all erased or all retained, as desired. Furthermore, if all that is desired at a stop position is to erase (clear) all the numbers in the sectors of channel #6, a stop position could be provided to operate in the same manner as at the multiple print stop position, except that the mechanical portions would be prevented from printing.

A final point to note with regard to the multiple print operation (or the related clearing operation just described) is that if more than twenty sectors are desired for multiple print out (or for clearing), provision could be made to successively print (or clear) beginning with a sector of any information channel. In such a case, suitable provision would be made to cause switching from a channel to the next high channel after its last or twentieth sector has been printed out.

TYPICAL DETAILED CIRCUITRY (FIGS. 24–34)

Having described the construction and operation of the present invention, and having presented a number of examples of the types of operations performable thereby, reference is now directed to FIGS. 24–34 which illustrate typical detailed circuitry which may be employed in the embodiment of the accounting device being described herein. In view of the previous description of the invention already provided herein, the construction and operation of these detailed circuits should be readily apparent, so that a brief summary of each will suffice to permit a ready understanding thereof.

At the outset, it is to be noted with reference to these detailed circuits that, whenever not indicated otherwise, it is to be assumed that circulaion is occurring normally between any pair of the flip-flops $Z_R$, $Z_1$, $Z_2$, $Z_3$, $Z_4$, and $Z_W$ of the recirculating Z-line. It is also to be noted that the AND and OR gates in FIGS. 24–34 are represented in the same manner as previously described in connection with FIG. 17—that is, a semicircle having a dot therein represents an AND gate, and a semicircle having a plus sign therein represents an OR gate. Also, except for the Z-line flip-flops, the address flip-flop $M_A$, the read flip-flop $M_R$ and the write flip-flop $M_W$, (which should be quite familiar by now), each new flip-flop designation in FIGS. 24–34 will have the abbreviation "F/F" to indicate that a flip-flop is intended. Such new flip-flops are not to be considered as having clock pulses C applied thereto, and normally do not, these flip-flops being switched from one state to the other by the application of true signals to respective "on" and "off" inputs.

With the above brief discussion in view, each of the detailed circuits of FIGS. 24–34 will now be taken up in turn, it being understood, of course, that time sharing of circuitry in different program counts may be employed.

Figure 24:
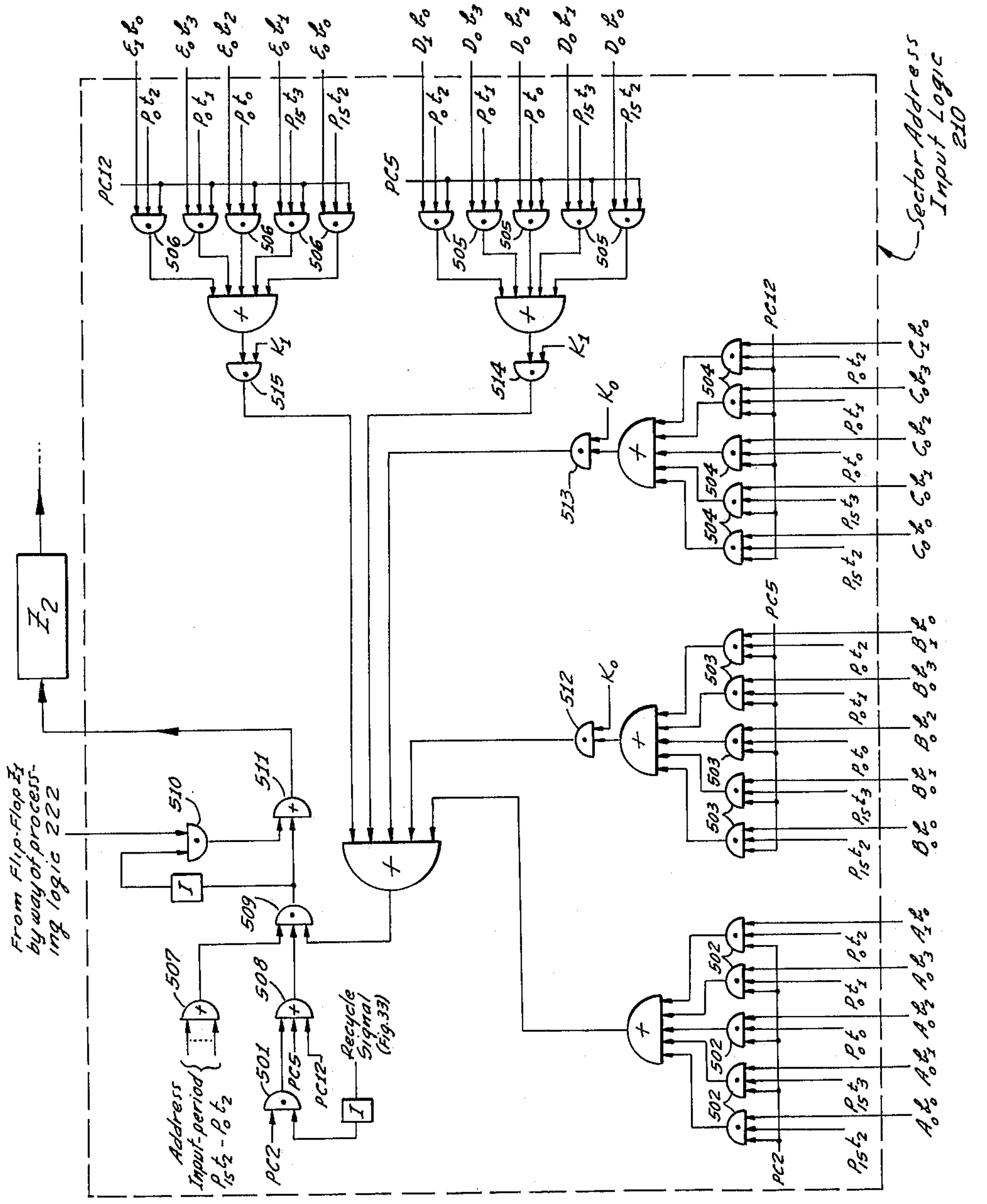
FIG. 24 is an electrical block and circuit diagram illustrating a typical embodiment of the sector address input logic 210 of FIG. 9.

FIG. 24 shows typical detailed circuitry which may be employed in the sector address input logic 210 shown in block form in FIG. 9. As was considered earlier in connection with FIG. 14, the purpose of the sector address input logic 210 is to operate to insert the sector address into the Z-line between flip-flops $Z_1$ and $Z_2$ during an address input period $P_{15}t_2$–$P_0t_2$, preparatory to transferring a word (or just the number and sign) from the disc memory to the Z-line, and vice versa. It will be apparent from FIGS. 15, 16, 20, and 21 and the discussions associated therewith that this insertion of a sector address into the Z-line from the sector address input logic 210 occurs during program counts PC2, PC5, and PC12. As typical examples, FIG. 24 illustrates the insertion of the sector address $A_0b_0$–$A_1b_0$ into the Z-line during the address input period $P_{15}t_2$–$P_0t_0$ of program count PC2 (by means including the AND gates 502), the insertion of the sector addresses $B_0b_0$–$B_1b_0$ and $D_0b_0$–$D_1b_0$ into the Z-line during the address input period $P_{15}t_2$–$P_0t_0$ of respective first and second entries into program count PC5 (by means including the AND gates 503 and 505), and the insertion of the sector addresses $C_0b_0$–$C_1b_0$ and $E_0b_0$–$E_1b_0$ into the Z-line during the address input period $P_{15}t_2$–$P_0t_0$ of respective first and second entries into program count PC12 (by means including AND gates 504 and 506).

Still referring to FIG. 24, AND gates 512–514 (to which the signals $K_0$ and $K_1$ are fed from the comparator of FIG. 19) serve to determine which sector address is to be inserted into the Z-line in the event of looping back between program counts PC12 and PC5–PC11 of FIG. 16 as described previously. It will also be noted in FIG. 24 that AND gates 501, 509 and 510 operate in conjunction with OR gates 507, 508, and 511 to permit the respective sector addresses to be applied to the input of flip-flop $Z_2$ during the address input period $P_{15}t_2$–$P_0t_2$ of program counts PC2 PC5, and PC12.

It is further to be noted in FIG. 24 that since the previously described multiple print operation requires the insertion of a sector address in program count PC2 only during the first cycle of the multiple print operation, and not during successive cycles, the program count signal PC2 is separately fed and AND gates 501 along with the inverted recycle signal produced in program count PC13 (FIG. 23) during the first cycle of the multiple print operation, thereby preventing insertion of a sector address in program count PC2 during the remaining cycles of the multiple print operation.

Figure 25:
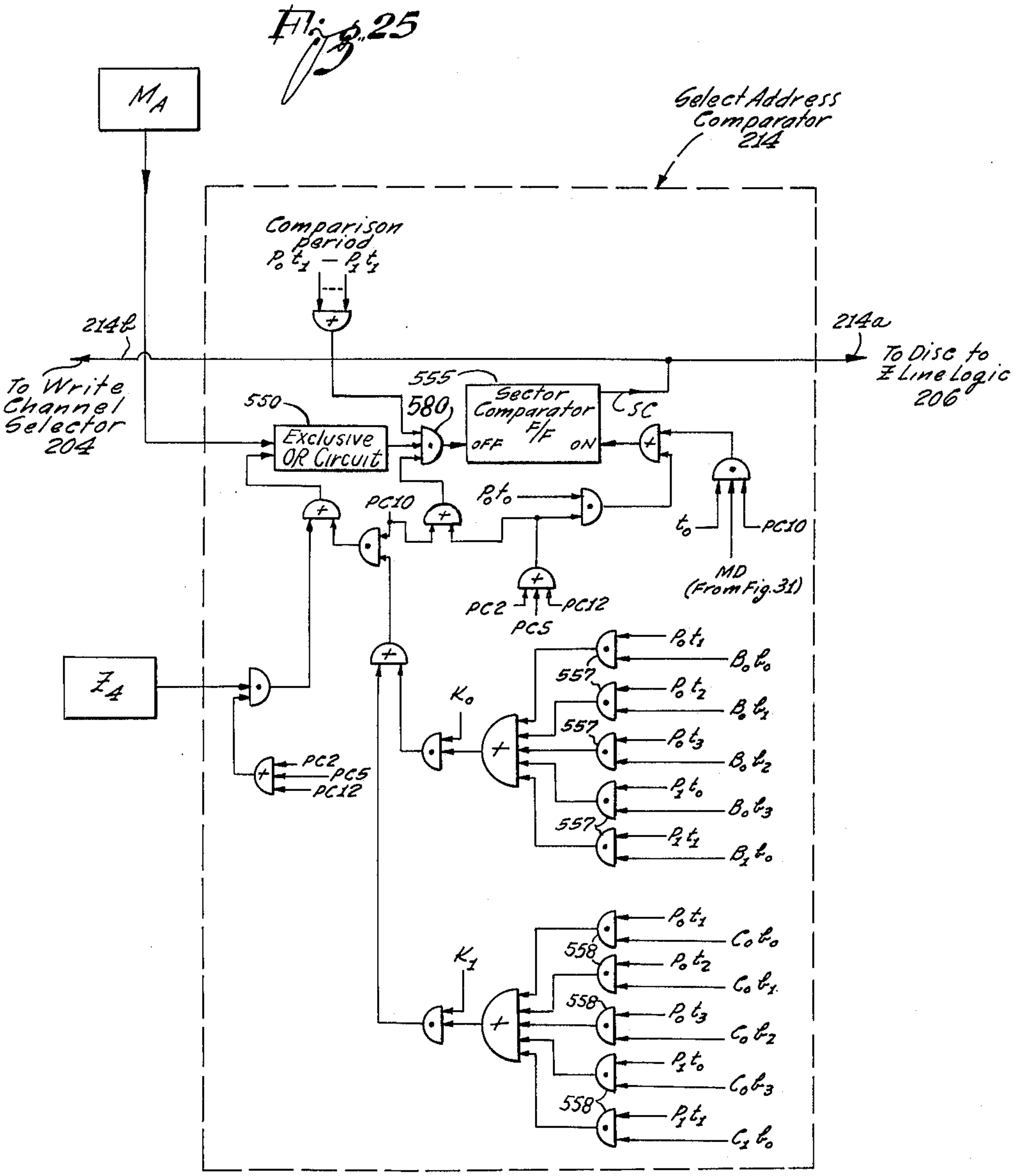
FIG. 25 is an electrical block and circuit diagram illustrating a typical embodiment of the sector address comparator 214 of FIG. 9.

Now considering FIG. 25, shown therein is typical detailed circuitry which may be employed in the sector address comparator 214 of FIG. 9. It will be remembered that the comparator 214 compares the outputs of the $Z_4$ flip-flop and the address flip-flop $M_A$ during the comparison period $P_0t_1$–$P_1t_1$ to determine the sector on the disc is in agreement with the sector address inserted into the Z-line by the sector address input logic 210. From FIG. 25, it will be seen that this comparison is accomplished by feeding the output of the $Z_4$ flip-flop and the output of the address flip-flop $M_A$ to an EXCLUSIVE OR circuit 550 whose output is in turn fed by way of AND gate 580 to the "off" input of a sector comparator flip-flop 555 during the comparison period $P_0t_1$–$P_1t_1$ in program counts PC2, PC5, and PC12. It will be understood that it is only when the outputs of the $M_A$ and $Z_4$ flip-flops match during the comparison period $P_0t_1$–$P_1t_1$, that the output of the EXCLUSIVE OR circuit 550 will remain false during the entire comparison period, and thereby permit the sector comparator 555 (which is turned on at $P_0t_0$ just before the comparison period) to remain "on" to produce true signals 214a and 214b after the comparison period is over. It is these true signals 214a and 214b which initiate the transfer of a word from the thus selected sector of the selected channel on the disc to the Z-line, or vice versa, as described in connection with FIG. 14, and as will become further evident from the detailed circuits of FIGS. 26–28.

Before leaving FIG. 25, it is to be noted that during program count PC10, which is entered in the multiplication operation (FIG. 21), the sector address of the multiplier such as $B_0b_0$–$B_1b_0$ or $C_0b_0$–$C_1b_0$, is fed directly to the comparator 214 during the comparison period $P_0t_1$–$P_1t_1$ by way of respective AND gates 557 and 558, instead of by way of the sector address input logic 210. This is in accordance with the previously described multiplication operation where it was explained that such direct feeding of the sector addresses is required during multiplication because the $D_0$ and $D_1$ digit positions of the Z-line are not available for use, but are required to respectively store the magnitude of the multiplier digit and the position in the multiplier of the particular multiplier digit being used.

Figure 26:
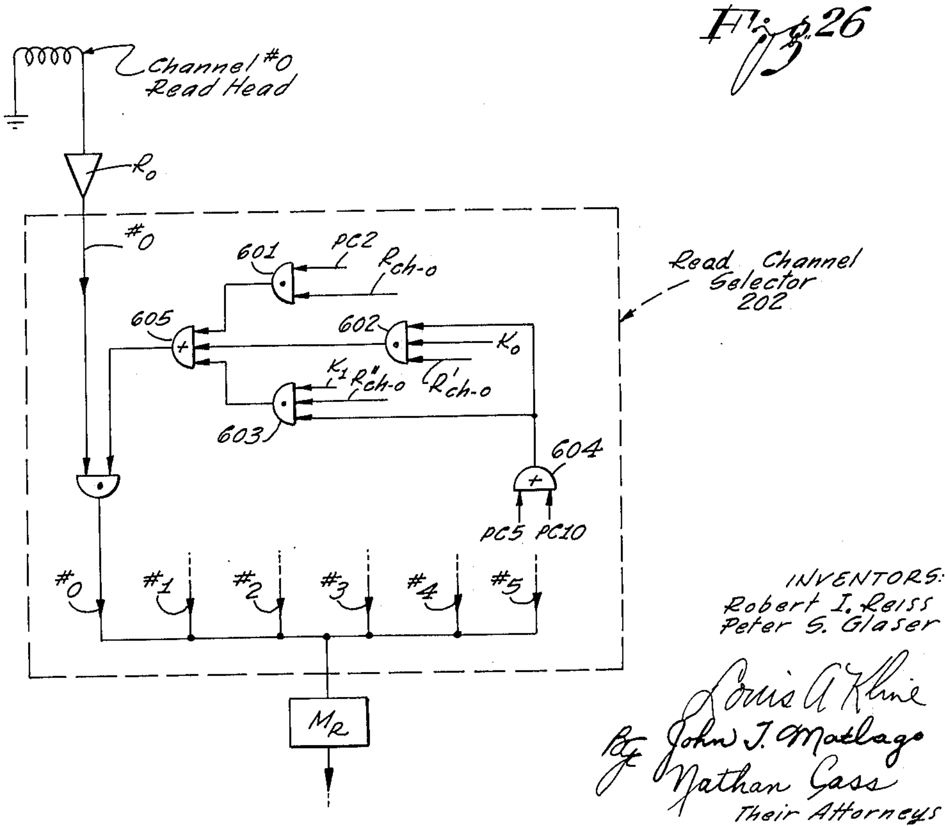
FIG. 26 is an electrical block and circuit diagram illustrating a typical embodiment of the read channel selector 202 of FIG. 9.

Turning next to FIG. 26, shown therein is typical detailed circuitry which may be employed in the read channel selector 202 of FIG. 9. Only the circuitry for channel #0 is shown in FIG. 26, but it is to be understood that the other five channels may be similarly constructed. It will be noted in FIG. 26 that by the use of AND gates such as 601, 602, and 603, and OR gates such as 604 and 605, a particular channel may be selected for feeding to the read flip-flop $M_R$ in program count PC2, and different channels may be selected in each of two entries (determined by $K_0$ and $K_1$ of FIG. 19) in program counts PC5 and PC10. The particular channel selected for each such program count is determined by channel selection signals such as $R_{ch-0}$, $R'_{ch-0}$, and $R''_{ch-0}$ shown fed to channel #0. Similar signals may also be applied to the other channels in the read channel selector 202.

Figure 27:
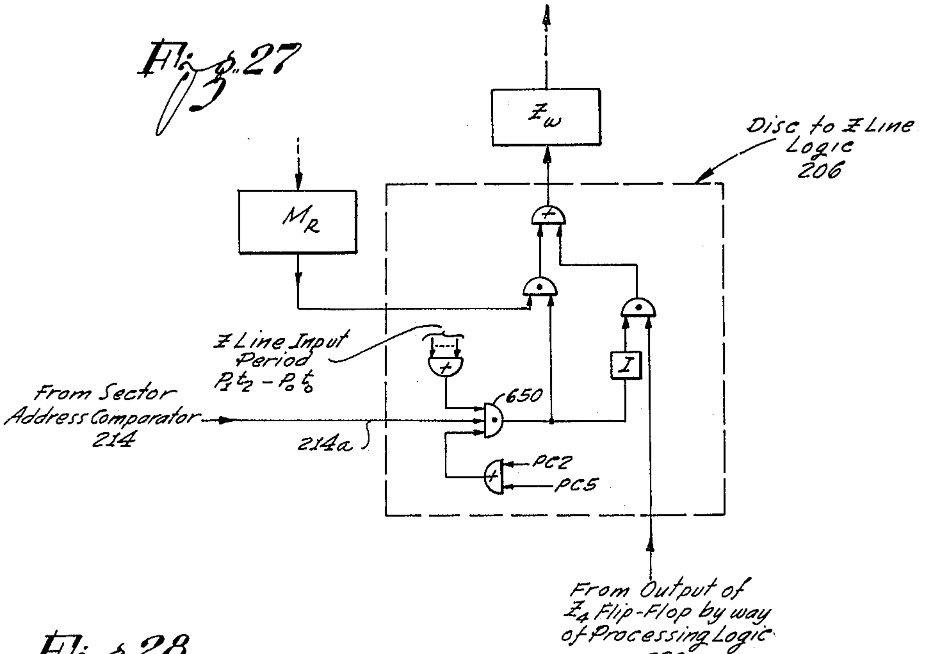
FIG. 27 is an electrical block and circuit diagram illustrating a typical embodiment of the disc to Z-line logic 206 of FIG. 9.

FIG. 27 shows typical detailed circuitry which may be employed in the disc to Z-line logic 206 of FIG. 9. From FIG. 27, it will be understood that when the signal 214*a* remains true at the end of the comparison period $P_0t_1$–$P_1t_1$ (as previously explained in connection with FIG. 25), AND gate 650 in FIG. 27 is then caused to become true during the Z-line input period $P_1t_2$–$P_0t_0$ following thereafter. As a result flip-flop $Z_W$ is caused to receive the output of the read flip-flop $M_R$ during the Z-line input period, instead of the output of flip-flop $Z_4$, thereby causing the number and sign in the selected sector and channel on the disc entered into the Z-line as previously explained in connection with FIG. 14.

Figure 28:
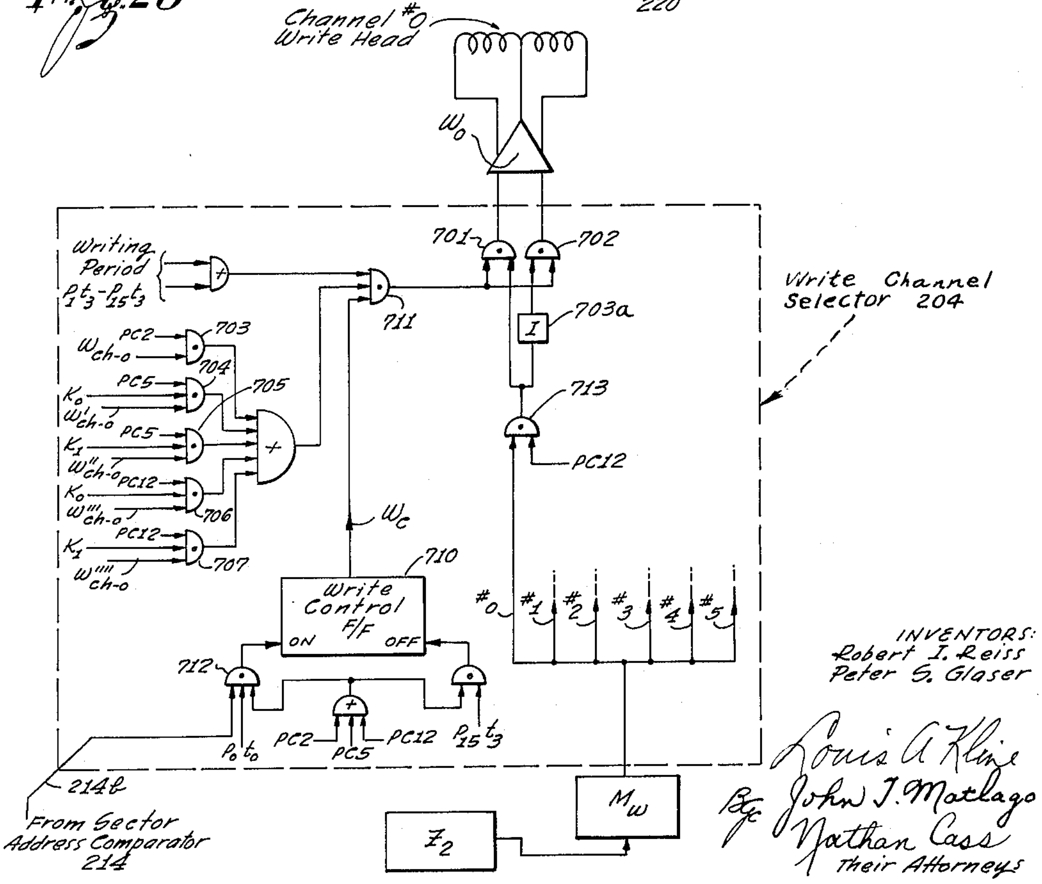
FIG. 28 is an electrical block and circuit diagram illustrating a typical embodiment of the write channel selector 204 of FIG. 9.

Now considering FIG. 28, illustrated therein is typical circuitry which may be employed in the write channel selector 204 of FIG. 9. Similar to the read channel selector 202 of FIG. 26, FIG. 28 only shows the circuitry for the #0 channel, the other channels being provided in a similar manner. It will be noted in FIG. 28 that the write head may be of the balanced type for use in non-return to zero recording, in which a binary "1" causes saturation on the disc in one direction, a binary "0" causes saturation in the other direction, and no signal leaves the recorded signal on the disc unchanged. The AND gates 701 and 702 in conjunction with the inverter 703*a* provide the signals to the typical write amplifier $W_0$ for this type of operation, the AND gates 701 and 702 being enabled when the output of the AND gate 711 becomes true. It will be noted that, similar to the read channel selector 202 of FIG. 26, provision is made in the write channel selector 204 of FIG. 28 (using AND gates such as 703, 704, 705, 706, and 707) to permit a different channel to be selected during the writing period $P_1t_3$–$P_{15}t_3$ in the various program counts PC2, PC5, and PC12 in which writing (or erasing) may take place, the channels selected being determined by the states of $K_0$ and $K_1$ and channel selection signals such as $W_{ch-0}$, $W'_{ch-0}$, $W''_{ch-0}$, $W'''_{ch-0}$, and $W''''_{ch-0}$. In order to permit writing (or erasing) to occur when the write head of the selected channel (which trails the read head by one sector on the disc) is over the selected sector on the disc, AND gate 711 is permitted to become true to enable AND gates 701 and 702 only when a write control flip-flop 710 is turned "on," which occurs (under the control of AND gate 712) in response to the last bit timing pulse $P_0t_0$ of the Z-line input period $P_1t_2$–$P_0t_0$, as recognized by the output 214*b* from the sector address comparator 214 being true at that time.

Still referreing to the write channel selector 204 of FIG. 28, it is to be noted that the only time that the output of the write flip-flop $M_W$ can be applied to the write amplifier for writing is during program count PC12 when AND gate 713 becomes true. This is in accordance with the previous description in which it was noted that counts PC2 and PC5 are primarily provided to cause the transfer of a word from a selected location in the disc memory to the Z-line, the writing operation coming into play during these program counts merely to permit the word in the selected location to be either retained (subtotaling) or erased (totaling). Thus, during typical program counts PC2 and PC5, no new number is written and the appropriate channel selection signals $W_{ch-0}$, $W'_{ch-0}$, and $W''_{ch-0}$, when true, merely cause AND gate 711 to be enabled to permit erasing to occur. The fact that erasing does occur when AND gate 711 is enabled will be understood, since the output of AND gate 713 will be false during program counts PC2 and PC5 to cause binary "0's" to be applied to AND gates 701 and 702 during the writing period. If, instead of erasing, the word in the selected channel and sector on the disc is to be retained, this is accomplished merely by choosing the write channel selection signals $W_{ch}$ of all channels so that the AND gates such as 701 and 702 in each channel are not enabled, thereby leaving the write amplifiers balanced so that the bits recorded on the disc are not disturbed.

Figure 29:
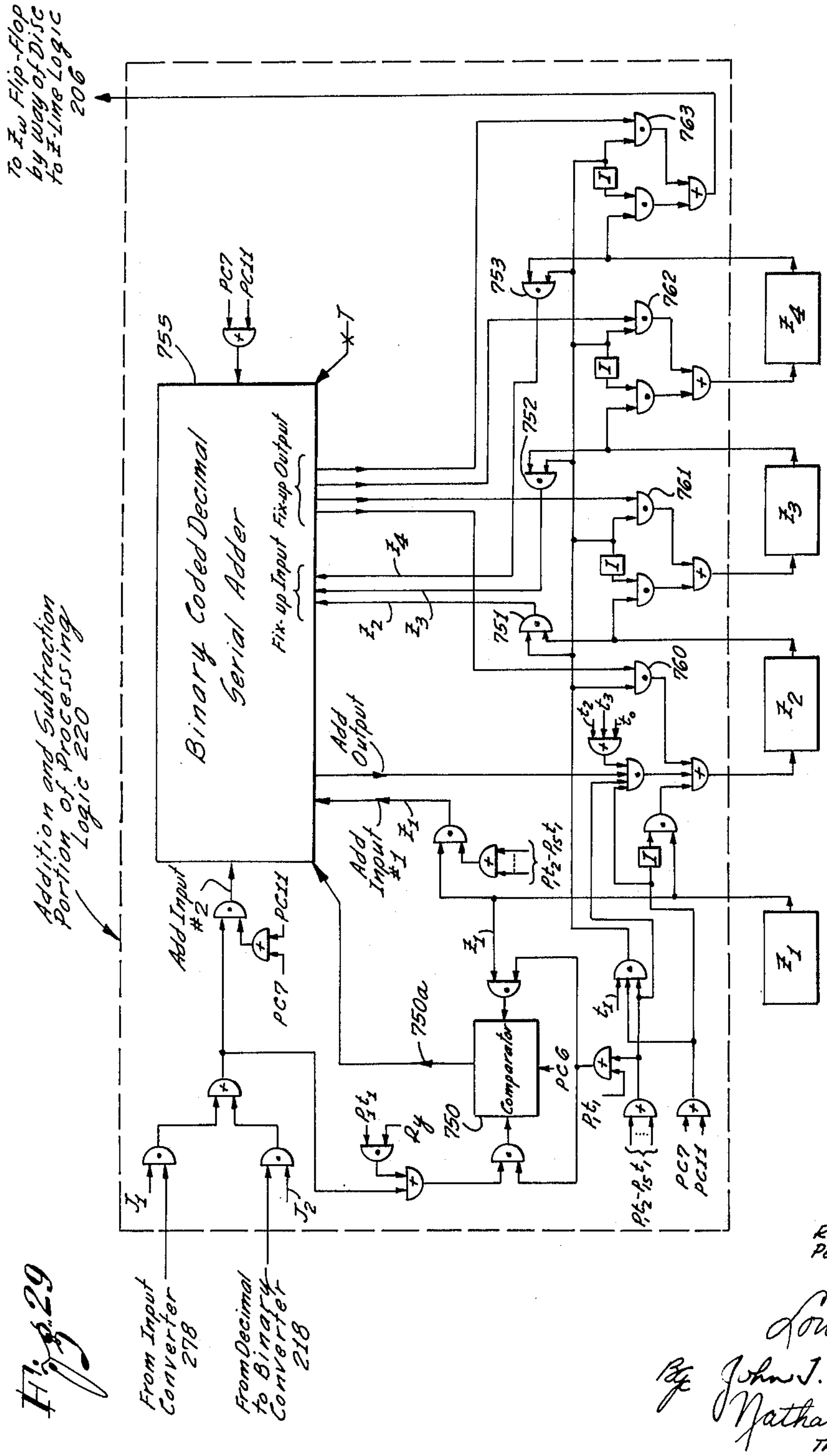
FIG. 29 is an electrical block and circuit diagram illustrating a typical embodiment of the addition and subtraction portion of the processing logic 220 of FIG. 9.

Next to be considered is FIG. 29 which illustrates typical detailed circuitry which may be employed in the processing logic 220 for use in performing addition and subtraction operations in program counts PC6 and PC7 (FIG. 20), and in performing multiplication in program count PC11 (FIG. 21). It will be noted in FIG. 29 that a comparator 750 is provided to operate during an appropriate interval $P_1t_1$–$P_{15}t_1$ in program count PC6 to compare the magnitude and sign of the number in the switch assemblies 92 (the sign bit may be in a separate relay $R_y$), or the magnitude and sign of the number from an external source (determined by whether signal $J_1$ or $J_2$ from the program switches is true), with the magnitude and sign of the number circulating in the Z-line. This is accomplished by feeding the output of flip-flop $Z_1$ (when the magnitude and sign appear at the output of $Z_1$) during the period $P_1t_1$–$P_{15}t_1$ of program count PC6 to the magnitude comparator 750 along with the output of either the decimal binary converter 218 or the input converter 278, each of which serves to cause the bits of its respective number to appear in synchronism with the bits appearing at the output of flip-flop $Z_1$. As a result of this comparison, the comparator 750 produces an output signal 750*a* during program count PC6 which readies the binary coded decimal serial adder 755 for the addition or subtraction operation to be performed in program count PC7. It is to be noted that such a procedure is not required in the multiplication operation, since signs are ignored and addition is always performed.

Still referring to the detailed circuitry of FIG. 29, it will be understood that during the time period $P_2t_1$–$P_{15}t_1$ of program counts PC7 and PC11, the magnitude bits appearing at the output of flip-flop $Z_1$ are caused to be fed to the add input #1 of the binary coded decimal serial adder 755, while the magnitude bits from either the decimal to binary converter 218 or the input converter 278 (depending upon whether $J_1$ or $J_2$ is true) are fed to the add #2 input of the adder 755 in synchronism with the bits being applied to the add #1 input from the $Z_1$ flip-flop. During the first three pairs of bits of each pair of decimal digits fed to the #1 and #2 inputs of the adder 755 (occurring at bit timing pulses $t_1$, $t_2$, and $t_3$), the adder 755 performs normal serial binary addition on each pair of bits, with the result of the binary addition on each pair of bits being applied to the input of flip-flop $Z_2$ during the same bit period, while circulation between flip-flops $Z_2$, $Z_3$, $Z_4$, and $Z_W$ is permitted to occur normally. Any carry produced in such serial binary addition is stored in the adder for use with the next pair of bits. However, when the last pair of bits of each pair of decimal digits is applied to the #1 and #2 inputs of the adder 755 (which occurs during $t_0$), the outputs of flip-flops $Z_2$, $Z_3$ and $Z_4$ are also examined by the adder 755 (being fed to the "fix-up" input of the adder 755 by way of AND gates 751, 752, and 753) in order to permit the adder 755 to take into account that the binary coded decimal system is being employed, as pointed out previously in connection with the discussion of program count PC7 in FIG. 20. It will be understood, therefore, that during each bit timing pulse $t_0$ of the addition or subtraction period $P_1t_2$–$P_{15}t_2$, the adder 755 is able to examine the signals applied to its fix-up input (from $Z_2$, $Z_3$, and $Z_4$) along with the signals applied to its add inputs #1 and #2, while also taking into account any carry from the previous binary addition (during $t_3$), or any carry from the addition of the previous pair of decimal digits, so as to provide inputs to flip-flops $Z_2$, $Z_3$, $Z_4$, and $Z_W$ (by way of AND gates 760, 761, 762, and 763) during this same bit timing pulse $t_0$ which correctely represent, in binary coded decimal digit form, the result of the addition (or subtraction) performed on the pair of binary coded decimal digits whose bits were applied to the add inputs #1 and #2 during $t_1$, $t_2$, $t_3$, and $t_0$. Also, during this same last bit timing pulse $t_0$, the adder 755 may conveniently store any carry required for combination with the next pair of binary coded decimal digits to be added or subtracted. Such operation of a binary coded decimal serial added as described above is well known in the art, and may readily be provided.

Before leaving the discussion of the addition and subtraction portion of the processing logic 220 shown in FIG. 29, it is to be noted that during addition or subtraction in program count PC7, only a single addition or subtraction is required, while during multiplication in program count PC11, provision must be made for multiple additions. As will become evident from FIGS. 33 and 34, proper operation of the circuitry of FIG. 29 in both program counts PC7 and PC11 is achieved by causing the program counter to remain in program count PC7 only long enough to perform a single addition or subtraction, while in program count PC11, addition is caused to occur as many times as required by the particular multiplier digit being used at that time.

Figure 30:
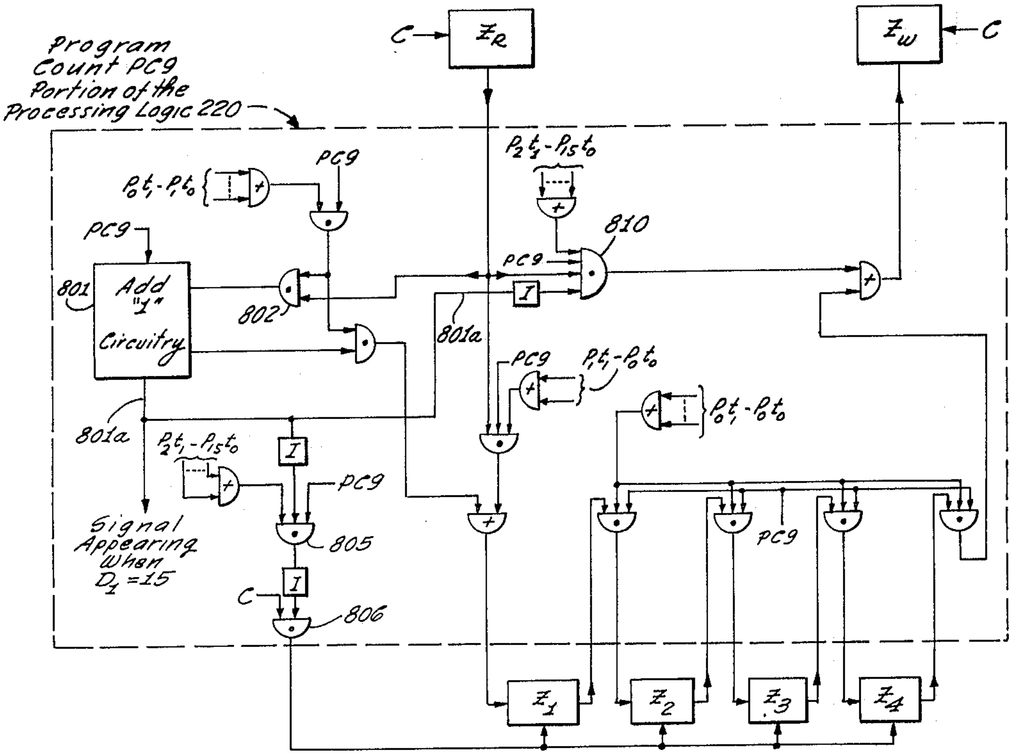
FIG. 30 is an electrical block and circuit diagram illustrating a typical embodiment of a portion of the processing logic 220 for use during program count PC9.
Figure 34:
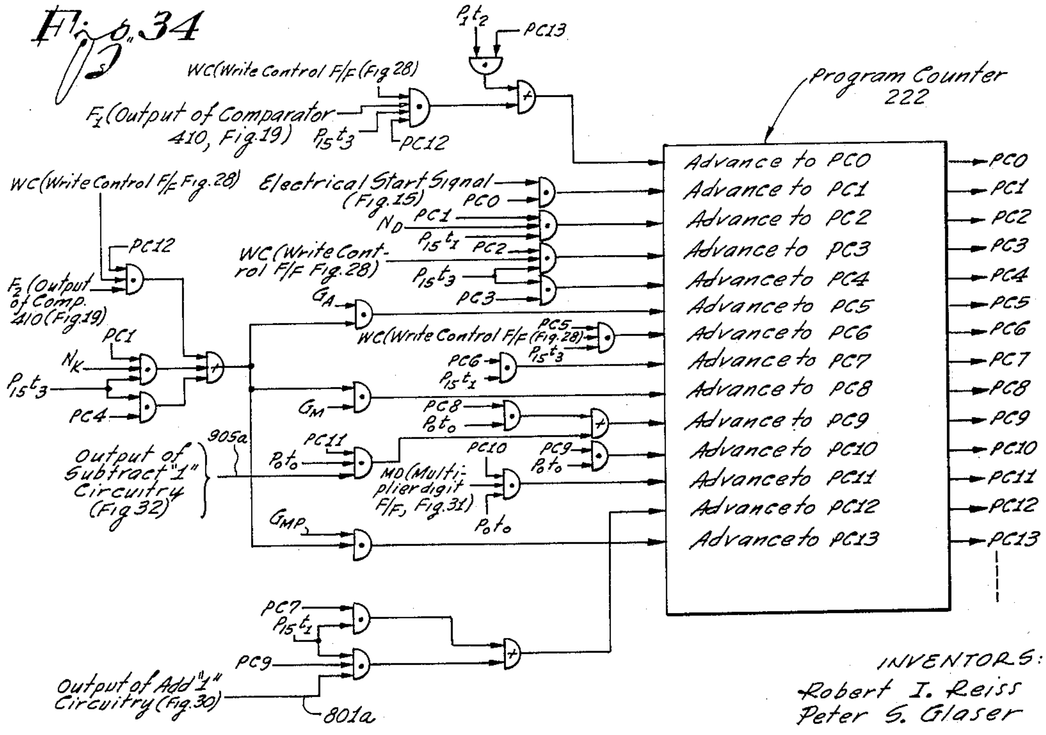
FIG. 34 is an electrical block and circuit diagram of the program counter 222 of FIG. 9 showing typical circuitry which may be employed for controlling the advancement of the program counter through its various program counts.

Turning now to FIG. 30, typical detailed circuitry is shown which may be employed in the processing logic 220 to permit performance of the add "1" and shifting operations required in program count PC9, which is entered during the multiplication operation as illustrated in FIG. 21. The program counter enters program count PC9 at bit timing pulse $P_0t_0$ (being switched to PC9 at $P_{15}t_3$ as shown in FIG. 34), and during the next four timing pulses $P_0t_1$–$P_1t_0$ when the bits of the number stored in the $D_1$ digit position of the Z-line appear at the output of flip-flop $Z_R$, suitable add "1" circuitry 801 in FIG. 30 is provided to operate during PC9 to receive these $D_1$ bits from $Z_4$ (by way of AND gate 802) and serially add "1" to the number represented thereby. Each resultant bit obtained is fed by the add "1" circuitry 801 to the next flip-flop $Z_1$ during the same bit timing pulse so that the normal one period delay still occurs between flip-flops $Z_R$ and $Z_1$. If the four $D_1$ bits applied to the add "1" circuitry 801 represent 15 (which is 1111 in the binary system) the completion of the multiplication operation is indicated, and the add "1" circuitry 801 is caused to produce an output signal 801*a* which prevents shifting during program count PC9, and merely permits normal circulation of the resultant product in the Z-line. Then, when bit timing pulse $P_{15}t_0$ is reached, the signal 801*a* combines therewith (as shown in FIG. 34) to advance the program counter to program count PC12, wherein transfer of the product in the Z-line to a desired location in the disc memory can be accomplished.

The required shifting of digits $D_2$, $D_3$, $D_4$, . . . $D_{15}$ in the Z-line into digits $D_{15}$, $D_2$, $D_3$, . . . $D_{14}$, respectively, as also required in program count PC9 when the number stored in $D_1$ is less than 15, is accomplished in FIG. 30 as follows. During timing pulses $P_1t_1$–$P_2t_0$ following the addition of "1" to $D_1$ as just described, the Z-line is circulated normally to permit the next Z-line digit $D_2$ to appear in flip-flops $Z_1$–$Z_4$ at timing pulse $P_2t_0$. Thereafter, during the next following timing period $P_2t_1$–$P_{15}t_0$ in program count PC9, the clock pulses C are prevented (except when signal 801*a* is true as a result of $D_1$ being equal to 15) from being applied to the $Z_1$–$Z_4$ flip-flops (as a result of the action of AND gates 805 and 806 and their associated inverters) so that the $D_2$ digit stored in flip-flops $Z_1$–$Z_4$ at bit timing pulse $P_2t_0$ will remain stored therein for the entire period represented by bit timing pulses $P_2t_1$–$P_{15}t_0$. While the $D_2$ digit in the Z-line remains thus stored in flip-flops $Z_1$–$Z_4$ during the period represented by bit timing pulses $P_2t_1$–$P_{15}t_0$, the output of flip-flop $Z_4$ during this same period is fed directly to the input of flip-flop $Z_W$ (by way of AND gate 810), so as to effectively cause the digits stored in digit positions $D_3$, $D_4$, . . . $D_{15}$ in the Z-line to be shifted to digit positions $D_2$, $D_3$, . . . $D_{14}$, respectively, as shown, for example, in FIG. 22. It will be understood that at the last bit timing pulse $P_{15}t_0$ of this period $P_2t_1$–$P_{15}t_0$, the $D_2$ digit stored in flip-flops $Z_1$–$Z_4$ will be located in the desired $D_{15}$ digit position of the Z-line so that, when the clock pulses are again applied to flip-flops $Z_1$–$Z_4$ beginning with the bit timing pulse $P_{15}t_1$, the digits stored in the $D_3$, $D_4$, . . . $D_{15}$ digit positions of the Z-line, as well as the digit stored in the $D_2$ digit position, will all have been properly shifted, as required in program count PC9.

Figure 31:
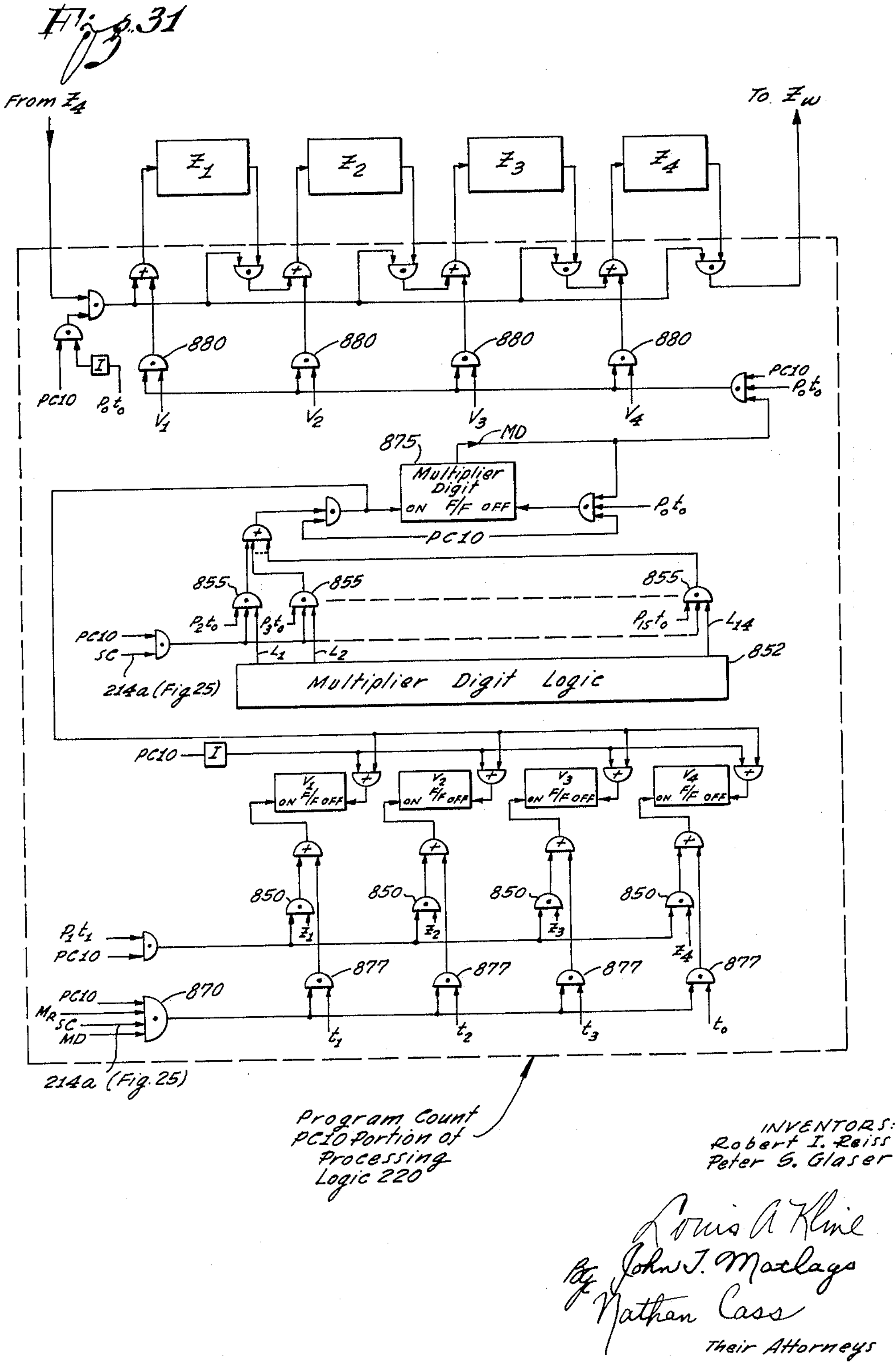
FIG. 31 is an electrical block and circuit diagram illustrating a typical embodiment of a portion of the processing logic 220 for use during program count PC10.

Considering now the detailed circuitry of FIG. 31, illustrated therein is typical circuitry which may be employed in the processing logic 220 for the performance of the operations required in program count PC10. The program counter enters program count PC10 at bit timing pulse $P_0t_1$, the begining of the comparison period $P_0t_1$–$P_1t_1$, whereupon the sector comparator flip-flop 555 of FIG. 25 operates as previously described to compare the sector address of the multiplier in the disc ($A_0b_0$–$A_1b_0$ or $B_0b_0$–$B_1b_0$ depending upon whether $K_0$ or $K_1$ is true) with the sector address at the output of the address flip-flop $M_A$. When the correct sector is found, indicating that the sector on the disc containing the multiplier is to follow next, the sector comparator flip-flop 555 turns on, making signal 214*a* true, and the proper multiplier digit, in accordance with the value of $D_1$ in the Z-line, may then be transferred from the disc and placed in the $D_0$ digit of the Z-line, as will now be explained in connection with FIG. 31.

It will be noted in FIG. 31, that while the sector comparator 214 of FIG. 25 is operating as described above, the first bit timing pulse $P_1t_1$ after entry into program count PC10 causes the $D_1$ digit of the Z-line, which is then in flip-flops $Z_1$–$Z_4$, to be entered (by way of AND gates 850) into respective flip-flops $V_1$–$V_4$. The outputs of these $V_1$–$V_4$ flip-flops are fed to suitable multiplier digit logic 852 which produces a true signal on a particular one of the output lines $L_1$, $L_2$, . . . $L_{14}$ in accordance with the value of the $D_1$ Z-line digit entered into the $V_1$–$V_4$ flip-flops. These output lines $L_1$–$L_{14}$ are fed to respective AND gates 855, along with respective bit timing pulses $P_2t_0$–$P_{15}t_0$, in a manner so that only one of the AND gates 855 becomes true during program count PC10, and then only when the sector comparator of FIG. 25 is "on" (indicating the proper sector of the multiplier digit has been found) and, in addition, the bit timing pulse fed to the AND gate 855 occurs. Each such bit timing pulse is chosen so that it occurs during the bit period immediately preceding the appearance at the output of the read flip-flop $M_R$ of the first bit of the particular multiplier digit which corresponds to the respective L line ($L_1$–$L_{14}$) fed to the same AND gate 855. For example, the particular AND gate 855 which has $L_5$ fed thereto (corresponding to the fifth multiplier digit) also has the timing pulse $P_5t_0$ fed thereto, since this is the timing pulse which precedes the timing pulse $P_5t_1$ during which the first bit of the fifth multiplier digit will appear at the output of the read flip-flop $M_R$.

Continuing with the description of FIG. 31, it will be understood that when the selected AND gate 855 becomes true, the $V_1$–$V_4$ flip-flops are all turned "off" and a multiplier digit flip-flop 875 is turned on, whereupon during the next four timing pulses $t_1$, $t_2$, $t_3$, and $t_4$, the bits of the thus selected multiplier digit appearing at the output of the read flip-flop $M_R$ are caused to be stored in flip-flops $V_1$–$V_4$, being fed thereto by way of respective AND gates 870 and 877. Thereafter, at the appearance of the next occurring bit timing pulse $P_0t_0$ (which is the time when the bits of the $D_0$ digit position in the Z-line are normally fed to flip-flops $Z_1$–$Z_4$), the bits of the desired multiplier digit which have been set up in flip-flops $V_1$–$V_4$, as just described, are simultaneously transferred (by way of respective AND gates 880) to respective flip-flops $Z_1$–$Z_4$, thereby achieving the required operation in program count PC10 of transferring a multiplier digit, chosen in accordance with the value of $D_1$, to the $D_0$ digit position of the Z-line from a selected location in the disc.

Figure 32:
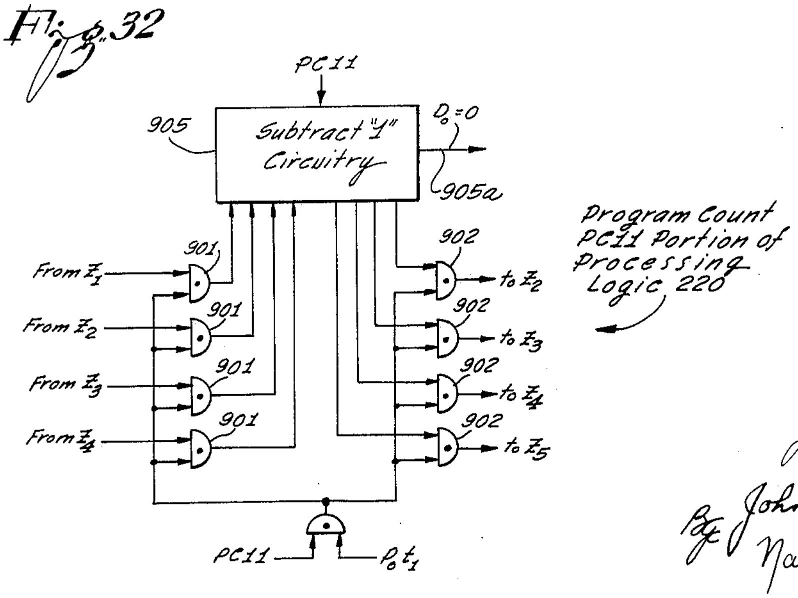
FIG. 32 is an electrical block and circuit diagram illustrating a typical embodiment of a portion of the processing logic 220 for use during program count PC11.

Now turning to FIG. 32, shown therein is typical detailed circuitry which may be employed in the processing logic 220 for use in conjunction with the circuitry of FIG. 29 for performing the operations required in program count PC11 of the multiplication operation illustrated in FIG. 21. It will be seen in FIG. 32 that at timing pulse $P_0t_1$, when the program counter first enters program count PC11, the number in flip-flops $Z_1$–$Z_4$ of the Z-line (which is the $D_1$ multiplier digit just transferred to the $D_0$ digit position of the Z-line during program count PC9) is fed by way of AND gates 901 to suitable subtract "1" circuitry 905, which operates during bit timing pulse $P_0t_1$ of program count PC11 to subtract "1" from the number represented by the bits in flip-flops $Z_1$–$Z_4$. The resultant bits are then fed by the circuitry 905 (by way of AND gates 902) to respective inputs of flip-flops $Z_2$–$Z_5$ during the same bit timing pulse $P_0t_1$ so that the normal one bit period delay occurs between the Z flip-flops. Then, during the period $P_1t_2$–$P_{15}t_1$, the number in the switch assemblies 92 (or the number from an external input source) is added into digits $D_2$–$D_{15}$ of the Z-line, as previously explained in connection with FIG. 29. However, instead of the program counter leaving program count PC11 after the last pair of bits of the last pair of $D_{15}$ digits are added, as occurs during addition or subtraction in program count PC7, operation remains in program count PC11 (with the Z-line circulating normally during $P_{15}t_2$–$P_0t_0$) until the subtract "1" circuitry 905 in FIG. 32 reduces the multiplier digit in the $D_0$ digit position of the Z-line to zero. When this occurs, it indicates that the addition next occurring during the period $P_1t_2$–$P_{15}t_1$ is the last one required, and the program counter is advanced back to program count PC9 to continue the multiplication operation when timing pulse $P_{15}t_1$ of this last addition period occurs, as indicated in FIG. 34.

Figure 33:
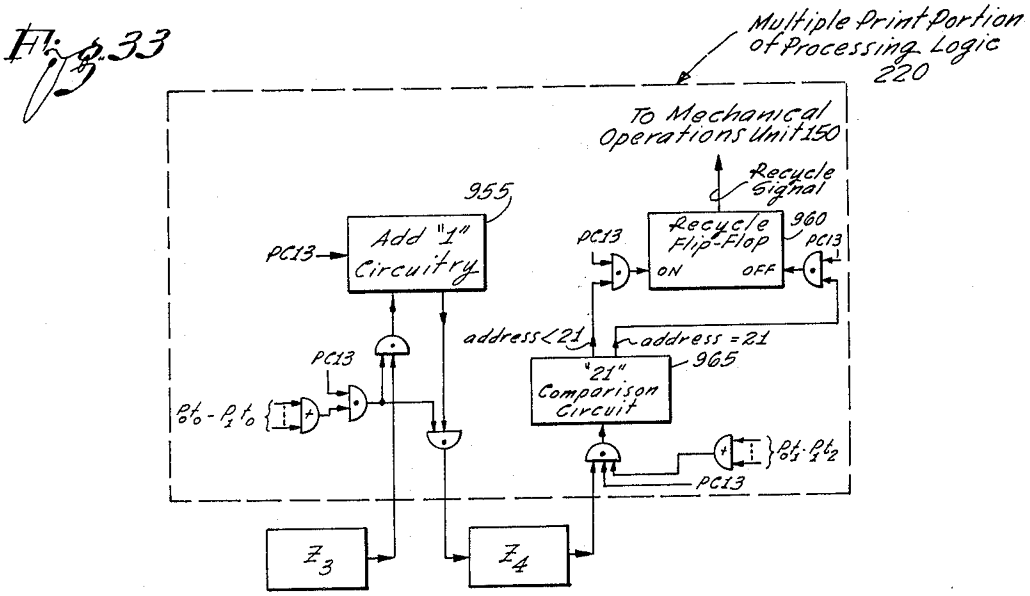
FIG. 33 is an electrical block and circuit diagram illustrating a typical embodiment of the multiple print portion of the processing logic 220 for use during program count PC13.

Turning now to FIG. 33, shown therein is typical detailed circuitry which may be employed in the processing logic 220 for performing the multiple print operation required in program count PC13. It will be noted that the circuitry of FIG. 33 causes the output of flip-flop $Z_3$ to be fed, during the period $P_0t_0$–$P_1t_0$ when the sector address bits appear at the output of flip-flop $Z_3$, to suitable add "1" circuitry 955 which operates during program count PC13 to add "1" to the sector address applied thereto, and to feed the result for each bit to the input of the $Z_4$ flip-flop during the same bit timing pulse. While the output of flip-flop $Z_3$ is being thus handled, the output of flip-flop $Z_4$ is fed, during the period $P_0t_1$–$P_1t_2$, to a suitable "21" comparison circuit 965 for the purpose of examining the sector address (to which "1" has just been added) to determine whether it is "21," or less than "21." If less than "21," a recycle flip-flop 960 is turned "on" (if not already "on") for use during the multiple print operation as previously described in connection with FIG. 23. If the sector address after addition of "1" is equal to "21," indicating that the multiple print operation is completed, the recycle flip-flop is turned "off."

Having summarized the detailed circuits of FIGS. 24–33, the remaining circuit to be considered is that of FIG. 34 illustrating typical circuitry which may be employed for advancing the program counter 222 through its various illustrative program counts PC0–PC13, as required for the proper operation of the previously described detailed circuits. Obviously, the program counter 222 is not limited to the particular program counts PC0–PC13 shown in FIG. 34, and may include other program counts as well as additional circuitry for controlling its advancement.

With reference to FIG. 34, it is to be noted that the only designations which have not previously been explained are the signals $N_D$, $N_K$, $G_A$, $G_M$, and $G_{MP}$, which are typical of the program input signals $N_p$ shown fed to the program counter in FIG. 9. Specifically, signals $N_D$ and $N_K$ respectively determine whether the actuators are to be set in accordance with a number from the disc memory or from the amount keyboard, and the signal $G_A$, $G_M$, and $G_{MP}$ respectively determine whether an addition, a multiplication or a multiple print operation is to be performed.

While the foregoing disclosure has been concerned primarily with certain illustrative embodiments, it is to be understood that the invention is susceptible of many modifications and variations in both construction and arrangement, as well as in operation, besides those disclosed herein. For example, if desired, program information as to the operations to be performed at each stop position need not be supplied by program switches as indicated herein, but instead, may be supplied by a suitable input device, such as a punched tape reader, an optical reader etc., which input device may also provide input numbers to be processed in addition to program information. Also, if desired, the present invention may be adapted for performing operations in the sterling system instead of the decimal system described herein.

The above examples are only two of many possible modifications which may be provided. The present invention, therefore, is not to be considered as limited to the specific disclosure provided herein, but is to be considered as including all modifications and variations coming within the scope of the invention as defined in the appended claims.

What is claimed is:

1. In a combined electrical and mechanical accounting device having a traveling carriage movable to a plurality of stop positions, programmable means provided at a plurality of said stop positions for determining both the mechanical and electrical operations to be performed thereat, means for establishing a standard mechanical cycle which is performed at each stop position, magnetic storage means for storing data manifestations, a keyboard manually settable to predetermined data manifestations, movable actuator means having a plurality of positions representing data manifestations, means operable in response to the initiation of a mechanical cycle to selectively set said movable actuator means during a first portion of each cycle to correspond to data manifestations from either said magnetic storage means or said keyboard, means initiable during a later portion of said cycle and responsive to said programmable means for processing the data manifestations set up in said movable actuator means during said first portion of the cycle with selective data manifestations derived from said magnetic storage means, and means capable of resetting said movable actuator means and of storing the results of said processing means back into said magnetic storage means prior to initiation of another cycle.

2. In a combined electrical and mechanical accounting device having a traveling carriage movable to a plurality of stop positions, means for establishing a standard mechanical cycle which is performed at each stop position, programmable means provided at a plurality of said stop positions, magnetic storage means for storing data manifestations and including a magnetizable surface movable in a closed loop and read and write heads coupled thereto, a plurality of flip-flops coupled to predetermined ones of said read and write heads to form a recirculating line which includes said flip-flops and a portion of said magnetizable surface, means for transferring data manifestations to said recirculating line from selected portions of said magnetizable surface and for transferring data manifestations from said recirculating line to selected portions of said magnetizable surface, a plurality of actuators operable for movement through positions representing different data manifestations, manually settable keyboard means, means coupling said actuators to said flip-flops so as to permit said actuators to be set in accordance, therewith as data circulates in said recirculating line, means selectively operable during a first portion of each cycle to permit said actuators to be set in accordance with said keyboard means or said recirculating line, switch means to which the settings of said actuators set during said first portion of the cycle are transferred during a later portion of the cycle, and processing means operable each cycle for processing the data transferred to said switch means from said actuators with data transferred to said recirculating line from selected portions of said magnetic storage means, the type of processing performed by said processing means and the selected portions of said magnetic storage means chosen during each cycle being controllable in accordance with the programmable means present at the stop position in which said carriage resides.

3. In a combined electrical and mechanical accounting device, means for establishing a standard mechanical cycle of operation for said device, magnetic storage means for storing data manifestations and including a magnetizable surface movable in a closed loop and read and write heads coupled thereto, a plurality of flip-flops coupled to predetermined ones of said read and write heads so as to form a recirculating line which includes said flip-flops and a portion of said magnetizable surface, means initiable in response to the start of said mechanical cycle for transferring data manifestations to said recirculating line from selected portions of said magnetizable surface by way of at least one of said flip-flops, means initiable by said mechanical cycle progressing to a predetermined point for transferring data manifestations from the recirculating line to selected portions of said magnetic surface also by way of at least one of said flip-flops, a plurality of actuators operable during said mechanical cycle and controlled thereby for movement through positions representing different data manifestations, and means coupling said actuators to said flip-flops so as to permit said actuators to be set in accordance therewith during said mechanical cycle as data circulates in said recirculating line.

4. In a combined electrical and mechanical accounting device, means for establishing a standard mechanical cycle which is performed at each stop position, magnetic storage means for storing binary data manifestations and including a magnetizable surface movable in a closed loop and read and write heads coupled thereto, a plurality of flip-flops coupled to predetermined ones of said read and write heads so as to form a recirculating line which includes said flip-flops and a portion of said magnetizable surface, means for transferring binary data manifestations to said recirculating line for selected portions of said magnetizable surface by way of at least one of said flip-flops and for transferring binary data manifestations from said recirculating line to selected portions of said magnetic surface also by way of at least one of said flip-flops, a plurality of actuators operable for movement through positions representing different data manifestations, means coupling said actuators to said flip-flops and operable in response to the initiation of each cycle so as to permit said actuators to be set in accordance therewith as data circulates in said recirculating line, decoder means operable during a later portion of said cycle for converting the settings of said actuators into binary electrical data manifestations, and means operable in response to said mechanical cycle progressing to a still later point in its cycle for processing the binary data circulating in said recirculating line as it appears in at least one of said flip-flops with the binary data provided by said decoder means and causing the results of said processing to be returned to said recirculating line also by way of at least one of said flip-flops.

5. In an accounting device, a plurality of laterally movable actuators each settable to a lateral position in accordance with a respective digit of a number, driving means for said actuators, position detecting means coupled to said driving means for producing electrical signals representing the digit position of said actuators, as they are driven by said driving means, a magnetic surface movable in a closed loop for storing binary signals, magnetic read and write heads cooperating with said surface, a plurality of flip-flops cooperating with said heads so as to form a recirculating line with said magnetic surface, said recirculating line being capable of storing at least a plurality of binary coded digits representing a number and said flip-flops being capable of storing at least one complete binary coded digit, timing means controlling the time that each binary coded digit of a number appears in said flip-flops, means to which the outputs of said flip-flops and said position detecting means and said timing means are fed for producing energization signals for setting said actuators whenever a digit stored in said flip-flops corresponds to the digit position of said driving means, the relative movement of said magnetic surface and said driving means being such that all the binary coded digits of the number in said recirculating line appear in said flip-flops for each digit position of said driving means.

6. In an accounting device, a plurality of laterally movable actuators each settable to a lateral position in accordance with a respective digit of a number, driving means for said actuators, position detecting means coupled to said driving means for producing electrical signals representing the digit position of said actuators as they are driven by said driving means, a magnetic surface movable in a closed loop for storing binary signals, magnetic read and write heads coupled to said surface, a plurality of flip-flops cooperating with said heads so as to form a recirculating line with said magnetic surface, said recirculating line being capable of storing at least a plurality of binary coded digits representing a number and said flip-flops being capable of storing at least one complete binary coded digit, timing means controlling the time that each binary coded digit of a number appears in said flip-flops, means to which the outputs of said flip-flops and said position detecting means and said timing means are fed for producing energization signals whenever a binary coded digit stored in said flip-flops corresponds to the digit position of said driving means, the relative movement of said magnetic surface and said driving means being such that each digit of the number in said recirculating line appears in said flip-flops for each digit position of said driving means, and means responsive to said energization signals for causing each actuator to be set in accordance with the value of its respective digit in said recirculating line.

7. In a combined electrical and mechanical accounting device having a traveling carriage movable to a plurality of stop positions, mechanical means for establishing a standard mechanical cycle which is performed at each stop position, magnetic storage means for storing data manifestations and including a magnetizable surface movable in a closed loop and read and write heads coupled thereto, a plurality of flip-flops coupled to predetermined ones of said read and write heads so as to form a recirculating line which includes said flip-flops and a portion of said magnetizable surface, a plurality of actuators coupled to said mechanical means and operable for movement through positions representing different data manifestations, first transfer means capable of transferring data manifestations from a first selected location in said magnetizable surface to said recirculating line during a first portion of a cycle, coupling means for coupling said flip-flops and said actuators and operable after the transfer provided by said first transfer means and in the same cycle for causing said actuators to be set in accordance with respective data manifestations appearing in said flip-flops as data circulates in said recirculating line, decoder means operable after the actuators are set and in the same cycle for converting the settings of said actuators into electrical data manifestations, said first transfer means also being operable after said actuators are set and in the same cycle to transfer to said recirculating line data manifestations from a second selected location in said magnetizable surface, programmable processing means also operable in the same cycle for processing the data circulating in said recirculating line with the data manifestations produced by said decoder means and causing the results of the processing to be returned to said recirculating line, and second transfer means also operable in the same cycle for transferring the result appearing in said recirculating line after said processing to a selected location of said magnetizable surface prior to the start of another cycle.

8. In an accounting device having a traveling carriage movable to a plurality of stop positions, mechanical means for establishing a standard mechanical cycle which is performed when the carriage arrives at each stop position, program control means at each stop position operable for providing output manifestations indicative of the operations to be performed when the carriage arrives thereat, magnetic storage means for storing data manifestations, a keyboard manually settable to predetermined data manifestations, means coupled to said mechanical means and operable during a first portion of each cycle to be set in accordance with data manifestations from either said keyboard or selected portions of said storage means as determined by said program control means, processing means capable of being initiated during the remainder of said cycle for processing the data manifestations set up in said last mentioned means during said first portion of the cycle with selected data manifestations derived from said storage means, and means for storing the results of said processing back into selected portions of said storage means prior to initiation of another cycle, said program control means being operative at each stop position to determine the type of processing to be performed by said processing means, the particular data manifestations to be selected from said storage means, and the particular portion of said processing means in which the results of said processing are to be stored.

9. In an accounting device, movable actuator means initially settable to positions in accordance with manual or magnetically stored data manifestations, decoder means coupled to said actuator means for converting the initial settings thereof into binary electrical signals, magnetic storage means for storing binary data manifestations, a recirculating line cooperating with said magnetic storage means, transfer means cooperating with said recirculating line and said magnetic storage means for transferring selected data manifestations from said storage means to said recirculating line and for transferring data manifestations from said recirculating line to selected portions of said storage means, and processing means operable after the conversion performed by said decoder means for processing binary data manifestations applied thereto from said recirculating line and said decoder means and for causing the results of processing to be placed in said recirculating line.

10. In an accounting device, movable actuator means initially settable to positions in accordance with manual or magnetically stored data manifestations, decoder means coupled to said actuator means for converting the initial settings thereof into binary electrical signals, magnetic storage means for storing binary data manifestations, a recirculating line comprised of a plurality of flip-flops and a portion of said magnetic storage means, transfer means cooperating with said recirculating line and said magnetic storage means for transferring selected data manifestations from said storage means to said recirculating line and for transferring data manifestations from said recirculating line to selected portions of said storage means, and processing means operable after the conversion performed by said decoder means for processing data manifestations applied thereto from said flip-flops and said decoder means and for causing the results of processing to be placed in said recirculating line.

11. In an accounting device, actuator means settable to positions in accordance with data manifestations, decoder means coupled to said mechanical means for converting the settings of said actuator means into electrical signals, magnetic storage means for storing data manifestations, a recirculating line comprised of a plurality of flip-flops and a portion of said magnetic storage means, transfer means cooperating with said recirculating line and said magnetic storage means for transferring selected data manifestations from said storage means to said recirculating line and for transferring data manifestations from said recirculating line to selected portions of said storage means, processing means operable after the conversion performed by said decoder means for processing data manifestations applied thereto from said flip-flops and said decoder means and for causing the results of processing to be placed in said recirculating line, manually operable means for setting said actuators, encoder means cooperating with said flip-flops and operable to permit said actuator means to be set in accordance with data manifestations circulating in said recirculating line, means operable for setting said actuator means in accordance with either said manually operable means or said encoder means prior to the conversion performed by said decoder means, and means operable during the operation of said processing means for transferring selected data manifestations to said recirculating line for processing with the output of said decoder means.

12. In an accounting device having a traveling carriage movable to a plurality of stop positions, actuator means settable to positions in accordance with data manifestations, decoder means coupled to said actuator means for producing binary coded electrical signals corresponding thereto, magnetic storage means for storing data manifestations, a recirculating line comprised of a plurality of flip-flops and a portion of said magnetic storage means, transfer means cooperating with said flip-flops and said magnetic storage means for transferring selected data manifestations from said storage means to said recirculating line and for transferring data in said recirculating line to selected portions of said storage means, means for setting said actuator means in accordance with data circulating in said recirculating line prior to the operation of said decoder means, processing means operable after said decoding means for processing data signals applied thereto from said flip-flops and said decoder means and for causing the results of processing to be placed in said recirculating line, and program control means for controlling the processing provided by said processing means dependent upon the stop positions to which the carriage advances.

13. In an accounting device having a traveling carriage movable to a plurality of stop positions, mechanical means for establishing a basic cycle of operations performable at each stop position, magnetic storage means for storing data manifestations, a keyboard manually settable to data manifestations, actuator means coupled to said mechanical means and selectively settable during the first portion of a cycle to predetermined data manifestations in accordance with either said magnetic storage means or said keyboard, conversion means for converting the initial settings of said actuator means into corresponding electrical signals, processing means operable after said conversion means for processing electrical signals applied thereto dependent upon the stop position of the carriage, means coupled to said storage means, said conversion means and said processing means and operable during the remainder of a cycle for sequentially applying in turn in the form of electrical signals a plurality of selected predetermined data manifestations from said storage means to said processing means for processing with the electrical signals provided by said conversion means, the results of each such processing being returned to said storage means prior to the application of the next predetermined data manifestations from said storage means to said processing means.

14. In an accounting device, having a traveling carriage movable to a plurality of stop positions, means for establishing a standard mechanical cycle which is performed at each stop position, programmable means at a plurality of said stop positions for determining both the mechanical and electrical operations to be performed thereat, magnetic storage means for storing data manifestations, a keyboard manually settable to data manifestations, actuator means having a plurality of actuators each having selectively separable first and second portions, means coupled to each second portion for movement thereof during a first portion of a mechanical cycle through positions representing different data manifestations, means for setting each actuator during movement thereof during said first portion of a cycle in accordance with respective data manifestations from either said keyboard or said magnetic storage means, the first portion of each actuator being operable to set its respective actuator in accordance with a respective data manifestation from said keyboard and the second portion of each actuator being operable to set its respective actuator in accordance with respective data manifestations from said storage means, said first and second portions of each actuator remaining unseparated when said actuators are to be set in accordance with said keyboard and becoming separated when said actuators are to be set in accordance with said storage means.

15. In an accounting device having a traveling carriage movable to a plurality of stop positions, mechanical means operative in response to the carriage arriving at a stop position for performing a predetermined cycle of mechanical operations, magnetic data storage means, a manually settable keyboard, actuator means coupled to said mechanical means for movement during a cycle through positions representing different data manifestations, means coupled to said actuator means for causing said actuators to be set during movement thereof in a first portion of each cycle to data manifestations from either said keyboard or said magnetic data storage means, means selectively operable during a later portion of the same cycle to print out the data manifestations to which the actuator means have been set, means to which the settings of the actuator means are transferred during the same cycle for producing electrical signals corresponding thereto, and means initiated during the remainder of the cycle for processing said electrical signals in a manner dependent upon the stop position of the carriage with the selected data manifestations from said storage means and for storing the results of said processing back into said storage means prior to the initiation of another cycle.

16. In a combined electrical and mechanical accounting device having a traveling carriage movable to a plurality of stop positions, mechanical means for establishing a standard mechanical cycle which is performed at each stop position, magnetic storage means for storing data manifestations and including a magnetizable surface movable in a closed loop and read and write heads coupled thereto, a plurality of flip-flops coupled to predetermined ones of said read and write heads so as to form a recirculating line which includes said flip-flops and a portion of said magnetizable surface, a plurality of actuators coupled to said mechanical means and operable for movement through positions representing different data manifestations, first transfer means capable of transferring data manifestations from a first selected location in said magnetizable surface to said recirculating line during a first portion of a cycle, coupling means for coupling said flip-flops and said actuators and operable after the transfer provided by said first transfer means and in the same cycle for causing said actuators to be set in accordance with respective data manifestations appearing in said flip-flops as data circulates in said recirculating line, decoder means operable after the actuators are set and in the same cycle for converting the settings of said actuators into electrical data manifestations, printing means selectively operable during the same cycle to print out the setting of said actuators, said first transfer means also being operable after said actuators are set and in the same cycle to transfer to said recirculating line data manifestations from a second selected location in said magnetizable surface, programmable processing means also operable in the same cycle for processing the data circulating in said recirculating line with the data manifestations produced by said decoder means and causing the results of the processing to be returned to said recirculating line, and second transfer means also operable in the same cycle for transferring the result appearing in said recirculating line after said processing to a selected location of said magnetizable surface prior to the start of another cycle.

17. In an accounting device having a traveling carriage movable to a plurality of stop positions, mechanical means for establishing a basic cycle of operations performable at each stop position, program means at each stop position operable for providing output manifestations indicative of the operations to be performed when the carriage arrives thereat, magnetic storage means for storing data manifestations, a keyboard manually settable to data manifestations, actuator means coupled to said mechanical means and selectively settable during the first portion of a cycle to predetermined data manifestations in accordance with either said magnetic storage means or said keyboard, conversion means for converting the settings of said actuator means into corresponding electrical signals, processing means for processing electrical signals applied thereto dependent upon the stop position of the carriage, means coupled to said storage means, said conversion means and said processing means and operable during the remainder of a cycle for sequentially applying in turn in the form of electrical signals a plurality of selected predetermined data manifestations from said storage means to said processing means for processing with the electrical signals provided by said conversion means, the results of each such processing being returned to said storage means prior to the application of the next predetermined data manifestations from said storage means to said processing means, said processing means including a plurality of logical circuits, a program counter having a plurality of program counts each of which causes a different combination of logical circuits to become operative, and means responsive to at least one of the output manifestations provided by said program means for controlling the particular counts and the order of sequencing thereof by said program counter during a cycle at a stop position.

18. In an accounting device, a keyboard settable to a number, magnetic data storage means for storing numbers in respective storage locations, actuator means selectively settable to a number in accordance with said keyboard or in accordance with a number from a selected location in said storage means, decoder means coupled to said actuator means for converting the settings thereof into binary coded electrical signals, a recirculating line cooperating with said magnetic storage means, transfer means cooperating with said recirculating line and said storage means for transferring a selected number from said storage means to said recirculating line and for transferring a number from said recirculating line to a selected location in said storage means, adder means for adding binary electrical signals applied thereto, means coupling said adder to said decoder means so that corresponding electrical signals from said recirculating line and said decoder means are fed in synchronism to said adder means, and means coupling an output of said adder to said recirculating line for placing the result of each addition into said recirculating line.

19. In an accounting device, magnetic storage means including a magnetizable surface movable in a closed loop and read and write heads coupled thereto, a plurality of flip-flops connected with particular ones of said read and write heads to form a recirculating line which includes said flip-flops and a portion of said magnetizable surface, a keyboard manually settable to a predetermined number, mechanical actuator means selectively settable in accordance with a number from either said keyboard or from said storage means, decoder means for converting the setting of said actuators into corresponding binary coded electrical signals, adder means for adding binary electrical signals applied thereto, means for transferring a number from a selected location in said storage means to said recirculating line and for transferring a number from said recirculating line to a selected location in said storage means, means coupling said adder to said decoder means and at least one of said flip-flops so that corresponding binary electrical signals from said recirculating line and said decoder means are fed in synchronism to said adder means, and means coupling an output of said adder to at least one of said flip-flops for placing the result of each addition into said recirculating line.

20. In an accounting device having a traveling carriage movable to a plurality of stop positions, means for establishing a standard mechanical cycle performable at each stop position, a keyboard settable to a number, magnetic data storage means for storing numbers in respective storage locations, actuator means selectively settable during a first portion of a cycle to a number in accordance with said keyboard or in accordance with a number from a selected location in said storage means, decoder means coupled to said actuator means for converting during the same cycle the settings of the actuator means into electrical signals, and means coupled to said decoder means and said storage means which are also initiable during the same cycle for causing the number represented by the electrical signals of said decoder means to be successively added to itself a number of times in accordance with the value of each digit of a selected number in said storage means and for causing the result of the successive addition produced by each digit to be appropriately shifted so that after all digits of the selected number have produced their respective additions the result of all the additions will be the product of the number from said decoder means and the selected number from said storage means, and means for transferring said product to a selected location in said storage means prior to the initiation of another cycle.

21. In an accounting device, a keyboard settable to a number, magnetic data storage means for storing numbers in respective storage locations, actuator means settable to a number in accordance with said keyboard or in accordance with a number from a selected location in said storage means, decoder means coupled to said actuator means for converting the settings thereof into electrical signals, a recirculating line cooperating with said magnetic storage means, transfer means cooperative with said recirculating line and said storage means for transferring a selected number from said storage means to said recirculating line and for transferring a number from said recirculating line to a selected location in said storage means, means responsive to each digit of a selected number in said storage means and coupled to said decoder means and said recirculating line for causing the number represented by the electrical signals of said decoder means to be successively added into the recirculating line a number of times in accordance with the value of each digit of the selected number in said storage means, and means for shifting the results appearing in the recirculating line for each successive addition provided by said last mentioned means so that after all digits of the selected number have produced their respective additions the number circulating in said recirculating line will be the product of the number from said decoder means and the selected number in said storage means.

22. In an accounting device, magnetic storage means including a magnetizable surface movable in a closed loop and read and write heads coupled thereto, a plurality of flip-flops connected with particular ones of said read and write heads to form a recirculating line which includes said flip-flops and a portion of said magnetizable surface, a keyboard manually settable to a predetermined number, mechanical means settable in accordance with a number from either said keyboard or from said storage means, decoder means for converting the setting of said actuators into corresponding electrical signals, adder means for adding electrical signals applied thereto, means for transferring a number from a selected location in said storage means to said recirculating line and for transferring a number from said recirculating line to a selected location in said storage means, means coupling said adder to said decoder means and at least one of said flip-flops so that corresponding electrical signals from said recirculating line and said decoder means may be fed in synchronism to said adder means, and means responsive to each digit of a selected number in said storage means for causing said adder means to successively add the number represented by the electrical signals of said decoder means into said recirculating line by way of said flip-flops a number of times in accordance with the value of each digit of the selected number in said storage means, and means coupled to said recirculating line by way of said flip-flops for shifting the results appearing in the recirculating line for each successive addition provided by said last mentioned means so that after all digits of the selected number have produced their respective additions the number circulating in said recirculating line will be the product of the number from said decoder means and the selected number in said storage means 23. In a combined electrical and mechanical accounting device having a traveling carriage movable to a plurality of stop positions, mechanical means for establishing a standard mechanical cycle which is performed at each stop position, magnetic storage means for storing data manifestations and including a magnetizable surface movable in a closed loop and read and write heads coupled thereto, a plurality of flip-flops coupled to predetermined ones of said read and write heads so as to form a recirculating line which includes said flip-flops and a portion of said magnetizable surface, a plurality of actuators coupled to said mechanical means and operable for movement through positions representing different data manifestations, first transfer means capable of transferring data manifestations from a first selected location in said magnetizable surface to said recirculating line during a first portion of a cycle, coupling means for coupling said flip-flops and said actuators and operable after the transfer provided by said first transfer means and in the same cycle for causing said actuators to be set in accordance with respective data manifestations appearing in said flip-flops as data circulates in said recirculating line, decoder means operable after the actuators are set and in the same cycle for converting the settings of said actuators into electrical data manifestations, means also operable during the same cycle and responsive to each digit of a selected number in said storage means for causing the number represented by the electrical signals of said decoder means to be successively added into said recirculating line by way of said flip-flops a number of times in accordance with the value of each digit of the selected number in said storage means, and means also operable during the same cycle and coupled to said recirculating line by way of said flip-flops for shifting the results appearing in the recirculating line for each successive addition provided by said last mentioned means so that after all digits of the selected number have produced their respective additions the number circulating in said recirculating line will be the product of the number from said decoder means and the selected number in said storage means, and means coupled to said flip-flops for transferring the product circulating in said recirculating line to a selected location in said storage means prior to the initiation of another cycle.

24. In an accounting device having a traveling carriage, magnetic storage means for storing data manifestations in selected location thereof, address means settable to correspond to selected locations of said storage means, actuator means settable in accordance with the data manifestations from a selected location in said storage means determined by the address in said address means, printing means for printing out characters in accordance with the setting of said actuator means, and means for causing an initial address set up in said address means to automatically be changed to the address of another selected location in said storage means after the data manifestations from the previous address have been printed out by said printing means.

25. In an accounting device having a traveling carriage movable to a plurality of stop positions, mechanical means for establishing a standard mechanical cycle which is performed at each stop position, magnetic storage means for storing data manifestations in selected locations thereof, address means settable to correspond to selected locations of said storage means, actuator means settable in a first portion of a cycle in accordance with the data manifestations from a selected location in said storage means determined by the address in said address means, and means coupled to said address means and operable in each cycle after the setting of said actuator means for causing an initial address set up therein to automatically be changed by a predetermined amount, and means operable to automatically initiate another cycle after a previous cycle is completed until the address in said address means reaches a predetermined value.

26. In an accounting device having a traveling carriage movable to a plurality of stop positions and having means for retaining an accounting form therein, mechanical means for establishing a standard mechanical cycle which is performed at each stop position, magnetic storage means for storing data manifestations in selected locations thereof, address means settable to correspond to selected locations of said storage means, actuator means settable in a first portion of a cycle in accordance with the data manifestations from a selected location in said storage means determined by the address in said address means, printing means selectively operable during the same cycle to print out the setting of said actuators, and means coupled to said address means and operable in each cycle after the setting of said actuator means for causing an initial address set up therein to automatically be changed by a predetermined amount, and means operable to automatically initiate another cycle after a previous cycle is completed until the address in said address means reaches a predetermined value.

27. In an accounting device having a traveling carriage movable to a plurality of stop positions, mechanical means for establishing a basic mechanical cycle performable at each stop position, magnetic storage means for storing data manifestations in selected locations thereof, a recirculating line cooperating with said magnetic storage means, means cooperating with said recirculating line for causing a selected address representative of a selected location in said storage means to be entered into said recirculating line, means operable during a first portion of a cycle for transferring data manifestations from a selected location in said storage means to said recirculating line in accordance with the address circulating therein, actuator means settable during the same cycle in accordance with the data manifestations circulating in said recirculating line, means operable in each cycle after the setting of said actuator means for causing an initial address entered into said recirculating line to automatically be changed by a predetermined amount, and means operable to automatically initiate another cycle after a previous cycle is completed until the address in said recirculating line reaches a predetermined value.

28. In an accounting device having a traveling carriage movable to a plurality of stop positions, mechanical means for establishing a basic mechanical cycle performable at each stop position, actuator means settable to data manifestations, magnetic storage means for storing data manifestations in selected locations thereof and including a magnetizable surface movable in a closed loop and read and write heads coupled thereto, a plurality of flip-flops coupled so as to form a recirculating line which includes said flip-flops and a portion of said magnetizable surface, means cooperating with said recirculating line for causing a selected address representative of a selected location in said storage means to be entered into said recirculating line by way of at least one of said flip-flops, means operable during a first portion of a cycle for transferring data manifestations from a selected location in said storage means to said recirculating line by way of at least one of said flip-flops, the selected location being determined by the address circulating in said recirculating line, means coupled to said flip-flops and operable during the same cycle for setting said actuator means in accordance with the data manifestations circulating in said recirculating line, means coupled to at least one of said flip-flops and operable in each cycle after the setting of said actuator means for causing an initial address entered into said recirculating line to be changed by a predetermined amount, and means operable to cause automatic initiation of another cycle after a previous cycle is completed until the address in said recirculating line reaches a predetermined value.

29. In an accounting device, magnetic storage means for storing data manifestations in selected locations thereof, a recirculating line cooperating with said magnetic storage means, address means cooperating with said recirculating line for causing a selected address representative of a selected location in said storage means to be entered into said recirculating line, means for transferring data manifestations from a selected location in said storage means to said recirculating line in accordance with the address also circulating therein, and actuator means settable in accordance with the data manifestations circulating in said recirculating line, and means cooperating with said recirculating line for causing the address circulating therein to be changed to correspond to the address of another selected location in said storage means.

30. In an accounting device, magnetic storage means for storing data manifestations in selected locations thereof and including a magnetizable surface movable in a closed loop and read and write head coupled thereto, a plurality of flip-flops coupled so as to form a recirculating line which includes said flop-flops and a portion of said magnetizable surface, means cooperating with said recirculating line for causing a selected address representative of a selected location in said storage means to be entered into said recirculating line by way of at least one of said flip-flops, means for transferring data manifestations from a selected location in said storage means to said recirculating line by way of at least one of said flip-flops, the selected location being determined by the address circulating in said recirculating line, actuator means settable to data manifestations, and means coupled to said flip-flops for setting said actuator means in accordance with the data manifestations circulating in said recirculating line.

31. In an accounting device having a traveling carriage movable to a plurality of stop positions and having a basic mechanical cycle performable at each stop position, magnetic storage means for storing data manifestations in selected locations thereof and including a rotatable magnetic surface and read and write heads coupled thereto, a plurality of flip-flops coupled so as to form a recirculating line which includes said flip-flops and a portion of said magnetizable surface, means operative during a first portion of a cycle for causing a selected address representative of a selected location in said storage means to be entered into said recirculating line by way of at least one of said flip-flops, means operable during the same cycle for transferring data manifestations from a selected location in said storage means to said recirculating line by way of at least one of said flip-flops, the selected location being determined by the address entered into the recirculating line during said first portion of the cycle, actuator means settable to data manifestations, and means coupled to said flip-flops and operable in the same cycle for setting said actuator means in accordance with the data manifestations circulating in said recirculating line.

32. In an accounting device having a traveling carriage movable to a plurality of stop positions and having a basic mechanical cycle performable at each stop position, magnetic storage means for storing data manifestations in selected locations thereof and including a rotatable magnetic surface and read and write heads coupled thereto, a plurality of flip-flops coupled so as to form a recirculating line which includes said flip-flops and a portion of said magnetizable surface, address means operative during a first portion of a cycle for causing a selected address representative of a first selected location in said storage means to be entered into said recirculating line by way of at least one of said flip-flops, means operable during the same cycle for transferring data manifestations from said first selected location in said storage means to said recirculating line by way of at least one of said flip-flops, the selected location being determined by the address entered into the recirculating line during said first portion of the cycle, actuator means settable to data manifestations, means coupled to said flip-flops and operable in the same cycle for setting said actuator means in accordance with the data manifestations circulating in said recirculating line, decoder means operable in the same cycle for converting the setting of said actuator means into electrical signals, means cooperating with said address means and operable during the same cycle after the setting of said actuator means for causing another selected address representative of a second location in said storage means to be entered into said recirculating line by way of at least one of said flip-flops, means operable during the same cycle and after said last mentioned means for transferring data manifestations from said second selected location in said storage means into said recirculating line by way of at least one of said flip-flops, processing means for processing the data manifestations circulating in said recirculating line with the output from said decoder means and for placing the result of processing in said recirculating line by way of at least one of said flip-flops, means cooperating with said address means and operatble during the same cycle after completion of said processing for causing another selected address representative of a third location in said storage means to be entered into said recirculating line by way of at least one of said flip-flops, and means operable after the last mentioned means for transferring the result of processing circulating in said recirculating line to said third location in said storage means by way of at least one of said flip-flops.

33. In an accounting device, magnetic storage means for storing data manifestations in selected locations thereof, a recirculating line cooperating with said magnetic storage means, address means cooperating with said recirculating line for causing an address representative of a selected location in said storage means to be entered into said recirculating line, means for transferring data manifestations from a selected location in said storage means to said recirculating line and for transferring data manifestations from said recirculating line to a selected location in said storage means, the selected locations being determined in accordance with respective addresses entered into said recirculating line by said address means.

34. In an accounting device, actuator means settable to positions in accordance with data manifestations, decoder means coupled to said actuator means for converting the settings thereof into electrical signals, magnetic storage means for storing data manifestations, a recirculating line cooperating with said magnetic storage means, address means cooperating with said recirculating line for causing an address representative of a selected location in said storage means to be entered into said recirculating line, transfer means cooperating with said recirculating line and said magnetic storage means for transferring in accordance with an address circulating therein selected data manifestations from said storage means to said recirculating line and for transferring data manifestations from selected portions of said storage means to said recirculating line also in accordance with an address circulating therein, and processing means for processing data manifestations applied thereto from said recirculating line and said decoder means and for causing the results of processing to be placed in said recirculating line.

35. In an accounting device having a traveling carriage movable to a plurality of stop positions, a multi-row keyboard manually settable to a number, magnetic storage means comprising a rotatable magnetic surface and read and write heads coupled thereto, said rotatable magnetic surface being divided into channels including a plurality of information channels having respective read and write heads, an address channel having an associated read head, and a recirculating line channel having associated read and write heads, each channel being divided into sectors for storing a number in each sector, a plurality of flip-flops cooperating with the read and write heads of said recirculating line channel to form a recirculating line which at any time includes said flip-flops and a respective portion of said recirculating line channel, means for inserting a sector number into said recirculating line representative of a particular portion of each of the plurality of information channels, means cooperating with the read head of said address channel and at least one of said flip-flops for transferring a number from a selected portion of a selected information channel of said magnetic surface to said recirculating line and for transferring a number from said recirculating line to a selected portion of a selected information channel, the selected portions being determined by the sector number inserted into said recirculating line prior to transfer, actuator means settable to a number, means for selectively setting said actuators to either a number set up in said keyboard or a number circulating in said recirculating line, decoder means for converting the setting of said actuator means into electrical signals, and processing means coupled to said recirculating line and said decoder means for processing the number represented by the electrical signals from said decoder means with at least one selected number from said magnetic surface and for placing the result of processing into said recirculating line.

36. In an accounting device, actuator means settable to positions in accordance with data manifestations, decoder means coupled to said actuator means for converting the settings thereof into electrical signals, magnetic storage means for storing data manifestations, a recirculating line cooperating with said magnetic storage means, transfer means cooperating with said recirculating line and said magnetic storage means for transferring selected data manifestations from said storage means to said recirculating line and for transferring data manifestations from said recirculating line to selected portions of said storage means, means coupled to said recirculating line to permit data manifestations to be transferred from said recirculating line to external means and from external means to said recirculating line, keyboard input means, means for setting said actuator means in accordance with said keyboard input means or said recirculating line, and processing means for processing data manifestations applied thereto from said recirculating line and said decoder means and for causing the results of processing to be placed in said recirculating line.

37. In a combined electrical and mechanical accounting device, magnetic storage means for storing data manifestations and including a magnetizable surface movable in a closed loop and read and write heads coupled thereto, a plurality of flip-flops coupled to predetermined ones of said read and write heads to form a recirculating line which includes said flip-flops and a portion of said magnetizable surface, means for transferring data manifestations to said recirculating line from selected portions of said magnetizable surface and for transferring data manifestations from said recirculating line to selected portions of said magnetizable surface, means coupled to said recirculating line to permit data manifestations to be transferred from said recirculating line to external means and from external means to said recirculating line, a plurality of actuators operable for movement through positions representing different data manifestations, keyboard input means capable of setting said actuators, and means coupling said actuators to said flip-flops so as to permit said actuators to also be set in accordance therewith as data circulates in said recirculating line.

References Cited by the Examiner

UNITED STATES PATENTS 3,053,449 9/1962 Hoberg -------------- 235—157

ROBERT C. BAILEY, *Primary Examiner.*

MALCOLM A. MORRISON, *Examiner.*